United States Patent
Koegler et al.

(10) Patent No.: US 8,595,077 B2
(45) Date of Patent: Nov. 26, 2013

(54) ARCHITECTURAL DESIGN FOR SERVICE REQUEST AND ORDER MANAGEMENT APPLICATION SOFTWARE

(75) Inventors: Alexander Koegler, Walldorf (DE); Hamid Moghaddam, Osterburken (DE); Joachim Barnbeck, Heidelberg (DE); Michael Lesk, Ketsch (DE); Matthias Schwarz, Mannheim (DE); Christian Haas, Heidelberg (DE); Simon Dieterich, Heidelberg (DE); Alexandra Mark, Wiesloch (DE); Ralph Meiswinkel, Bad Schoenborn (DE); Attila Orban, Blieskastel-Blickweiler (DE); Bernhard May, Merzig (DE); Steffen Hartig, Nussloch (DE); Thomas Breitling, Edingen-Neckarhausen (DE); Andrea Hahn, Waghäusel (DE); Olivier M. Dreidemy, Holving (FR); Nir Pachter, Moshav Gealia (IL); Irena Kull, Yehud (IL); Klaus Reinelt, Kraichtal (DE); Jochen Hirth, Weinheim (DE); Jochen Steinbach, Bad Schoenborn (DE); Renzo Colle, Stutensee (DE); Stephan Hetzer, Oestringen-Eichelberg (DE); Alexander Krasinskiy, Sandhausen (DE)

(73) Assignee: SAP AG, Walldorf (DE)

( * ) Notice: Subject to any disclaimer, the term of this patent is extended or adjusted under 35 U.S.C. 154(b) by 793 days.

(21) Appl. No.: 12/233,462

(22) Filed: Sep. 18, 2008

(65) Prior Publication Data

US 2010/0070331 A1 Mar. 18, 2010

(51) Int. Cl.
*G06Q 30/00* (2006.01)

(52) U.S. Cl.
USPC .......................................................... 705/26.1

(58) Field of Classification Search
USPC ................................................... 705/26, 27
See application file for complete search history.

(56) References Cited

U.S. PATENT DOCUMENTS

| | | | |
|---|---|---|---|
| 4,947,321 | A | 8/1990 | Spence et al. |
| 5,361,198 | A | 11/1994 | Harmon et al. |

(Continued)

FOREIGN PATENT DOCUMENTS

| | | |
|---|---|---|
| WO | 00/23874 | 4/2000 |
| WO | WO 2004/083984 | 9/2004 |
| WO | WO 2005/114381 | 12/2005 |

OTHER PUBLICATIONS

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

(Continued)

*Primary Examiner* — Mila Airapetian
(74) *Attorney, Agent, or Firm* — Fish & Richardson P.C.

(57) ABSTRACT

Methods, systems, and apparatus, including computer program products, for implementing a software architecture design for a software application implementing service request and order management. The application is structured as multiple process components interacting with each other through service interfaces, and multiple service operations, each being implemented for a respective process component. The process components include an Outbound Delivery process component, a Site Logistics Processing process component, an Inventory Processing process component, a Customer Requirement Processing process component, a Supply and Demand Matching process component, a Logistics Execution Control process component, a Service Request Processing process component, a Service Order Processing process component, and a Service Confirmation Processing process component.

22 Claims, 40 Drawing Sheets

(56) References Cited

U.S. PATENT DOCUMENTS

| | | | |
|---|---|---|---|
| 5,550,734 A | 8/1996 | Tarter et al. | |
| 5,560,005 A | 9/1996 | Hoover et al. | |
| 5,566,097 A | 10/1996 | Myers et al. | |
| 5,586,312 A | 12/1996 | Johnson et al. | |
| 5,590,277 A | 12/1996 | Fuchs et al. | |
| 5,632,022 A | 5/1997 | Warran et al. | |
| 5,634,127 A | 5/1997 | Cloud et al. | |
| 5,680,619 A | 10/1997 | Gudmundson et al. | |
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A | 6/1999 | Isherwood | |
| 5,987,247 A | 11/1999 | Lau | |
| 5,991,536 A | 11/1999 | Brodsky et al. | |
| H1830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,192,390 B1 | 2/2001 | Berger et al. | |
| 6,208,345 B1 | 3/2001 | Sheard et al. | |
| 6,237,136 B1 | 5/2001 | Sadhiro | |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Costanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 | 7/2006 | Godlewski et al. | |
| 7,076,766 B2 | 7/2006 | Wirts et al. | |
| 7,100,195 B1 | 8/2006 | Underwood | |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 * | 8/2008 | Goel | 705/5 |
| 7,418,424 B2 | 8/2008 | Martin et al. | |
| 7,424,701 B2 | 9/2008 | Kendall et al. | |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |

(56) References Cited

U.S. PATENT DOCUMENTS

| | | |
|---|---|---|
| 7,657,445 B1 | 2/2010 | Goux |
| 7,665,083 B2 | 2/2010 | Demant et al. |
| 7,668,761 B2 | 2/2010 | Jenkins et al. |
| 7,672,888 B2 | 3/2010 | Allin et al. |
| 7,681,176 B2 | 3/2010 | Wills et al. |
| 7,693,586 B2 | 4/2010 | Dumas et al. |
| 7,703,073 B2 | 4/2010 | Illowsky et al. |
| 7,739,160 B1 | 6/2010 | Ryan et al. |
| 7,742,985 B1 | 6/2010 | Digrigoli et al. |
| 7,747,980 B2 | 6/2010 | Illowsky et al. |
| 7,765,156 B2 | 7/2010 | Staniar et al. |
| 7,765,521 B2 | 7/2010 | Bryant |
| 7,788,145 B2 | 8/2010 | Wadawadigi et al. |
| 7,788,319 B2 | 8/2010 | Schmidt |
| 7,793,256 B2 | 9/2010 | Charisius et al. |
| 7,793,258 B2 | 9/2010 | Sundararajan et al. |
| 7,797,698 B2 | 9/2010 | Diament et al. |
| 7,814,142 B2 | 10/2010 | Mamou et al. |
| 7,822,682 B2 | 10/2010 | Arnold et al. |
| 7,835,971 B2 | 11/2010 | Stockton et al. |
| 7,886,041 B2 | 2/2011 | Outhred et al. |
| 7,895,568 B1 | 2/2011 | Goodwin et al. |
| 7,904,350 B2 | 3/2011 | Ayala et al. |
| 7,912,755 B2 | 3/2011 | Perry et al. |
| 7,917,889 B2 | 3/2011 | Devarakonda et al. |
| 7,925,985 B2 | 4/2011 | Moore |
| 8,001,519 B2 | 8/2011 | Conallen et al. |
| 8,010,938 B2 | 8/2011 | Elaasar |
| 8,051,332 B2 | 11/2011 | Zakonov et al. |
| 8,091,065 B2 | 1/2012 | Mir et al. |
| 8,112,738 B2 | 2/2012 | Pohl et al. |
| 2001/0052108 A1 | 12/2001 | Bowman-Amuah |
| 2002/0026394 A1 | 2/2002 | Savage et al. |
| 2002/0042756 A1 | 4/2002 | Kumar et al. |
| 2002/0049622 A1 | 4/2002 | Lettich et al. |
| 2002/0073114 A1 | 6/2002 | Nicastro et al. |
| 2002/0078046 A1 | 6/2002 | Uluakar et al. |
| 2002/0082892 A1 | 6/2002 | Raffel et al. |
| 2002/0103660 A1 | 8/2002 | Cramon et al. |
| 2002/0104071 A1 | 8/2002 | Charisius et al. |
| 2002/0107826 A1 | 8/2002 | Ramachandran et al. |
| 2002/0120553 A1 | 8/2002 | Bowman-Amuah |
| 2002/0133368 A1 | 9/2002 | Strutt et al. |
| 2002/0138281 A1 | 9/2002 | Cirulli et al. |
| 2002/0138358 A1 | 9/2002 | Scheer |
| 2002/0143598 A1 | 10/2002 | Scheer |
| 2002/0156695 A1 | 10/2002 | Edwards |
| 2002/0161907 A1 | 10/2002 | Moon |
| 2002/0184111 A1 | 12/2002 | Swanson |
| 2002/0188486 A1 | 12/2002 | Gil et al. |
| 2002/0198798 A1 | 12/2002 | Ludwig et al. |
| 2002/0198828 A1 | 12/2002 | Ludwig et al. |
| 2003/0009754 A1 | 1/2003 | Rowley et al. |
| 2003/0058277 A1 | 3/2003 | Bowman-Amuah |
| 2003/0069774 A1 | 4/2003 | Hoffman et al. |
| 2003/0074271 A1 | 4/2003 | Viswanath et al. |
| 2003/0074360 A1 | 4/2003 | Chen et al. |
| 2003/0083762 A1 | 5/2003 | Farrah et al. |
| 2003/0084127 A1 | 5/2003 | Budhiraja et al. |
| 2003/0130860 A1 | 7/2003 | Datta et al. |
| 2003/0182206 A1 | 9/2003 | Hendrix et al. |
| 2003/0212602 A1 | 11/2003 | Schaller |
| 2003/0233290 A1 | 12/2003 | Yang et al. |
| 2004/0015367 A1 | 1/2004 | Nicastro et al. |
| 2004/0034578 A1 | 2/2004 | Oney et al. |
| 2004/0054564 A1 | 3/2004 | Fonseca et al. |
| 2004/0093268 A1 | 5/2004 | Ramchandani et al. |
| 2004/0093381 A1 | 5/2004 | Hodges et al. |
| 2004/0111304 A1 | 6/2004 | Meka et al. |
| 2004/0111639 A1 | 6/2004 | Schwartz et al. |
| 2004/0128180 A1 | 7/2004 | Abel et al. |
| 2004/0133481 A1 | 7/2004 | Schwarze et al. |
| 2004/0153359 A1 | 8/2004 | Ho et al. |
| 2004/0158506 A1 | 8/2004 | Wille |
| 2004/0172510 A1 | 9/2004 | Nagashima et al. |
| 2004/0181470 A1 | 9/2004 | Grounds |
| 2004/0181538 A1 | 9/2004 | Lo et al. |
| 2004/0205011 A1 | 10/2004 | Northington et al. |
| 2004/0236639 A1 | 11/2004 | Candadai et al. |
| 2004/0236687 A1 | 11/2004 | Tyson-Quah |
| 2004/0243489 A1 | 12/2004 | Mitchell et al. |
| 2004/0254866 A1 | 12/2004 | Crumbach et al. |
| 2004/0255152 A1 | 12/2004 | Kanamori et al. |
| 2005/0010501 A1 | 1/2005 | Ward, Jr. |
| 2005/0033588 A1 | 2/2005 | Ruiz et al. |
| 2005/0044015 A1 | 2/2005 | Bracken et al. |
| 2005/0060235 A2 | 3/2005 | Byrne |
| 2005/0060408 A1 | 3/2005 | McIntyre et al. |
| 2005/0065828 A1 | 3/2005 | Kroswek et al. |
| 2005/0108680 A1 | 5/2005 | Cheng et al. |
| 2005/0113092 A1 | 5/2005 | Coppinger et al. |
| 2005/0114829 A1 | 5/2005 | Robin et al. |
| 2005/0125310 A1 | 6/2005 | Hazi et al. |
| 2005/0144125 A1 | 6/2005 | Erbey et al. |
| 2005/0144226 A1 | 6/2005 | Purewal |
| 2005/0156500 A1 | 7/2005 | Birecki et al. |
| 2005/0160104 A1 | 7/2005 | Meera et al. |
| 2005/0165784 A1 | 7/2005 | Gomez et al. |
| 2005/0177435 A1 | 8/2005 | Lidow |
| 2005/0203760 A1 | 9/2005 | Gottumukkala et al. |
| 2005/0203813 A1 | 9/2005 | Welter et al. |
| 2005/0209732 A1 | 9/2005 | Audimoolam et al. |
| 2005/0209943 A1 | 9/2005 | Ballow et al. |
| 2005/0216325 A1 | 9/2005 | Ziad et al. |
| 2005/0216507 A1 | 9/2005 | Wright |
| 2005/0222896 A1 | 10/2005 | Rhyne et al. |
| 2005/0234787 A1 | 10/2005 | Wallmeier et al. |
| 2005/0235020 A1 | 10/2005 | Gabelmann et al. |
| 2005/0240592 A1 | 10/2005 | Mamou et al. |
| 2005/0246250 A1 | 11/2005 | Murray |
| 2005/0246482 A1 | 11/2005 | Gabelmann et al. |
| 2005/0256775 A1 | 11/2005 | Schapler et al. |
| 2005/0256882 A1 | 11/2005 | Able et al. |
| 2005/0257125 A1 | 11/2005 | Roesner et al. |
| 2005/0257197 A1 | 11/2005 | Herter et al. |
| 2005/0262192 A1 | 11/2005 | Mamou et al. |
| 2005/0262453 A1 | 11/2005 | Massasso |
| 2005/0284934 A1 | 12/2005 | Ernesti et al. |
| 2005/0288987 A1 | 12/2005 | Sattler et al. |
| 2005/0289020 A1 | 12/2005 | Bruns et al. |
| 2005/0289079 A1 | 12/2005 | Krishan et al. |
| 2006/0004802 A1 | 1/2006 | Phillips et al. |
| 2006/0053063 A1 | 3/2006 | Nagar |
| 2006/0064344 A1 | 3/2006 | Lidow |
| 2006/0074704 A1 | 4/2006 | Shukla et al. |
| 2006/0074731 A1 | 4/2006 | Green et al. |
| 2006/0080338 A1 | 4/2006 | Seubert et al. |
| 2006/0085243 A1 | 4/2006 | Cooper et al. |
| 2006/0085294 A1 | 4/2006 | Boerner et al. |
| 2006/0085336 A1 | 4/2006 | Seubert et al. |
| 2006/0089886 A1 | 4/2006 | Wong |
| 2006/0095439 A1 | 5/2006 | Buchmann et al. |
| 2006/0129978 A1 | 6/2006 | Abrari et al. |
| 2006/0143029 A1 | 6/2006 | Akbay et al. |
| 2006/0149574 A1 | 7/2006 | Bradley et al. |
| 2006/0206352 A1 | 9/2006 | Pulianda |
| 2006/0248504 A1 | 11/2006 | Hughes |
| 2006/0274720 A1 | 12/2006 | Adams et al. |
| 2006/0287939 A1 | 12/2006 | Harel et al. |
| 2006/0288350 A1 | 12/2006 | Grigorovitch et al. |
| 2007/0011650 A1 | 1/2007 | Hage et al. |
| 2007/0022410 A1 | 1/2007 | Ban et al. |
| 2007/0050308 A1 | 3/2007 | Latvala et al. |
| 2007/0075916 A1 | 4/2007 | Bump et al. |
| 2007/0094098 A1 | 4/2007 | Mayer et al. |
| 2007/0094261 A1 | 4/2007 | Phelan et al. |
| 2007/0129964 A1 | 6/2007 | Helmolt et al. |
| 2007/0129984 A1 | 6/2007 | von Helmolt et al. |
| 2007/0129985 A1 | 6/2007 | Helmolt et al. |
| 2007/0143164 A1 | 6/2007 | Kaila et al. |
| 2007/0150332 A1 | 6/2007 | Grichnik et al. |
| 2007/0150387 A1 | 6/2007 | Seubert et al. |
| 2007/0150855 A1 | 6/2007 | Jeong |
| 2007/0156428 A1 | 7/2007 | Brecht-Tillinger et al. |

(56) References Cited

U.S. PATENT DOCUMENTS

| | | |
|---|---|---|
| 2007/0156430 A1 | 7/2007 | Kaetker et al. |
| 2007/0156474 A1 | 7/2007 | Scherberger et al. |
| 2007/0156475 A1 | 7/2007 | Berger et al. |
| 2007/0156476 A1 | 7/2007 | Koegler et al. |
| 2007/0156482 A1 | 7/2007 | Bagheri |
| 2007/0156489 A1 | 7/2007 | Berger et al. |
| 2007/0156493 A1 | 7/2007 | Tebbe et al. |
| 2007/0156499 A1 | 7/2007 | Berger et al. |
| 2007/0156500 A1 | 7/2007 | Merkel et al. |
| 2007/0156538 A1 | 7/2007 | Peter et al. |
| 2007/0156550 A1 | 7/2007 | Der Emde et al. |
| 2007/0156731 A1 | 7/2007 | Ben-Zeev |
| 2007/0162893 A1 | 7/2007 | Kaetker et al. |
| 2007/0164849 A1 | 7/2007 | Haeberle et al. |
| 2007/0168303 A1 | 7/2007 | Kaetker et al. |
| 2007/0174068 A1 | 7/2007 | Alfandary et al. |
| 2007/0174145 A1 | 7/2007 | Hetzer et al. |
| 2007/0174811 A1 | 7/2007 | Kaetker et al. |
| 2007/0186209 A1 | 8/2007 | Kaetker et al. |
| 2007/0197877 A1 | 8/2007 | Decorte et al. |
| 2007/0198391 A1 | 8/2007 | Dreyer et al. |
| 2007/0214065 A1 | 9/2007 | Kahlon et al. |
| 2007/0220046 A1 | 9/2007 | Moosman et al. |
| 2007/0220143 A1 | 9/2007 | Lund et al. |
| 2007/0233539 A1 | 10/2007 | Suenderhauf et al. |
| 2007/0233541 A1 | 10/2007 | Schorr et al. |
| 2007/0233545 A1 | 10/2007 | Cala et al. |
| 2007/0233574 A1 | 10/2007 | Koegler et al. |
| 2007/0233575 A1 | 10/2007 | Berger et al. |
| 2007/0233581 A1 | 10/2007 | Peter |
| 2007/0233598 A1 | 10/2007 | Der Emde et al. |
| 2007/0234282 A1 | 10/2007 | Prigge et al. |
| 2007/0239508 A1 | 10/2007 | Fazal et al. |
| 2007/0239569 A1 | 10/2007 | Lucas et al. |
| 2007/0265860 A1 | 11/2007 | Herrmann et al. |
| 2007/0265862 A1 | 11/2007 | Freund et al. |
| 2008/0004929 A9 | 1/2008 | Raffel et al. |
| 2008/0017722 A1 | 1/2008 | Snyder et al. |
| 2008/0027831 A1 | 1/2008 | Gerhardt |
| 2008/0065437 A1 | 3/2008 | Dybvig |
| 2008/0120129 A1 | 5/2008 | Seubert et al. |
| 2008/0147507 A1 | 6/2008 | Langhammer |
| 2008/0162382 A1 | 7/2008 | Clayton et al. |
| 2008/0208707 A1 | 8/2008 | Erbey et al. |
| 2008/0215354 A1 | 9/2008 | Halverson et al. |
| 2008/0263152 A1 | 10/2008 | Daniels et al. |
| 2008/0300959 A1 | 12/2008 | Sinha et al. |
| 2009/0037287 A1 | 2/2009 | Baitalmal et al. |
| 2009/0037492 A1 | 2/2009 | Baitalmal et al. |
| 2009/0063112 A1 | 3/2009 | Hader et al. |
| 2009/0171716 A1 | 7/2009 | Suenderhauf et al. |
| 2009/0171818 A1 | 7/2009 | Penning et al. |
| 2009/0172699 A1 | 7/2009 | Jungkind et al. |
| 2009/0189743 A1 | 7/2009 | Abraham et al. |
| 2009/0192858 A1 | 7/2009 | Johnson |
| 2010/0070324 A1 | 3/2010 | Bock et al. |
| 2010/0070331 A1 | 3/2010 | Koegler et al. |
| 2010/0070336 A1 | 3/2010 | Koegler et al. |
| 2010/0070391 A1 | 3/2010 | Storr et al. |
| 2010/0070395 A1 | 3/2010 | Elkeles et al. |
| 2010/0070555 A1 | 3/2010 | Duparc et al. |
| 2010/0100464 A1 | 4/2010 | Ellis et al. |
| 2010/0138269 A1 | 6/2010 | Cirpus et al. |
| 2011/0252395 A1 | 10/2011 | Charisius et al. |

OTHER PUBLICATIONS

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; June 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite_applications.asp.

(56) References Cited

OTHER PUBLICATIONS

International Search Report and Written Opinion of the International Searching Authority issued in International Application No. PCT/EP2006/012625; Apr. 3, 2007; 8 pages.
International Preliminary Report on Patentability issued in International Application No. PCT/EP2006/012625; Jul. 1, 2008; 7 pages.
International Search Report and Written Opinion of the International Searching Authority issued in International Application No. PCT/EP2006/012614; Mar. 16, 2007; 7 pages.
International Preliminary Report on Patentability issued in International Application No. PCT/US2006/012614; Jul. 1, 2008; 6 pages.
International Search Report and Written Opinion of the International Searching Authority issued in International Application No. PCT/EP2006/012618; Apr. 3, 2007; 8 pages.
International Preliminary Report on Patentability issued in International Application No. PCT/EP2006/012618; Jul. 1, 2008; 7 pages.
International Search Report and Written Opinion of the International Searching Authority issued in International Application No. PCT/EP2006/012613; May 3, 2007; 6 pages.
International Preliminary Report on Patentability issued in International Application No. PCT/EP2006/012613; Jul. 1, 2008; 6 pages.
International Search Report and Written Opinion of the International Searching Authority issued in International Application No. PCT/EP2006/012624; Mar. 30, 2007; 9 pages.
International Preliminary Report on Patentability issued in International Application No. PCT/EP2006/012624; Jul. 1, 2008; 8 pages.
International Search Report and Written Opinion of the International Searching Authority issued in International Application No. PCT/EP2006/012623; May 7, 2007; 8 pages.
International Preliminary Report on Patentability issued in International Application No. PCT/EP2006/012623; Jul. 1, 2008; 7 pages.
International Search Report and Written Opinion of the International Searching Authority issued in International Application No. PCT/EP2006/012620; Mar. 21, 2007; 7 pages.
International Preliminary Report on Patentability issued in International Application No. PCT/EP2006/012620; Jul. 1, 2008; 6 pages.
International Search Report and Written Opinion of the International Searching Authority issued in International Application No. PCT/EP2006/012619; Apr. 19, 2007; 8 pages.
International Preliminary Report on Patentability issued in International Application No. PCT/EP2006/012619; Jul. 1, 2008; 7 pages.
International Search Report and Written Opinion of the International Searching Authority issued in International Application No. PCT/EP2006/012621; Apr. 19, 2007; 8 pages.
International Preliminary Report on Patentability issued in International Application No. PCT/EP2006/012621; Jul. 1, 2008; 7 pages.
International Search Report and Written Opinion of the International Searching Authority issued in International Application No. PCT/EP2007/002835; Aug. 9, 2007; 12 pages.
International Preliminary Report on Patentability issued in International Application No. PCT/EP2007/002835; Sep. 30, 2008; 8 pages.
Communication Pursuant to Article 94(3) EPC issued in European Application No. 06841224.6; May 15, 2009; 8 pages.
Communication Pursuant to Article 94(3) EPC issued in European Application No. 06847009.5; May 15, 2009; 10 pages.
Communication Pursuant to Article 94(3) EPC issued in European Application No. 07007130.3; Dec. 5, 2008; 6 pages.
Extended European Search Report issued in European Application No. 07007130.3; Oct. 5, 2007; 6 pages.
Office Action issued in U.S. Appl. No. 11/323,041; Apr. 30, 2009; 26 pages.
Office Action issued in U.S. Appl. No. 11/322,612; May 11, 2009; 24 pages.
Office Action issued in U.S. Appl. No. 11/322,772; Mar. 25, 2009; 12 pages.
Office Action issued in U.S. Appl. No. 11/323,590; Jan. 9, 2009; 23 pages.
Office Action issued in U.S. Appl. No. 11/396,288; Jan. 2, 2009; 18 pages.
Office Action issued in U.S. Appl. No. 11/396,288; Apr. 15, 2008; 26 pages.
Anon.; "Sequenst Corp Bell Atlantic: Bell Atlantic Selects Sequent for Video-on-Demand Program; Sequent Moves to Sieze Opportunity in New Market"; Business Wire; Dec. 6, 1994.
Anon.; "State of the Art Reports™ 13,000 MAS 90® for Windows® Shipments in First Nine Months of Availability"; PR Newswire; Apr. 28, 1997.
Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.
Avery, S.; "Buyer's Guide to Software for Purchasing 2000.(Directory)"; Purchasing, vol. 129, No. 1; p. 179; Jul. 13, 2000.
"Hudson's Bay Company Realizes Fast ROI with the Oracle E-Business Suite"; PR Newswire; New York; Jan. 15, 2002; p. 1.
Office Action issued in U.S. Appl. No. 11/397,029; Jul. 21, 2009; 28 pages.
Office Action issued in U.S. Appl. No. 11/323,040; Jul. 24, 2009; 35 pages.
Office Action issued in U.S. Appl. No. 11/323,590; Jul. 10, 2009; 32 pages.
Office Action issued in U.S. Appl. No. 11/322,816; Jul. 23, 2006; 41 pages.
Office Action issued in U.S. Appl. No. 11/322,851; Sep. 2, 2009; 32 pages.
Office Action issued in U.S. Appl. No. 11/323,590; Dec. 30, 2009; 31 pages.
Office Action issued in U.S. Appl. No. 11/322,482; Jan. 7, 2010; 19 pages.
Office Action issued in U.S. Appl. No. 11/322,772; Dec. 9, 2009; 14 pages.
Office Action issued in U.S. Appl. No. 11/323,039; Sep. 4, 2009; 36 pages.
Office Action issued in U.S. Appl. No. 11/323,634; Sep. 10, 2009; 15 pages.
Office Action issued in U.S. Appl. No. 11/322,383; Nov. 12, 2009; 29 pages.
Office Action issued in U.S. Appl. No. 11/396,258; Nov. 25, 2009; 9 pages.
Office Action issued in U.S. Appl. No. 12/333,085; Jun. 25, 2009; 9 pages.
Office Action issued in U.S. Appl. No. 11/396,288; Aug. 19, 2009; 20 pages.
"American Software Announces ASP Pricing Model for It's a-Applications Expense Business Solution"; PR Newswire; Mar. 6, 2000; 2 pages.
Bastani et al.; "Complex Open System Design by Quasi Agents: Process Oriented Modeling in Agent Based Systems"; ACM SIGSOFT; vol. 34, No. 4; 2009; pp. 1-14.
Bastani et al.; "Process Oriented Abstraction of the Complex Evolvable Systems: Problem Model Construction"; ACM SIGSOFT; vol. 33, No. 3; 2008; pp. 1-13.
"Cendant Announces Comprehensive Online Travel Booking to Meet President Bush's eTravel Initiative"; PR Newswire; Jul. 9, 2002; 3 pages.
Chen, M. and Meixell, M.; "Web Services Enabled Procurement in the Extended Enterprise: An Architectural Design and Implementation"; Journal of Electronic Commerce Research, vol. 4, No. 4; 2003; pp. 140-155.
Duc et al.; "Uniform Object Modeling Methodology and Reuse of Real Time System Using UML"; EMSOFT '05; Sep. 19-22, 2005; pp. 44-47.
Gomaa et al.; "Model Based Software Design and Adaption"; International Workshop on Software Engineering for Adaptive and Self-Managing Systems (SEAMS '07); IEEE; 2007; 10 pages.
Huang, S. et al.; "Computer-Assisted Supply Chain Configuration Based on Supply Chain Operations Reference (SCOR) Model"; Computers & Industrial Engineering 48; 2005; pp. 377-394.
Intuit Canada Ltd.; "Startup Guide—QuickBooks Basic for Windows, QuickBooks Pro for Windows, QuickBooks Premier for Windows"; 2002; 230 pages.

(56) References Cited

OTHER PUBLICATIONS

Lambert et al.; "Supply Chain Metrics"; International Journal of Logistics Management; vol. 12, No. 1; 2001; pp. 1-19.
Lockamy III, et al.; "Linking SCOR Planning Practices to Supply Chain Performance"; International Journal of Operationgs & Production Management; vol. 24, No. 12; pp. 1192-1218.
mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.
"Oracle Expands E-Commerce Offerings with the Acquisition of E-Travel, Inc."; PR Newswire; Mar. 9, 1999; 3 pages.
Ouyang et al.; "From Business Process Models to Process Oriented Software Systems"; ACM Transactions on Software Engineering and Methodology; vol. 19, No. 1, Article 2; Aug. 2009; pp. 1-37.
Rossi et al.; "Designing and Architecturing Process-aware Web Applications with EPML"; SAC '08; Mar. 16-20, 2008; pp. 2409-2414.
"SAP Delivers Next-generation ERP to Customers"; PR Newswire; New York; Mar. 10, 2005; 7 pages.
Schultz, G.J.; "Keeping SCOR on Your Supply Chain: Basic Operations Reference Model Updates with the Times"; Information Strategy: The Executive's Journal; Summer 2003; pp. 12-20.
Stephens, S.; "Supply Chain Council & Supply Chain Operations Reference (SCOR) Model Overview"; <http://www.supply-chain.org>; Version 5.0a; Aug. 2001; 29 pages.
Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.
"Time Management with mySAP™ ERP Human Capital Management"; Downloaded Mar. 24, 2010 from <http://web.archive.org/web/20060105084834/www.sap.com/solutions/business-suite/erp/hcm/pdf/HCM_Time_Management.pdf>; 4 pages.
Vogel et al.; "mySAP ERP for Dummies"; Published on Sep. 30, 2005; Downloaded on Mar. 23, 2001 from <http://proquest.safaribooksonline.com/9780764599958> 41 pages.
International Search Report and Written Opinion of the International Searching Authority issued in International Application No. PCT/EP2007/002841; Aug. 16, 2007; 12 pages.
International Preliminary Report on Patentability under Chapter I issued in International Application No. PCT/EP2007/002841; Sep. 30, 2008; 8 pages.
Office Action issued in U.S. Appl. No. 11/396,312 on Mar. 30, 2010; 23 pages.
Office Action issued in U.S. Appl. No. 11/322,611 on Mar. 31, 2010; 17 pages.
Notice of Allowance issued in U.S. Appl. No. 11/322,610 on Mar. 1, 2010; 12 pages.
Notice of Allowance issued in U.S. Appl. No. 11/322,610 on Jun. 14, 2010; 6 pages.
Office Action issued in U.S. Appl. No. 11/322,398 on Apr. 2, 2010; 39 pages.
Office Action issued in U.S. Appl. No. 11/322,383; May 12, 2010; 23 pages.
Office Action issued in U.S. Appl. No. 11/322,382 on Mar. 29, 2010; 28 pages.
Office Action issued in U.S. Appl. No. 11/323,041 on Mar. 19, 2010; 26 pages.
Advisory Action issued in U.S. Appl. No. 11/323,041 on Jun. 7, 2010; 3 pages.
Notice of Allowance issued in U.S. Appl. No. 11/396,259 on Mar. 29, 2010; 19 pages.
Notice of Allowance issued in U.S. Appl. No. 11/396,288; May 20, 2010; 15 pages.
Notice of Allowance issued in U.S. Appl. No. 11/396,258 on Mar. 31, 2010; 9 pages.
Supplemental Notice of Allowance issued in U.S. Appl. No. 11/396,258 on May 19, 2010; 8 pages.
Office Action issued in U.S. Appl. No. 11/396,236 on Mar. 31, 2010; 20 pages.
Office Action issued in U.S. Appl. No. 11/323,039; Apr. 14, 2010; 15 pages.
Office Action issued in U.S. Application No. 11/322,851; May 12, 2010; 15 pages.
Office Action issued in U.S. Appl. No. 11/323,040; Apr. 29, 2010; 17 pages.
Office Action issued in U.S. Appl. No. 11/322,612; Apr. 1, 2010; 23 pages.
Advisory Action issued in U.S. Appl. No. 11/322,612; Jun. 24, 2010; 3 pages.
Notice of Allowance issued in U.S. Appl. No. 11/397,026 on Mar. 29, 2010; 17 pages.
Notice of Allowance issued in U.S. Appl. No. 12/233,554 on May 14, 2010; 11 pages.
Notice of Allowance issued in U.S. Appl. No. 12/233,534 on Jun. 24, 2010; 15 pages.
Notice of Allowance issued in U.S. Appl. No. 12/327,354 on Jun. 25, 2010; 16 pages.
Notice of Allowance issued in U.S. Appl. No. 11/967,865 on Mar. 31, 2010; 16 pages.
Office Action issued in U.S. Appl. No. 11/323,590; Jun. 21, 2010; 25 pages.
Office Action issued in U.S. Appl. No. 11/323,634; Apr. 2, 2010; 9 pages.
Office Action issued in U.S. Appl. No. 11/322,816; Apr. 15, 2010; 27 pages.
Office Action issued in U.S. Appl. No. 11/396,327 on Apr. 1, 2010; 26 pages.
Office Action issued in U.S. Appl. No. 12/333,085; Mar. 23, 2010; 5 pages.
Bin et al.; "Component Model Optimization for Distributed Real-Time Embedded Software"; IEEE International Conference on Systems, Man and Cybernetics; Oct. 13, 2004; 6 pages.
Cascallar, Eduardo et al.; "Assessment in the Evaluation of Self-Regulation as a Process"; Educational Psychology Review; vol. 18, No. 3; Sep. 2006; pp. 297-306.
Cool, David W.; "Activity Fund Accounting"; School Business Affairs; vol. 49, No. 6; Jun. 1983; pp. 50-52.
Cox et al.; "A Formal Model for Component Based Software"; IEEE; Aug. 7, 2002; 8 pages.
Ferscha et al.; "A Light-Weight Component Model for Peer-to-Peer Applications"; IEEE; Mar. 23, 2004.
Flissi et al.; "A Component-based Software Infrastructure for Ubiquitous Computing"; IEEE; Jul. 4, 2005.
Gould; "Integrating the Manufacturing Enterprise"; Automative Design & Production; 119, 1; ABI/INFORM Global; Jan. 2007; 3 pages.
Papazoglou et al; "Service-Oriented Computing Research Road Map"; http://infolab.uvt.nl/pub/papazogloump-2006-96.pdf; Mar. 1, 2006; 29 pages.
SAP AG; "SAP NetWeaver Visual Composer: User Guide (SAP NetWeaver Visual Composer release 6.0)"; Document version 1.1; pp. 1-208.
SAP AG; "Powered by SAP NetWeaver Partner Program—Frequently Asked Questions"; May 2005; 10 pages. [online] http://www.lionbridge.com/NR/rdonlyres/4940BE1F/DA46/412E/AB16/F049BD865CA1/0/PBMWFAQ_50070686_en.pdf.
Strelich, Thomas P. et al.; "Simulation-Based Transformation with the Service Integration/Interoperation Infrastructure"; Technology Review Journal; Fall/Winter 2005; pp. 99-115.
Office Action issued in U.S. Appl. No. 11/396,312 on Sep. 10, 2010; 23 pages.
Office Action issued in U.S. Appl. No. 11/322,611 on Sep. 16, 2010; 21 pages.
Notice of Allowance issued in U.S. Appl. No. 11/322,610 on Sep. 23, 2010; 6 pages.
Notice of Allowance issued in U.S. Appl. No. 11/322,610 on Dec. 22, 2010; 6 pages.
Notice of Allowance issued in U.S. Appl. No. 11/322,610 on Mar. 31, 2011; 6 pages.
Office Action issued in U.S. Appl. No. 11/322,772; Jul. 12, 2010; 18 pages.

(56) References Cited

OTHER PUBLICATIONS

Notice of Allowance issued in U.S. Appl. No. 11/322,398 on Jul. 23, 2010; 38 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Sep. 20, 2010; 6 pages.
Notice of Allowance issued in U.S. Appl. No. 1/322,382 on Jan. 6, 2011; 7 pages.
Notice of Allowance issued in U.S. Appl. No. 11/396,259 on Jul. 6, 2010; 6 pages.
Notice of Allowance issued in U.S. Appl. No. 11/396,259 on Oct. 15, 2010; 6 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 ppages.
Notice of Allowance issued in U.S. Appl. No. 11/396,288; Sep. 24, 2010; 4 pages.
Office Action issued in U.S. Appl. No. 11/396,250 on Oct. 18, 2010; 15 pages.
Notice of Allowance issued in U.S. Appl. No. 11/396,250 on Mar. 2, 2011; 13 pages.
Notice of Allowance issued in U.S. Appl. No. 11/396,258 on Jul. 28, 2010; 9 pages.
Notice of Allowance issued in U.S. Appl. No. 11/396,258 on Nov. 16, 2010; 8 pages.
Office Action issued in U.S. Appl. No. 11/396,236 on Oct. 28, 2010; 19 pages.
Office Action issued in U.S. Appl. No. 11/322,845; Jul. 15, 2010; 16 pages.
Notice of Allowance issued in U.S. Appl. No. 11/322,845; Dec. 27, 2010; 16 pages.
Notice of Allowance issued in U.S. Appl. No. 11/322,845; Apr. 8, 2011; 8 pages.
Office Action issued in U.S. Appl. No. 11/323,040 on Nov. 5, 2010; 33 pages.
Supplemental Notice of Allowance issued in U.S. Appl. No. 11/397,026 on Jul. 9, 2010; 4 pages.
Notice of Allowance issued in U.S. Appl. No. 11/397,026 on Jul. 26, 2010; 6 pages.
Notice of Allowance issued in U.S. Appl. No. 11/397,026 on Nov. 15, 2010; 7 pages.
Notice of Allowance issued in U.S. Appl. No. 11/397,026 on Mar. 3, 2011; 6 pages.
Notice of Allowance issued in U.S. Appl. No. 12/233,554 on Sep. 17, 2010; 10 pages.
Notice of Allowance issued in U.S. Appl. No. 12/233,554 on Feb. 22, 2011; 7 pages.
Office Action issued in U.S. Appl. No. 12/233,550 on Jan. 12, 2011; 29 pages.
Notice of Allowance issued in U.S. Appl. No. 11/968,054 on Sep. 7, 2010; 11 pages.
Office Action issued in U.S. Appl. No. 12/233,557 on Sep. 16, 2010; 16 pages.
Office Action issued in U.S. Appl. No. 12/233,557 on Mar. 4, 2011; 19 pages.
Notice of Allowance issued in U.S. Appl. No. 12/233,534 on Oct. 20, 2010; 15 pages.
Notice of Allowance issued in U.S. Appl. No. 12/233,534 on Jan. 31, 2011; 15 pages.
Notice of Allowance issued in U.S. Appl. No. 12/327,354 on Oct. 18, 2010; 16 pages.
Notice of Allowance issued in U.S. Appl. No. 12/327,354 on Feb. 1, 2011; 16 pages.
Notice of Allowance issued in U.S. Appl. No. 11/967,865 on Oct. 6, 2010; 6 pages.
Notice of Allowance issued in U.S. Appl. No. 11/322,482; Jul. 13, 2010; 5 pages.
Office Action issued in U.S. Appl. No. 11/323,634 on Apr. 29, 2011; 8 pages.
Office Action issued in U.S. Appl. No. 11/322,973 on Dec. 7, 2010; 13 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Office Action issued in U.S. Appl. No. 11/967,483 on Aug. 20, 2010; 10 pages.
Office Action issued in U.S. Appl. No. 11/967, 483 on Mar. 4, 2011; 6 pages.
Notice of Allowance issued in U.S. Appl. No. 12/333,085; Sep. 13, 2010; 8 pages.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,393 on Apr. 15, 2011; 12 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=rep1&1type=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 11/322,973 on May 27, 2011; 15 pages.
Office Action issued in U.S. Appl. No. 11/404,147 on Aug. 4, 2011; 26 pages.
Office Action issued in U.S. Appl. No. 12/233,457 on May 26, 2011; 19 pages.
Office Action issued in U.S. Appl. No. 12/327,232 on May 26, 2011; 20 pages.
Office Action issued in U.S. Appl. No. 12/327,590 on Jun. 23, 2011; 16 pages.
Notice of Allowance issued in U.S. Appl. No. 12/233,534 on May 16, 2011; 12 pages.
Notice of Allowanced issued in U.S. Appl. No. 11/322,398 on May 27, 2011; 21 pages.
Notice of Allowance issued in U.S. Appl. No. 11/396,250 on Jun. 24, 2011; 5 pages.
Notice of Allowance issued in U.S. Appl. No. 11/396,258 on Jun. 28, 2011; 9 pages.
Office Action issued in U.S. Appl. No. 11/323,040 on Jul. 26, 2011; 34 pages.
Office Action issued in U.S. Appl. No. 11/967,405 on Apr. 27, 2011; 15 pages.
Office Action issued in U.S. Appl. No. 12/233,489 on May 13, 2011; 15 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Office Action issued in U.S. Appl. No. 12/333,146 on Sep. 6, 2011; 21 pages.

(56) References Cited

OTHER PUBLICATIONS

Notice of Allowance issued in U.S. Appl. No. 11/396,327 on Sep. 28, 2011; 31 pages.
Office Action issued in U.S. Appl. No. 12/233,479 on Oct. 27, 2011; 24 pages.
Office Action issued in U.S. Appl. No. 12/332,965 on Oct. 11, 2011; 6 pages.
Office Action issued in U.S. Appl. No. 12/233,289 on Oct. 27, 2011; 15 pages.
Office Action issued in U.S. Appl. No. 12/327,701 on Nov. 8, 2011; 20 pages.
Office Action issued in U.S. Appl. No. 12/233,087 on Aug. 18, 2011; 42 pages.
Notice of Allowance issued in U.S. Appl. No. 11/322,382 on Jul. 25, 2011; 5 pages.
Office Action issued in U.S. Appl. No. 11/322,383 on May 12, 2010; 23 pages.
Office Action issued in U.S. Appl. No. 11/322,383 on Nov. 12, 2009; 23 pages.
Examiner's Answer to Appeal Brief issued in U.S. Appl. No. 11/396,236 on Nov. 10, 2011; 19 pages.
Notice of Allowance issued in U.S. Appl. No. 11/396,259 on Aug. 5, 2011; 7 pages.
Office Action issued in U.S. Appl. No. 11/396,288 on Oct. 17, 2011; 38 pages.
Office Action issued in U.S. Appl. No. 11/396,252 on Nov. 10, 2011; 18 pages.
Notice of Allowance issued in U.S. Appl. No. 11/322,851 on Sep. 2, 2011; 8 pages.
Notice of Allowance issued in U.S. Appl. No. 11/397,026 on Jul. 20, 2011; 8 pages.
Notice of Allowance issued in U.S. Appl. No. 12/233,417 on Sep. 14, 2011; 11 pages.
Notice of Allowance issued in U.S. Appl. No. 11/968,054 on Aug. 2, 2011; 5 pages.
Office Action issued in U.S. Appl. No. 12/233,458 on Oct. 12, 2011; 19 pages.
Office Action issued in U.S. Appl. No. 11/967,489 on Sep. 28, 2011; 7 pages.
Notice of Allowance issued in U.S. Appl. No. 12/327,354 on Aug. 9, 2011; 13 pages.
Office Action issued in U.S. Appl. No. 11/967,387 on Sep. 8, 2011; 14 pages.
Notice of Allowance issued in U.S. Appl. No. 11/967,890 on Jul. 15, 2011; 7 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
Kremic, Tibor; "Outsourcing Decision Support: A Survey of Benefits, Risks, and Decision Factor"; Supply Chain Management; V. 11; 2006; pp. 467-482.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace & High Technology, ANTE: Abstracts in New Technologies and Engineering; Metdex, Mechanical & Transportation Engineering Abstracts; Date Unknown. p. 1.
Vescovi, Marcos and Hagmann, Christian; "Rules Engine for Enterprise System"; Aerospace & High Technology, ANTE: Abstracts in New Technologies and Engineering; Metadex, Mechanical & Transportation Engineering Abstracts; Date Unknown; p. 1.
Notice of Allowance issued in U.S. Appl. No. 12/233,550 on Jan. 9, 2012; 11 pages.
Office Action issued in U.S. Appl. No. 12/333,146 on Feb. 2, 2012; 21 pages.
Notice of Allowance issued in U.S. Appl. No. 11/323,634 on Jan. 25, 2012; 5 pages.
Notice of Allowance issued in U.S. Appl. No. 12/233,457 on Nov. 3, 2011; 12 pages.
Notice of Allowance issued in U.S. Appl. No. 12/327,232 on Nov. 2, 2011; 16 pages.
Notice of Allowance issued in U.S. Appl. No. 12/327,590 on Dec. 28, 2011; 10 pages.
Notice of Allowance issued in U.S. Appl. No. 12/233,534 won Dec. 28, 2011; 7 pages.
Notice of Allowanced issued in U.S. Appl. No. 11/322,398 on Oct. 18, 2011; 7 pages.
Notice of Allowance issued in U.S. Appl. No. 11/396,250 on Dec. 7, 2011; 6 pages.
Notice of Allowance issued in U.S. Appl. No. 11/396,258 on Feb. 3, 2012; 12 pages.
Notice of Allowance issued in U.S. Appl. No. 11/322,845; Nov. 13, 2011; 9 pages.
Office Action issued in U.S. Appl. No. 11/397,026; Jul. 21, 2009; 28 pages.
Notice of Allowance issued in U.S. Appl. No. 11/397,026 on Nov. 4, 2011; 8 pages.
Notice of Allowance issued in U.S. Appl. No. 12/233,520 on Nov. 10, 2011; 22 pages.
Office Action issued in U.S. Appl. No. 11/967,489 on Feb. 6, 2012; 9 pages.
Notice of Allowance issued in U.S. Appl. No. 11/967,393 on Nov. 9, 2011; 9 pages.
"IDe Partners with Journyx to Offer Customers Best-in-Class Time Management Solution"; PR Newswire; Mar. 8, 2005; Business Dateline.
Meseroll, Robert; "Data Mining Navy Flight"; IEEE Autotestcom 2007; Sep. 2007; pp. 476-481.
"Trakware Systems Inc. Expands Management Team: Leading To-Order Software Provider Adds Experienced Global VP Sales and Marketing to its World-Class Team"; Canada NewsWire; Apr. 9, 2008.
Trappey, Amy; "Design and Analysis of a Rule Based Knowledge"; International Journal of Manufacturing Tech; Dec. 2007; 35,3-4:385-93.
Office Action issued in U.S. Appl. No. 12/233,479 on May 7, 2012; 26 pages.
Notice of Allowance issued in U.S. Appl. No. 12/332,965 on Jun. 11, 2012; 21 pages.
Notice of Allowance issued in U.S. Appl. No. 12/233,289 on Feb. 15, 2012; 11 pages.
Notice of Allowance issued in U.S. Appl. No. 12/327,701 on Apr. 6, 2012; 9 pages.
Notice of Allowance issued in U.S. Appl. No. 12/233,087 on Mar. 30, 2012; 30 pages.
Notice of Allowance issued in U.S. Appl. No. 11/396,259 on Mar. 15, 2012; 7 pages.
Notice of Allowance issued in U.S. Appl. No. 11/322,851 on Mar. 1, 2012; 9 pages.
Notice of Allowance issued in U.S. Appl. No. 11/397,026 on Feb. 23, 2012; 8 pages.
Office Action issued in U.S. Appl. No. 11/967,387 on Apr. 12, 2012; 13 pages.
Office Action issued in U.S. Appl. No. 12/327,737 on Mar. 26, 2012; 14 pages.
Notice of Allowance issued in U.S. Appl. No. 12/233,075 on Mar. 22, 2012; 25 pages.

* cited by examiner

ARCHITECTURAL DESIGN FOR SERVICE REQUEST AND ORDER MANAGEMENT APPLICATION SOFTWARE

BACKGROUND

The subject matter of this patent application relates to computer software architecture, and, more particularly, to the architecture of application software for service request and order management.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

SUMMARY

This specification presents a software architecture design for a software application implementing service request and order management.

In its various aspects, the invention can be implemented as methods, systems, and apparatus, including computer program products, for implementing a software architecture design for a software application implementing service request and order management. The software application is structured as multiple process components interacting with each other through service operations, each implemented for a respective process component. The process components include an Outbound Delivery process component, a Site Logistics Processing process component, an Inventory Processing process component, a Customer Requirement Processing process component, a Supply and Demand Matching process component, a Logistics Execution Control process component, a Service Request Processing process component, a Service Order Processing process component, a Service Confirmation Processing process component, a Customer Invoice Processing process component, an Accounting process component, a Balance of Foreign Payment Management process component, a Due Item Processing process component, a Payment Processing process component, a Pricing Engine process component, an External Tax Calculation process component, a Payment Authorization process component, a Settlement Processing at Clearing House processing component, a Customer Quote Processing process component, a Service Contract Processing process component, and a Financial Accounting Master Data Management processing component.

In its various aspects, the invention can further be implemented as methods, systems, and apparatus, including computer program products, implementing a software architecture design for a software application that is adapted to interact with external software systems through the service operations described in reference to external process components, or a subcombination of them.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

DETAILED DESCRIPTION

Figure 1A:
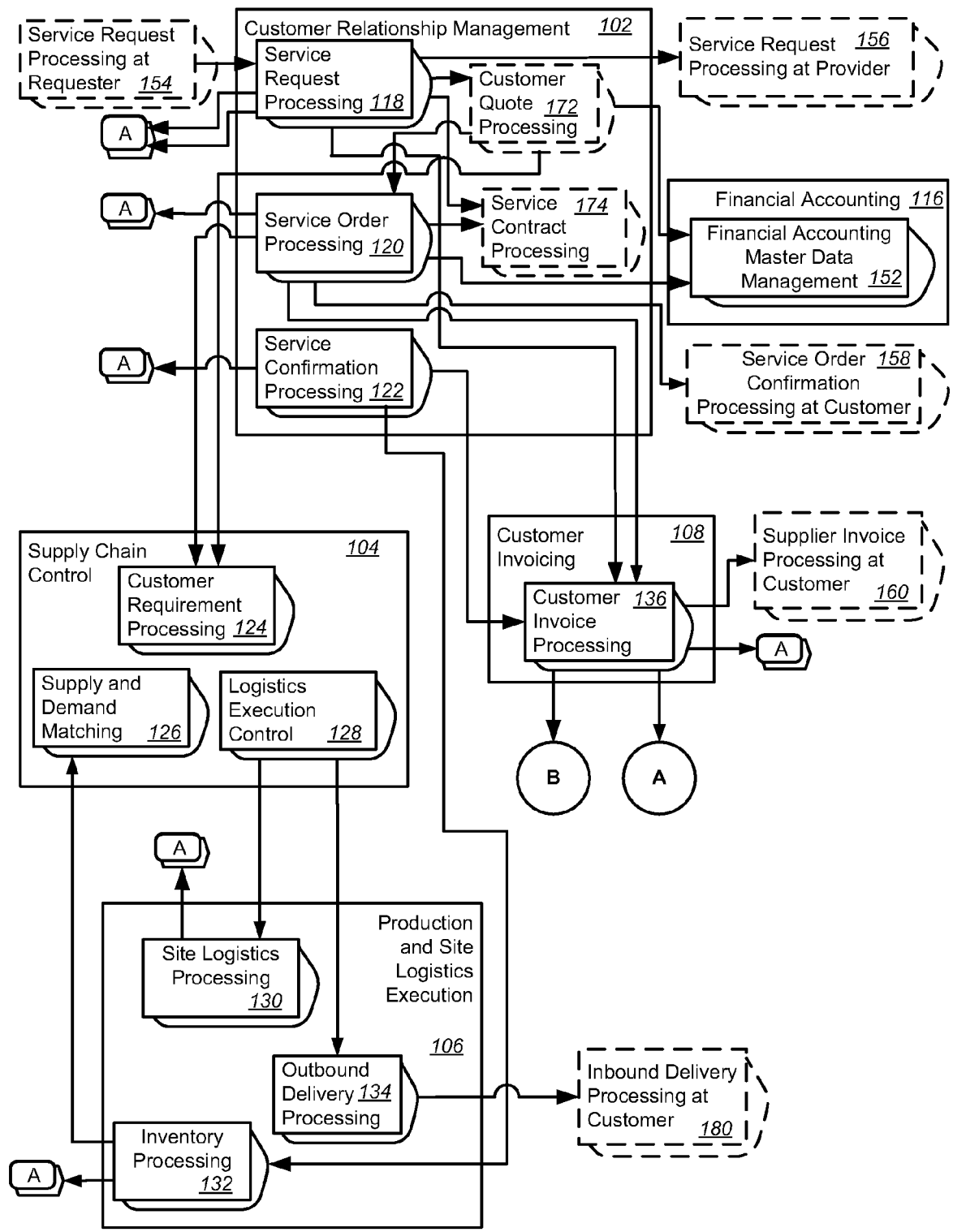
FIGS. 1A and 1B are block diagrams collectively showing a software architectural design for service request and order management software application.
Figure 1B:
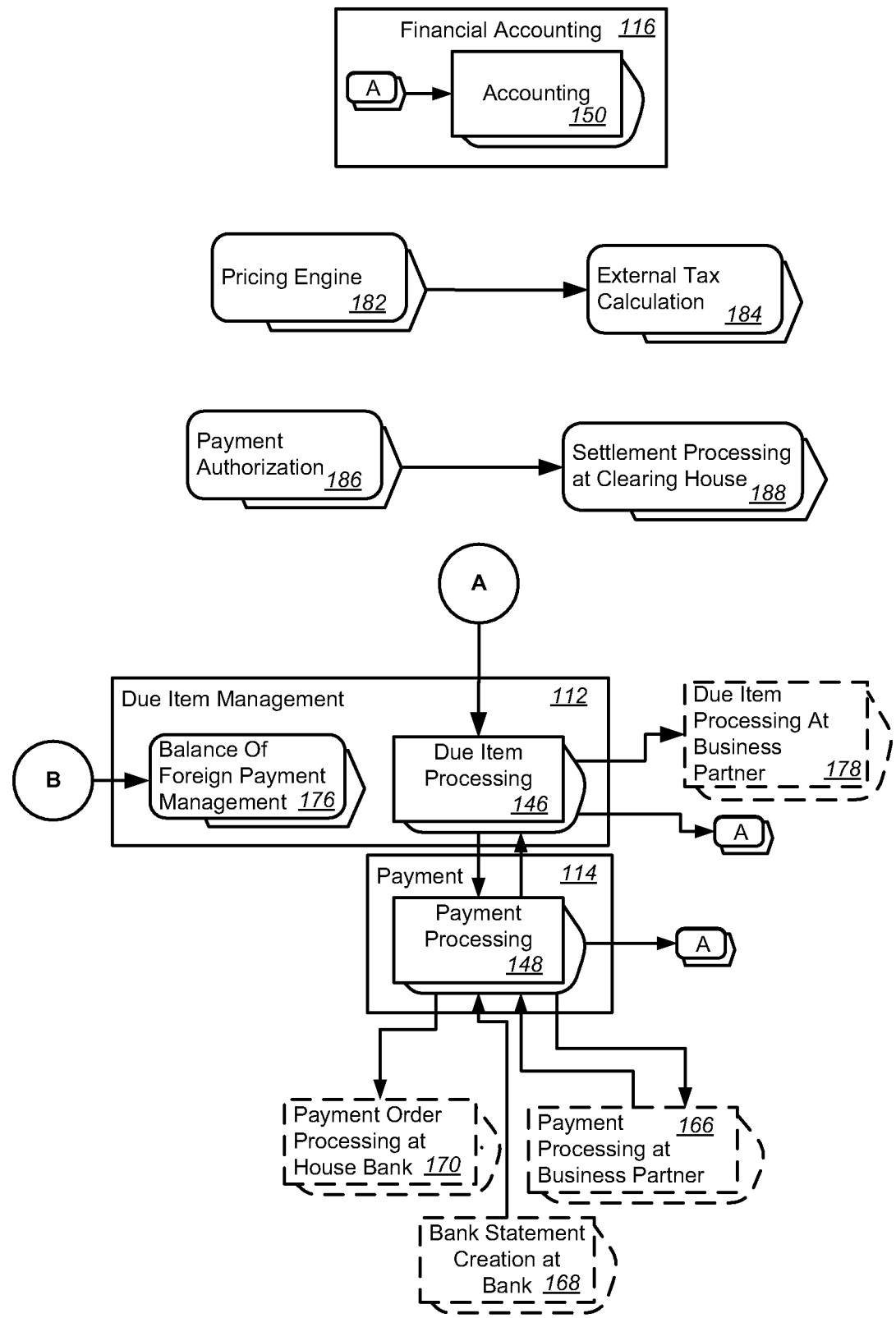

FIGS. 1A and 1B collectively show the software architectural design for a Service Request and Order Management software application. The Service Request and Order Management application is software that implements a provision of assistance and support to customer to solve issues concerning shipped products. For example, the software can include operations for processing service requests, planning and executing service orders, providing required spare parts, and reporting back services rendered. In some embodiments, some or all of the provided services are invoiced, and customer payments are monitored. For example, the software may update an accounting process during an execution of the software.

As shown in FIGS. 1A and 1B, the Service Request and Order Management design includes a Customer Relationship Management deployment unit 102, a Supply Chain Control deployment unit 104, a Production and Site Logistics Execution deployment unit 106, a Customer Invoicing deployment unit 108, a Due Item Management deployment unit 112, a Payment deployment unit 114, and a Financial Accounting deployment unit 116.

The Customer Relationship Management deployment unit 102 includes a Service Request Processing process component 118, a Service Order Processing process component 120, a Customer Quote Processing process component 172, a Service Contract Processing process component 174, and a Service Confirmation Processing process component 122. The Service Request Processing process component 118 is used to log and resolve service requests concerning issues that customers have, for example, with regard to products. The Service Order Processing process component 120 creates, plans, and fulfills service orders, for example, to be executed by a service engineer at customer site for an agreed price. The Service Confirmation Processing process component 122 reports back times and quantities consumed for providing requested services. Additionally, the Service Confirmation Processing process component 122 can also report back quantity of spare parts consumed related to the execution of a service order.

The Customer Quote Processing process component 172 handles the processing of quotes to customers offering the delivery of goods according to specific terms. The Service Contract Processing process component 174 handles the maintenance of contractual agreements that are concluded between service providers and customers for specific time periods. They can serve as a basis for processing service requests and service orders in a customer service and support environment. In service contracts it is possible to specify the type and scope of services that are provided to the customer, as well as particular service levels. The agreements that have been made in the service contract can be invoiced to the customer. Revenues from the contract and costs incurred from services delivered with reference to the contract can be collected in financial accounting.

The Supply Chain Control deployment unit 104 includes a Customer Requirement Processing process component 124, a Supply and Demand Matching process component 126, and a Logistics Execution Control process component 128.

The Customer Requirement Processing process component 124 handles customer requirements in the supply chain. This involves checking material availability, receiving, preparing, and passing customer requirements on to supply planning and logistics, and providing feedback on fulfillment. The Supply and Demand Matching process component 126 manages tasks to ensure that sufficient material receipt elements exist to cover material demanded, while taking into account available capacity. The Logistics Execution Control process component 128 creates, controls, and monitors the supply chain execution activities for fulfilling an order. In some embodiments, the Logistics Execution Control process component 128 can trigger some site logistics activities and can receive information about the supply chain execution progress.

The Production and Site Logistics Execution deployment unit 106 includes a Site Logistics Processing process component 130, an Inventory Processing process component 132, and an Outbound Delivery Processing process component 134. The Site Logistics Processing process component 130 prepares, executes, and confirms logistics processes in a warehouse environment. Logistics processes, based on site logistics process models, can include picking, packing, shipping, receiving as well as value added services. The Inventory Processing process component 132 manages inventory and records inventory changes. In some embodiments, the Inventory Processing process component 132 can provide services to maintain current stock, content and structure of logistic units and allocations. The Outbound Delivery Processing process component 134 manages and processes outbound delivery requirements for shipping goods to a product recipient. In some embodiments, the Outbound Delivery Processing process component 134 can combine tasks for the outbound delivery process, and enable communication with the originating document (e.g., a fulfillment process), the product recipient, and invoicing.

The Customer Invoicing deployment unit 108 includes a Customer Invoice Processing process component 136. The Customer Invoice Processing process component 136 sends invoices to customers for delivery of goods and services.

The Production and Site Logistics Execution deployment unit 106 includes a Site Logistics Processing process component 130, an Outbound Delivery Processing process component 134 and an Inventory Processing process component 132. The Site Logistics Processing process component 130 handles the preparation, physical execution, and confirmation of logistics processes within a site. In some embodiments, logistics processes, which cam be based on site logistics process models, can include picking, packing, shipping, and receiving, as well as value added services. The Outbound Delivery Processing process component 134 handles the management and processing of outbound delivery requirements for shipping goods to a product recipient. In some embodiments, the process component 134 can combine all document-based tasks for an outbound delivery process, and can enable communication with an originating document (i.e., fulfillment), a product recipient, and invoicing. The Inventory Processing process component 132 handles the management of inventory and recording of inventory changes. In some embodiments, the process component 132 can provide services to maintain current stock, content and structure of logistic units and allocations.

The Customer Invoicing deployment unit 108 includes a Customer Invoice Processing process component 136. The Customer Invoice Processing process component 136 handles the invoicing of customers for the delivery of goods or the provision of services.

The Due Item Management deployment unit 112 includes a Balance Of Foreign Payment Management processing component 176 and a Due Item Processing process component 146. The Balance Of Foreign Payment Management processing component 176 handles the collection, processing, and reporting of receivables and payables according to foreign trade regulations that may be required by the central banks to create the balance of payments of a country. The Due Item Processing process component 146 handles the collection, management, and monitoring of trade receivables or payables and corresponding sales tax or withholding tax.

The Payment deployment unit 114 includes a Payment Processing process component 148. The Payment Processing process component 148 handles the processing and management of all payments. In some embodiments, the process component 148 can also handle associated communication with financial institutions, for example, banks, and can provide the primary input for liquidity management.

A Pricing Engine process component 182 handles the processing of price and tax calculation. An External Tax Calculation process component 184 handles tax calculations performed by third party software. A Payment Authorization process component 186 manages a reusable service that can be used to process an authorization request for a payment made using a payment card, at a clearing house. In some embodiments, for example, the process component 186 can authorize payment for goods or services purchased from an online store using a credit card. A Settlement Processing at Clearing House process component 188 handles settlement at the clearing house.

The Financial Accounting deployment unit 116 includes an Accounting process component 150 and a Financial Accounting Master Data Management process component 152. The Accounting process component 150 represents relevant business transactions for valuation and profitability analysis. The Financial Accounting Master Data Management process component 152 manages financial accounting master data that is used both for accounting and costing purposes.

A number of external process components, described below, will be used to describe the architectural design. These include: a Service Request Processing at Requester process component 154, a Service Request Processing at Provider process component 156, a Service Order Confirmation Processing at Customer process component 158, a Supplier Invoice Processing at Customer process component 160, an Inbound Delivery Processing at Customer process component 180, a Payment Processing at Business Partner process component 166, a Bank Statement Creation at Bank process component 168, a Payment Order processing at House Bank process component 170, and a Due Item Processing At Business Partner process component 178.

The Service Request Processing at Requester process component 154 handles creating or updating a service request that is triggered externally from a requester. In some embodiments, the service request can be maintained according to the data replicated from the external request. Confirmations of the information exchange as well as updates on processing progress can be provided back to the requester. The Service Request Processing at Provider process component 156 handles a service request forwarded to a service provider for external processing. In some embodiments, information about the creation and/or update of the service request can be replicated to an external system. Confirmations of the information exchange as well as updates on processing progress can be provided back to the service request. The Service Order Confirmation Processing at Customer process component 158 confirms service order processing at a customer site.

The Supplier Invoice Processing at Customer process component 160 handles information related to supplier invoice processing at the customer's side related to the creation or cancellation of a customer invoice from customer invoice processing. In some embodiments, the information can be sent either via xml or form message output. The Inbound Delivery Processing at Customer process component 180 handles notifications about expected deliveries.

Figure 2:
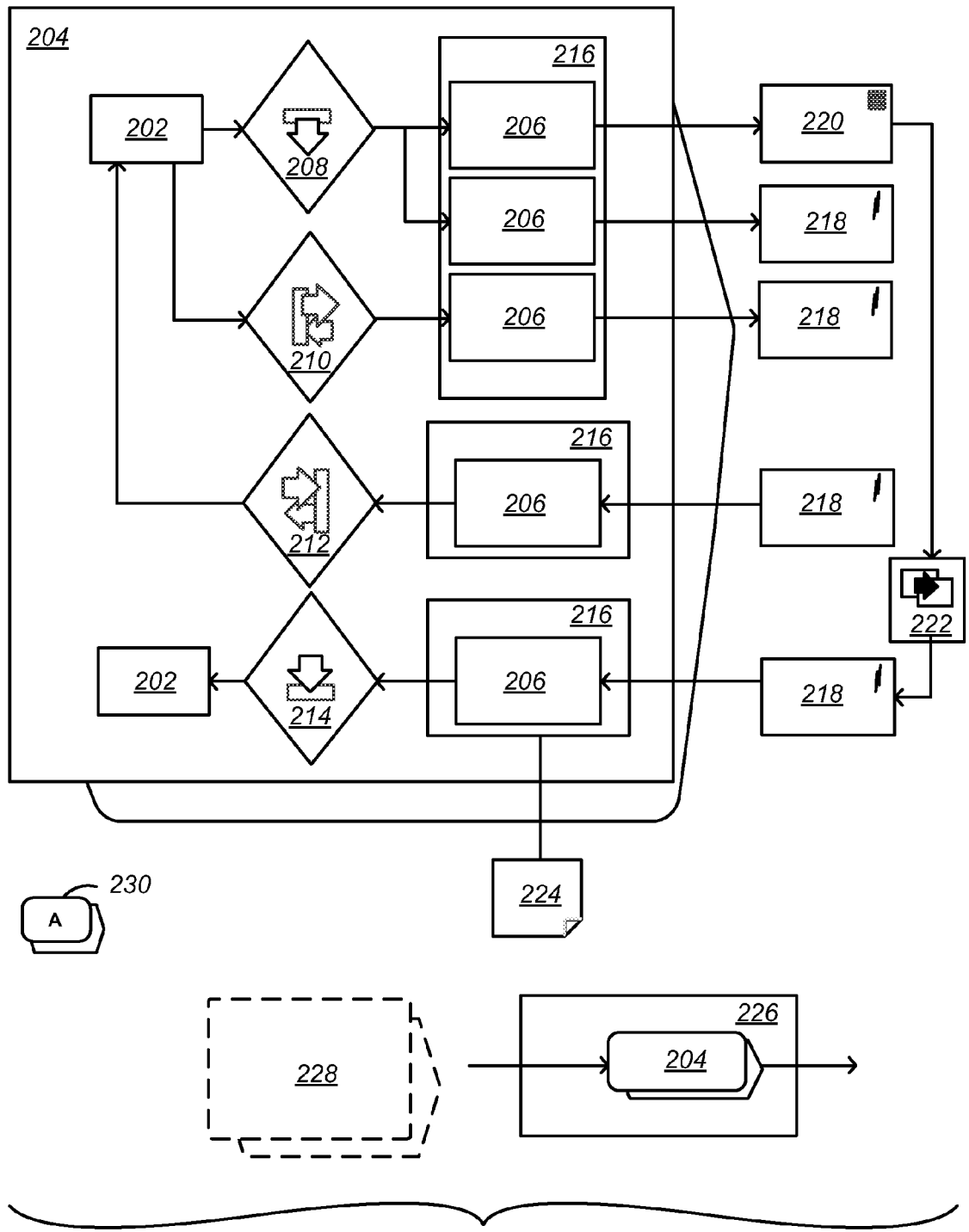
FIG. 2 illustrates the elements of the architecture as they are drawn in the figures.

FIG. 2 illustrates the elements of the architecture as they are drawn in the figures of this patent application. The elements of the architecture include the business object 202, the process component 204, the operation 206, the outbound process agent 208, the synchronous outbound process agent 210, the synchronous inbound process agent 212, the inbound process agent 214, the service interface or interface 216, the message 218, the form message 220, the mapping entity 222, the communication channel template 224, and the deployment unit 226.

Not explicitly represented in the figures is a foundation layer that contains all fundamental entities that are used in multiple deployment units 226. These entities can be process components, business objects and reuse service components. A reuse service component is a piece of software that is reused in different transactions. A reuse service component is used by its defined interfaces, which can be, e.g., local APIs (Application Programming Interfaces) or service interfaces.

A process component of an external system is drawn as a dashed-line process component 228. Such a process component 228 represents the external system in describing interactions with the external system; however, the process component 228 need not represent more of the external system than is needed to produce and receive messages as required by the process component that interacts with the external system.

The connector icon 230 is used to simplify the drawing of interactions between process components 204. Interactions between process component pairs 204 involving their respective business objects 202, process agents (at 208, 210, 212, and 214), operations 206, interfaces 216, and messages (at 218 and 22) are described as process component interactions, which determine the interactions of a pair of process components across a deployment unit boundary, i.e., from one deployment unit 226 to another deployment unit 226. Interactions between process components 204 are indicated in FIGS. 1A and 1B by directed lines (arrows). Interactions between process components within a deployment unit need not be described except to note that they exist, as these interactions are not constrained by the architectural design and can be implemented in any convenient fashion. Interactions between process components that cross a deployment unit boundary will be illustrated by the figures of this patent application; these figures will show the relevant elements associated with potential interaction between two process components 204, but interfaces 216, process agents (at 208, 210, 212, and 214), and business objects 202 that are not relevant to the potential interaction will not be shown.

The architectural design is a specification of a computer software application, and elements of the architectural design can be implemented to realize a software application that implements the end-to-end process mentioned earlier. The elements of the architecture are at times described in this specification as being contained or included in other elements; for example, a process component 204 is described as being contained in a deployment unit 226. It should be understood, however, that such operational inclusion can be realized in a variety of ways and is not limited to a physical inclusion of the entirety of one element in another.

The architectural elements include the business object 202. A business object 202 is a representation of a type of a uniquely identifiable business entity (an object instance) described by a structural model. Processes operate on business objects. This example business object represents a specific view on some well-defined business content. A business object represents content, which a typical business user would expect and understand with little explanation. Business objects are further categorized as business process objects and master data objects. A master data object is an object that encapsulates master data (i.e., data that is valid for a period of time). A business process object, which is the kind of business object generally found in a process component 204, is an object that encapsulates transactional data (i.e., data that is valid for a point in time). The term business object will be used generically to refer to a business process object and a master data object, unless the context requires otherwise. Properly implemented, business objects 202 are implemented free of redundancies.

The architectural elements also include the process component 204. A process component 204 is a software package that realizes a business process and generally exposes its functionality as services. The functionality includes the ability to perform all or parts of particular kinds of business transactions. A process component 204 contains one or more semantically related business objects 202. Any business object belongs to no more than one process component. Process components can be categorized as a standard process component, a process component at a business partner, a third party process component, or a user centric process component. The standard process component (named simply process component) is a software package that realizes a business process and exposes its functionality as services. The process component at a business partner is a placeholder for a process component (or other technology that performs the essential functions of the process component) used at a business partner. The third party process component is a process component (or other technology that performs the essential functions of the process component) provided by a third party. The user centric process component is a process component containing user interface parts.

Process components 204 are modular and context-independent. That they are context-independent means that a process component 204 is not specific to any specific application and is reusable. The process component 204 is often the smallest (most granular) element of reuse in the architecture.

The architectural elements also include the operation 206. An operation 206 belongs to exactly one process component 204. A process component 204 generally is able to perform multiple operations 206. Operations 206 can be synchronous or asynchronous, corresponding to synchronous or asynchronous process agents (e.g. at 208, 210, 212, and 214), which will be described below. Operation 206 may be the smallest, separately-callable function, described by a set of data types used as input, output, and fault parameters serving as a signature.

The architectural elements also include the service interface 216, referred to simply as the interface. An interface 216 is a named group of operations 206. Interface 216 typically specifies inbound service interface functionality or outbound service interface functionality. Each operation 206 belongs to exactly one interface 216. An interface 216 belongs to exactly one process component 204. A process component 204 might contain multiple interfaces 216. In some implementations, an interface contains only inbound or outbound operations, but not a mixture of both. One interface can contain both synchronous and asynchronous operations. All operations of the same type (either inbound or outbound) which belong to the same message choreography will belong to the same interface. Thus, generally, all outbound operations 206 directed to the same other process component 204 are in one interface 216.

The architectural elements also include the message 218. Operations 206 transmit and receive messages 218. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component. In some implementations, the message is a form based message 220 that can be translated into a recognized format for an external process component 228. The form message type 220 is a message type used for documents structured in forms. The form message type 220 can be used for printing, faxing, emailing, or other events using documents structured in forms. In some implementations, the form message type 220 provides an extended signature relative to the normal message type. For example, the form message type 220 can include text information in addition to identification information to improve human reading.

The architectural elements also include the process agent (e.g. at 208, 210, 212, and 214). Process agents do business processing that involves the sending or receiving of messages 218. Each operation 206 will generally have at least one associated process agent. The process agent can be associated with one or more operations 206. Process agents (at 208, 210, 212, and 214) can be either inbound or outbound, and either synchronous or asynchronous.

Asynchronous outbound process agents 208 are called after a business object 202 changes, e.g., after a create, update, or delete of a business object instance. Synchronous outbound process agents 210 are generally triggered directly by a business object 202.

An outbound process agent (208 and 210) will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents (212 and 214) are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents (210 and 212) are used when a process component requires a more or less immediate response from another process component, and is waiting for that response to continue its work.

Operations and process components are described in this specification in terms of process agents. However, in alternative implementations, process components and operations can be implemented without use of agents by using other conventional techniques to perform the functions described in this specification.

The architectural elements also include the communication channel template. The communication channel template is a modeling entity that represents a set of technical settings used for communication. The technical settings can include details for inbound or outbound processing of a message. The details can be defined in the communication channel template. In particular, the communication channel template defines an adapter type, a transport protocol, and a message protocol. In some implementations, various other parameters may be defined based on a selected adapter type. For example, the communication channel template can define a security level, conversion parameters, default exchange infrastructure parameters, processing parameters, download URI parameters, and specific message properties.

The communication channel template 224 can interact with internal or external process components (at 204 and 228). To interact with an internal process component, the communication channel template is received and uploaded to be used with an operation and interface pair. To interact with an external process component, the communication channel template is received and uploaded to be used with an external entity, such as an external bank, business partner, or supplier.

The architectural elements also include the deployment unit 226. A deployment unit 226 includes one or more process components 204 that are deployed together on a single computer system platform. Conversely, separate deployment units can be deployed on separate physical computing systems. For this reason, a boundary of a deployment unit 226 defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components 204 of one instance of one deployment unit 226.

The process components 204 of one deployment unit 226 interact with those of another deployment unit 226 using messages 218 passed through one or more data communication networks or other suitable communication channels. Thus, a deployment unit 226 deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units 226 is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interaction within other deployment units. Similarly, process components 204 that interact with other process components 204 or external systems only through messages 218, e.g., as sent and received by operations 206, can also be replaced as long as the replacement supports the operations 206 of the original 204.

In contrast to a deployment unit 226, the foundation layer does not define a limit for application-defined transactions. Deployment units 226 communicate directly with entities in the foundation layer, which communication is typically not message based. The foundation layer is active in every system instance on which the application is deployed. Business objects 202 in the foundation layer will generally be master data objects. In addition, the foundation layer will include some business process objects that are used by multiple deployment units 226. Master data objects and business process objects that should be specific to a deployment unit 226 are assigned to their respective deployment unit 226.

Interactions between Process Components "Service Confirmation Processing" and "Inventory Processing"

Figure 3:
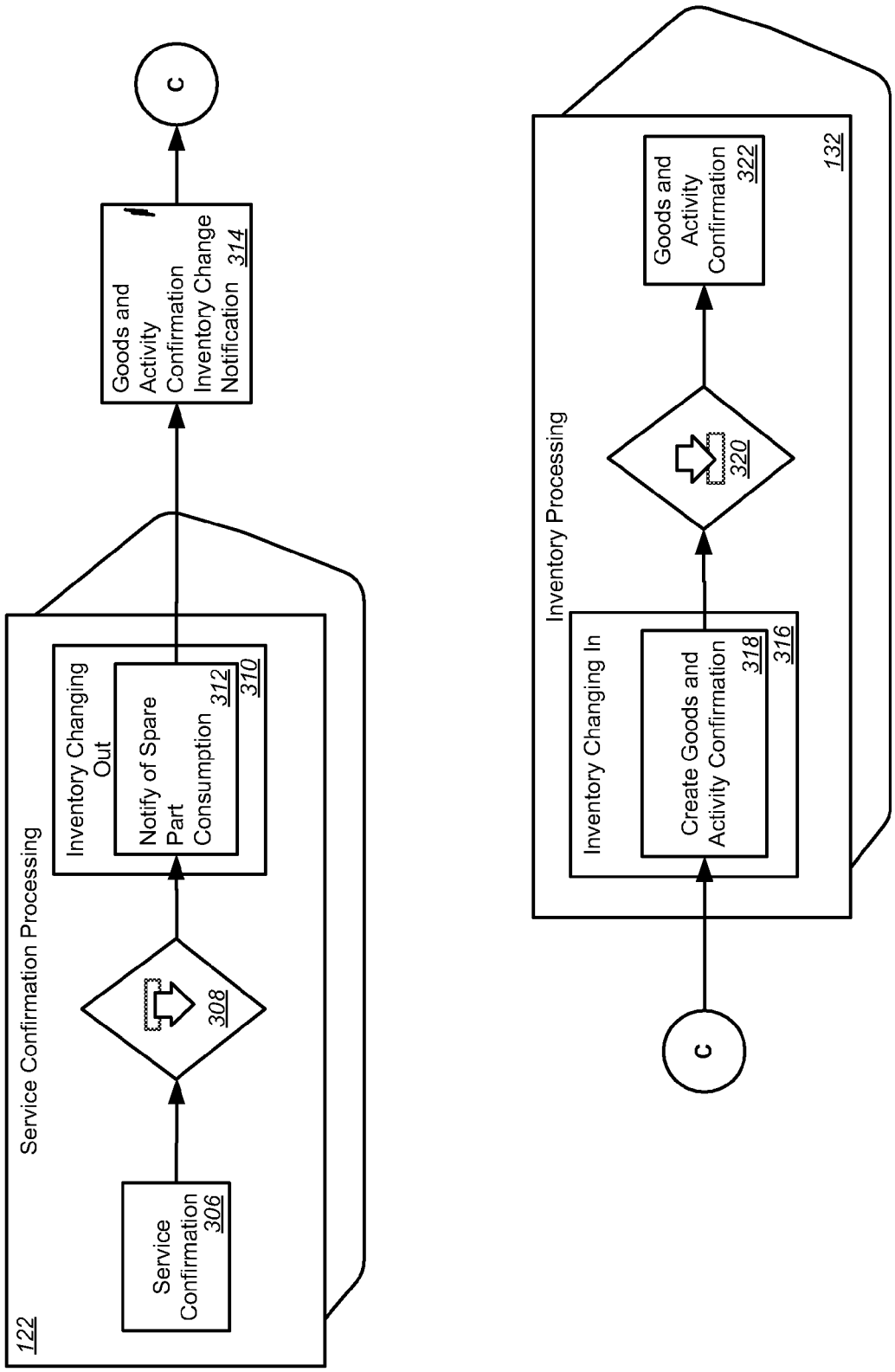
FIG. 3 is a block diagram showing interactions between a Service Confirmation Processing process component and an Inventory Processing process component.

FIG. 3 is a block diagram showing interactions between the Service Confirmation Processing process component 122 and the Inventory Processing process component 132 in the architectural design of FIGS. 1A and 1B.

As shown in FIG. 3, the Service Confirmation Processing process component 122 includes a Service Confirmation business object 306. The Service Confirmation business object 306 represents a record of services and spare parts that a service technician reports back after performing a service for a customer. The Service Confirmation business object 306 uses a Notify of Spare Part Consumption from Service Confirmation to Inventory Processing outbound process agent 308 to invoke a Notify of Spare Part Consumption operation 312. The operation 312 is included in an Inventory Changing Out interface 310. The Notify of Spare Part Consumption operation 312 notifies the Inventory Processing process component 132 about consumption of spare parts. The Notify of Spare Part Consumption operation 312 generates a Goods and Activity Confirmation Inventory Change Notification message 314 and sends the message to the Inventory Processing process component 132.

The Inventory Processing process component 132 receives the Goods and Activity Confirmation Inventory Change Notification message 314. The message 314 is handled in a Create Goods and Activity Confirmation operation 318. The operation 318 is included in an Inventory Changing In interface 316. The Create Goods and Activity Confirmation operation 318 creates a confirmation for goods and activities. The operation 318 uses a Maintain Goods and Activity Confirmation inbound process agent 320 to update a Goods and Activity Confirmation business object 322. The Goods and Activity Confirmation business object 322 represents a record of confirmed inventory changes that occurred at a specific time.

Interactions between Process Components "Service Confirmation Processing" and "Accounting"

Figure 4:
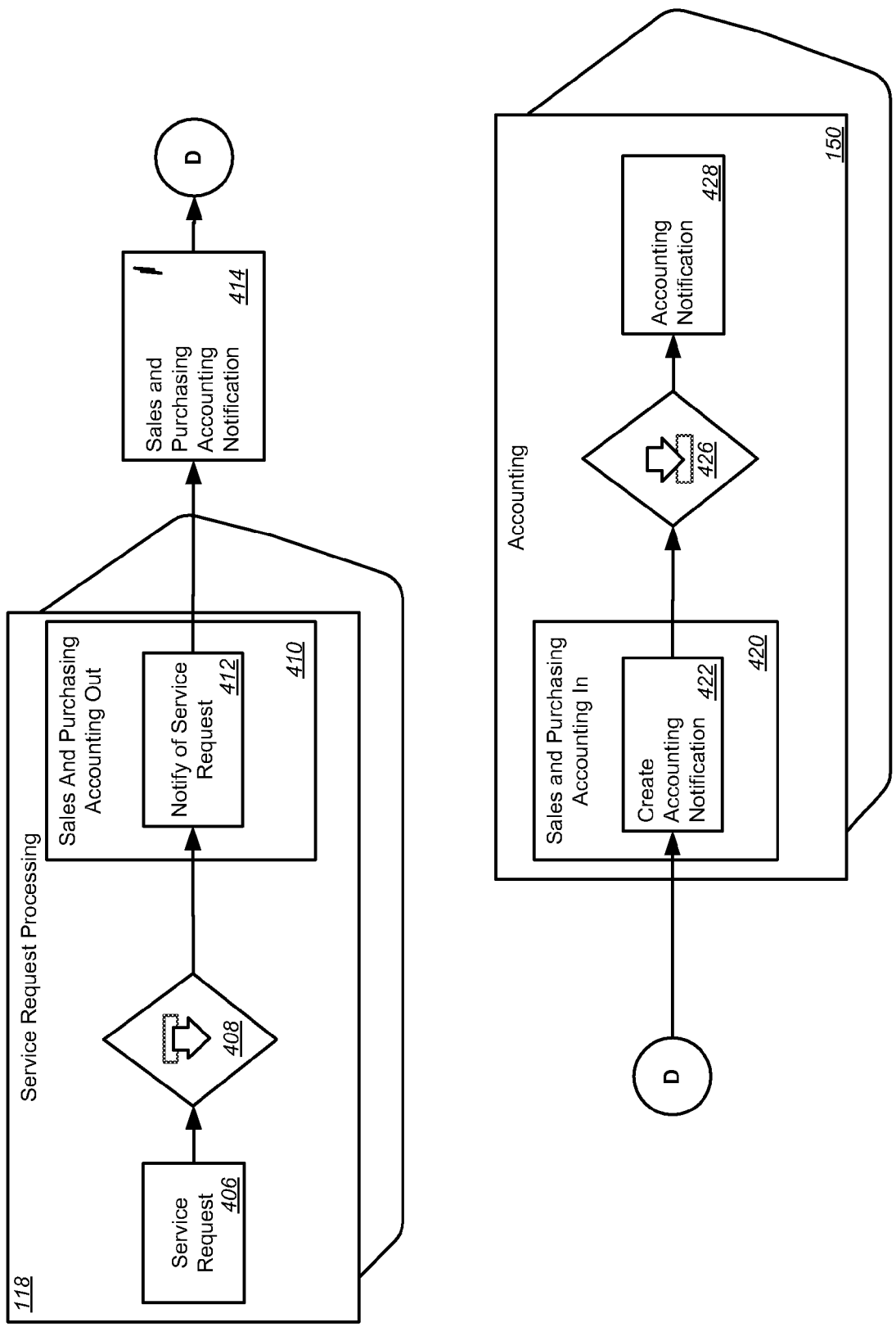
FIG. 4 is a block diagram showing interactions between a Service Request Processing process component and an Accounting process component.

FIG. 4 is a block diagram showing interactions between the Service Request Processing process component 118 and the Accounting process component 150 in the architectural design of FIGS. 1A and 1B. The interaction starts when a service request is created or updated. The Service Request Processing process component 118 requests the creation or update of a subledger account (based on sales) from the Accounting process component 150. The interaction can also start when a service provision is created or cancelled. The Service Request Processing process component 118 requests the creation or cancellation of accounting documents from the Accounting process component 150.

As shown in FIG. 4, the Service Confirmation Processing process component 122 includes a Service Request business object 406. The Service Request business object 406 uses a Notify of Service Request to Accounting outbound process agent 408 to invoke a Notify of Service Request operation 412. The Notify of Service Request operation 412 notifies the Accounting process component 150 that a service request has been processed. The Notify of Service Request operation 412 is included in a Sales And Purchasing Accounting Out interface 410.

The Notify of Service Request operation 412 generates a Sales And Purchasing Accounting Notification message 416. The message 416 is received in the Accounting process component 150 where it is handled by a Create Accounting Notification operation 422. The Create Accounting Notification operation 422 receives order accounting notification from the Service Confirmation Processing process component 122, the Service Contract Processing process component 174, the Service Request Processing process component 118, the Service Order Processing process component 120, a Purchase Order Processing process component, and a Sales Order Processing process component. The notification informs an Accounting Notification business object 428 about the creation, change or deletion of any kind of order business objects. The Create Accounting Notification operation 422 is included in a Sales And Purchasing Accounting In interface 420.

The Create Accounting Notification operation 422 uses a Maintain Subledger Account based on Sales And Purchasing inbound process agent 426 to update an Accounting Notification business object 428. The Accounting Notification business object 428 represents a notification sent to Financial Accounting by an operational component regarding a business transaction. It represents the operational business transaction in a standardized form for all business transaction documents, and includes data needed to valuate the business transaction.

Interactions between Process Components "Service Confirmation Processing" and "Customer Invoice Processing"

Figure 5:
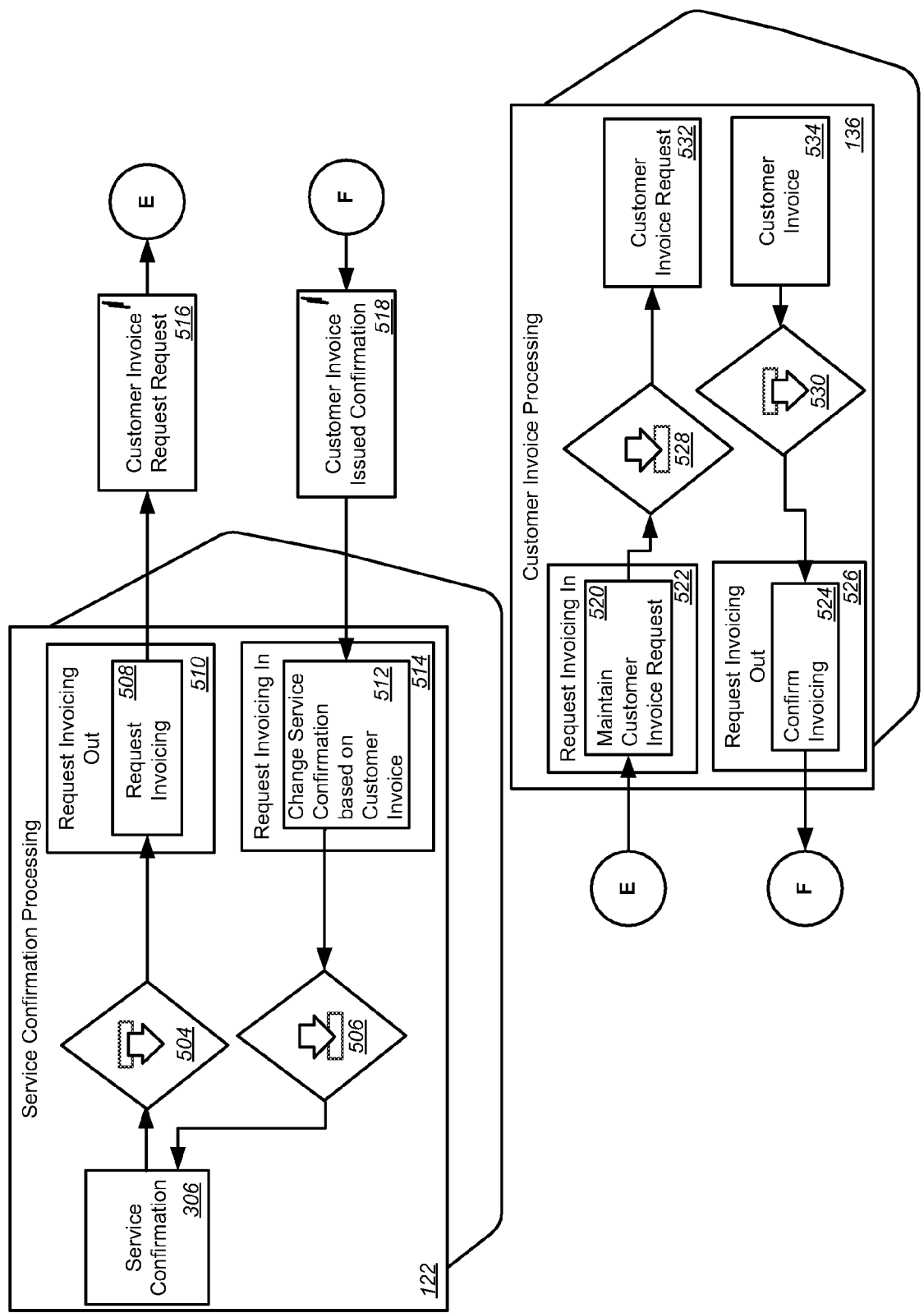
FIG. 5 is a block diagram showing interactions between the Service Confirmation Processing process component and a Customer Invoice Processing process component.

FIG. 5 is a block diagram showing interactions between the Service Confirmation Processing process component 133 and the Customer Invoice Processing process component 136 in the architectural design of FIGS. 1A and 1B. The Service Confirmation Processing process component 122 requests the creation, update or cancellation of invoices from Customer Invoice Processing process component 136. The Customer Invoice Processing process component 136 confirms the performed action to the requestor.

As shown in FIG. 5, the Service Confirmation Processing process component 122 includes the Service Confirmation business object 306. The Service Confirmation business object 306 represents a record of services and spare parts that a service technician reports back after performing a service for a customer. The Service Confirmation business object 306 uses a Request Invoicing from Service Confirmation to Customer Invoice Processing outbound process agent 504 to invoke a Request Invoicing operation 508. The operation 508 requests invoicing of services provided and spare parts consumed based on information in the service confirmation. The Request Invoicing operation 508 is included in a Request Invoicing Out interface 510. The Request Invoicing operation 508 sends a Customer Invoice Request Request message 516 to the Customer Invoice Processing process component 136.

A Maintain Customer Invoice Request operation 520 receives the message 516. The Maintain Customer Invoice Request operation 520 creates, updates, or cancels a customer invoice request. The operation 520 is included in a Request Invoicing In interface 522. The Maintain Customer Invoice Request operation 520 uses a Maintain Customer Invoice Request inbound process agent 528 to update a Customer Invoice Request business object 532. The Customer Invoice Request business object 532 represents a request to create one or several customer invoices, or to take account of the data for the underlying business document when creating a customer invoice.

A Customer Invoice business object 534 uses a Confirm Customer Invoice to Service Confirmation Processing outbound process agent 530 to invoke a Confirm Invoicing operation 524. The Customer Invoice business object 534 represents a binding statement of amounts receivable resulting, for example, from deliveries to a customer, services performed for a customer, adjustments to these receivables, or credit memos to a customer. The Confirm Invoicing operation 524 confirms that invoicing has taken place. The Confirm Invoicing operation 524 is included in a Request Invoicing Out interface 526. The operation 524 sends a Customer Invoice Issued Confirmation message 518 to the Service Confirmation Processing process component 133.

A Change Service Confirmation based on Customer Invoice operation 512 receives the Customer Invoice Issued Confirmation message 518. The Change Service Confirmation based on Customer Invoice operation 512 is included in a Request Invoicing In interface 514. The Change Service Confirmation based on Customer Invoice operation 512 updates a service confirmation based on information from related customer invoices. The operation 512 uses a Change Service Confirmation based on Customer Invoice inbound process agent 506 to update the Service Confirmation business object 306.

Interactions between Process Components "Service Order Processing" and "Service Order Confirmation Processing at Customer"

Figure 6:
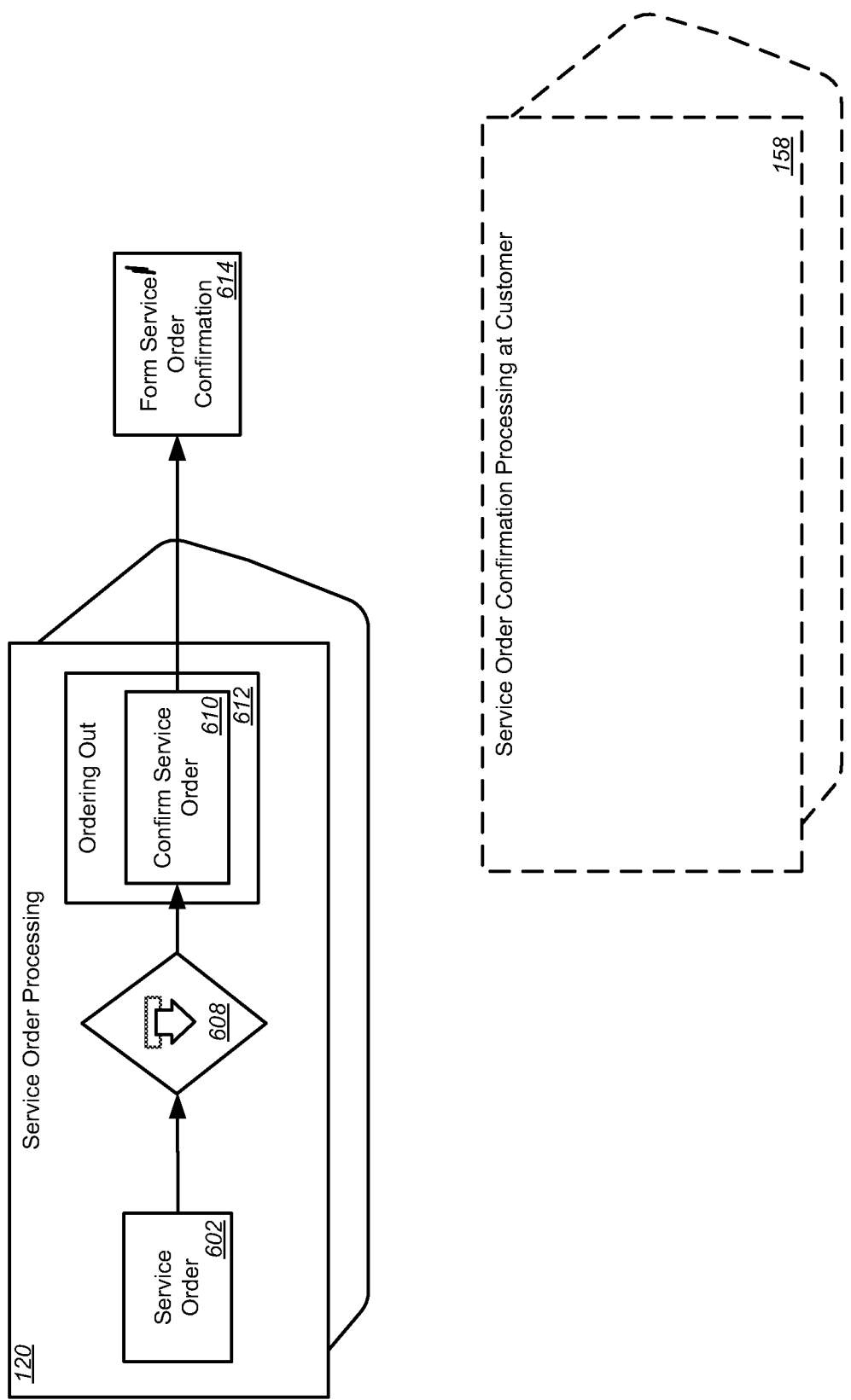
FIG. 6 is a block diagram showing interactions between a Service Order Processing process component and a Service Order Confirmation Processing at Customer process component.

FIG. 6 is a block diagram showing interactions between the Service Order Processing process component 120 and the Service Order Confirmation Processing at Customer process component 158 in the architectural design of FIGS. 1A and 1B.

As shown in FIG. 6, the Service Order Processing process component 120 includes a Service Order business object 602. The Service Order business object 602 represents an agreement between a service provider and a customer about the execution of services at a specific time and for a specific price. The Service Order business object 602 can also include planning for personnel, spare parts, and other expenses for providing the services.

The Service Order business object 602 uses a Confirm Service Order to Customer outbound process agent 608 to invoke a Confirm Service Order operation 610. The operation 610 confirms to the customer that a service order has been processed. The Confirm Service Order operation 610 is included in an Ordering Out interface 612. The operation 610 generates a Form Service Order Confirmation message 614 and sends it to the Service Order Confirmation Processing at Customer process component 158.

Interactions between Process Components "Logistics Execution Control" and "Site Logistics Processing"

Figure 7:
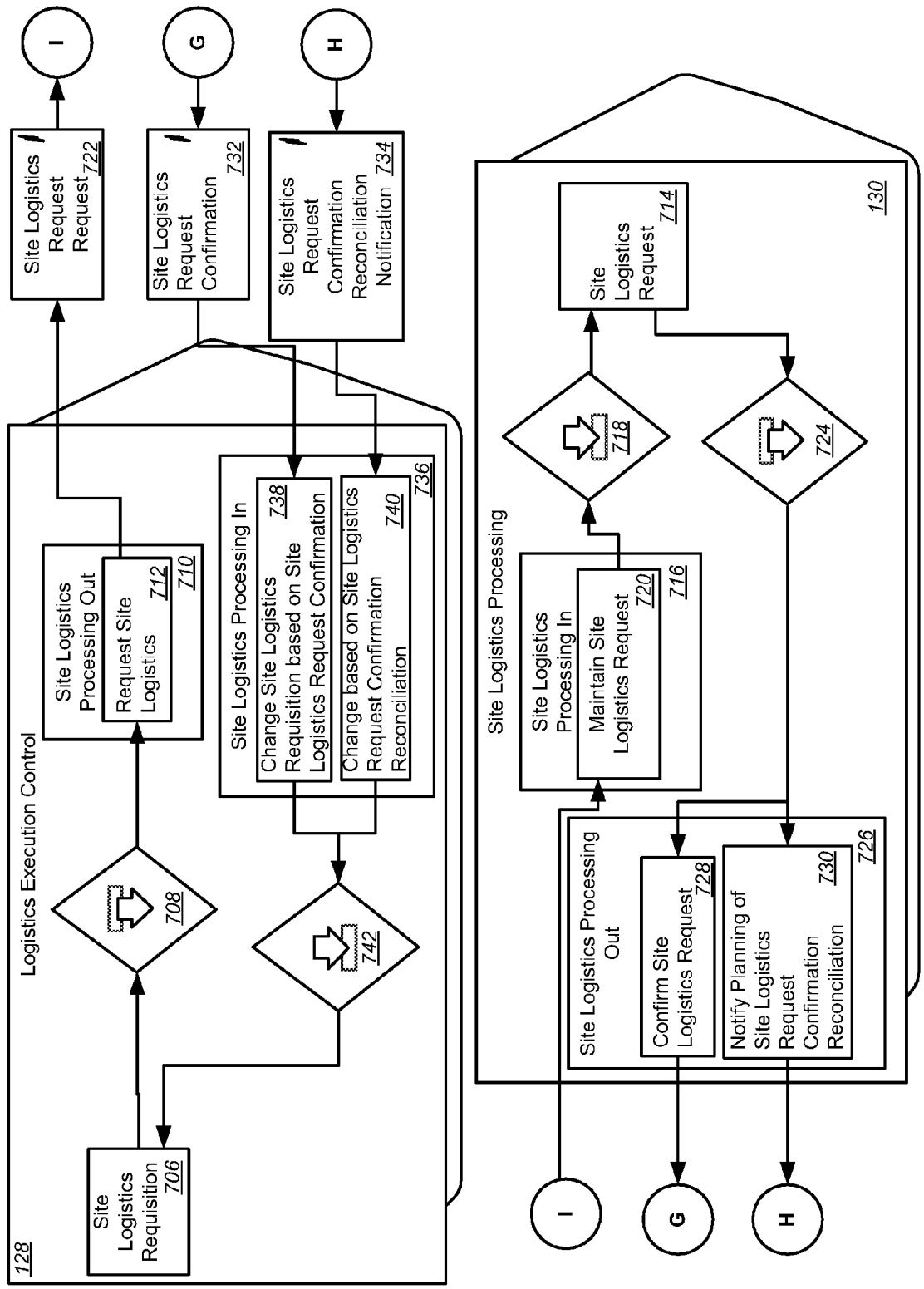
FIG. 7 is a block diagram showing interactions between a Logistics Execution Control process component and a Site Logistics Processing process component.

FIG. 7 is a block diagram showing interactions between the Logistics Execution Control process component 128 and the Site Logistics Processing process component 130 in the architectural design of FIGS. 1A and 1B. The interactions start when a site logistics requisition is created, changed, or cancelled. Supply chain control requests the creation, update, or cancellation of a site logistics request from the Site Logistics Processing process component 130. The Site Logistics Processing process component 130 confirms the performed action to the requestor and notifies the requestor of the progress of the request.

As shown in FIG. 7, the Logistics Execution Control process component 128 includes a Site Logistics Requisition business object 706. The Site Logistics Requisition business object 706 represents a request to logistics execution to execute a site logistics process for a certain quantity of material, by a certain time.

The business object 706 uses a Request Site Logistics Processing from Site Log Request to Site Logistics Processing outbound process agent 708 to invoke a Request Site Logistics operation 712. The operation 712 is included in a Site Logistics Processing Out interface 710. The Request Site Logistics operation 712 generates a Site Logistics Request Request message 722. The Request Site Logistics operation 712 requests the creation, updating, or deletion of a site logistics request. The Site Logistics Request Request message 722 is sent to the Site Logistics Processing process component 130 in order to maintain the site logistics request.

The message 722 is received by a Maintain Site Logistics Request operation 720. The operation 720 is included in a Site Logistics Processing In interface 716. The Maintain Site Logistics Request operation 720 creates, updates, or deletes a site logistics request. The Maintain Site Logistics Request operation 720 uses a Maintain Site Logistics Request inbound process agent 718 to update a Site Logistics Request business object 714. The business object 714 represents an internal request for site logistics to prepare and perform, within a certain time period, an outbound, inbound, or internal site logistics process.

The business object 714 uses a Confirm Site Logistics Request to Logistic Execution Control outbound process agent 724 to invoke a Notify Planning of Site Logistics Request Confirmation Reconciliation operation 730 which notifies the planning system of a reconciliation of a site logistics request confirmation. The Notify Planning of Site Logistics Request Confirmation Reconciliation operation 730 notifies the planning system of a reconciliation of a site logistics request confirmation. The Notify Planning of Site Logistics Request Confirmation Reconciliation operation 730 generates a Site Logistics Request Confirmation Reconciliation Notification message 734. The message 734 is received by a Change Site Logistics Requisition Based on Site Logistics Request Confirmation Reconciliation operation 740. The Change Site Logistics Requisition Based on Site Logistics Request Confirmation Reconciliation operation 740 reconciles a site logistics requisition with its related site logistics request. The Change Site Logistics Requisition Based on Site Logistics Request Confirmation Reconciliation operation 740 uses a Maintain Site Logistics Requisition Based on Site Logistics inbound process agent 742 to update the Site Logistics Requisition business object 706.

Alternatively, the Confirm Site Logistics Request to Logistic Execution Control outbound process agent 724 can invoke a Confirm Site Logistics Request operation 728, which confirms receipt of the request and acknowledges quantities and delivery dates. The operation 728 generates a Site Logistics Request Confirmation message 732, which is sent to the Logistics Execution Control process component 128. The message 732 is received by a Change Site Logistics Requisition Based on Site Logistics Request Confirmation operation 738. The operation 738 uses a Maintain Site Logistics Requisition Based on Site Logistics inbound process agent 742 to update the Site Logistics Requisition business object 706. A Site Logistics Processing Out interface 726 includes the Confirm Site Logistics Request operation 728 and the Notify Planning of Site Logistics Request Confirmation Reconciliation operation 730.

The Logistics Execution Control process component 128 includes a Site Logistics Processing In interface 736. The Site Logistics Processing In interface 736 includes the Change Site Logistics Requisition based on Site Logistics Request Confirmation operation 738 and the Change Site Logistics Requisition Based on Site Logistics Request Confirmation Reconciliation operation 740.

Interactions between Process Components "Payment Processing at Business Partner" and "Payment Processing"

Figure 8:
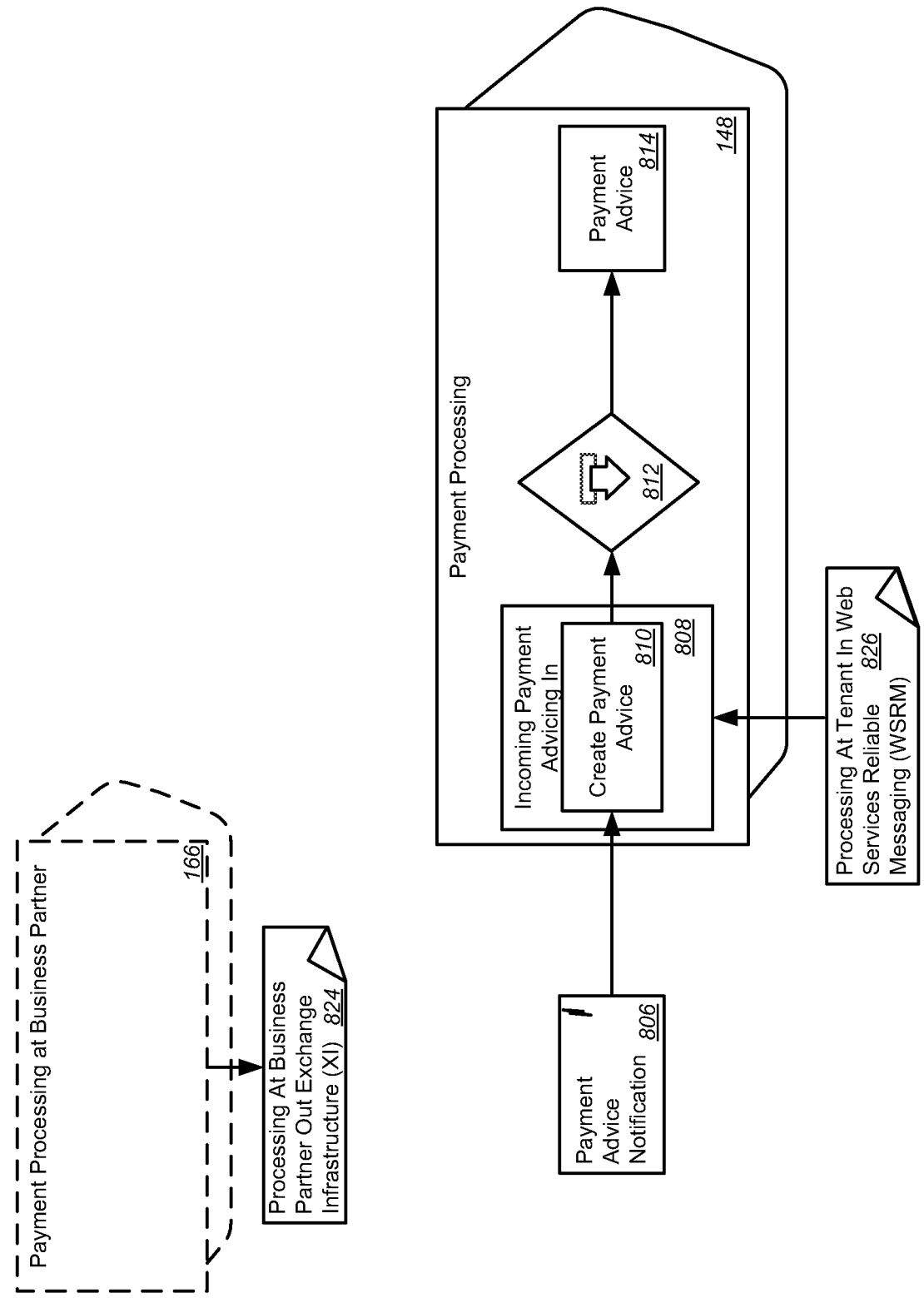
FIG. 8 is a block diagram showing interactions between a Payment Processing at Business Partner process component and a Payment Processing process component.

FIG. 8 is a block diagram showing interactions between the Payment Processing at Business Partner process component 166 and the Payment Processing process component 148 in the architectural design of FIGS. 1A and 1B. The interaction starts with the creation of a payment advice at a business partner. The Payment Processing at Business Partner process component 166 notifies the Payment Processing process component 148 about payments in transfer.

As shown in FIG. 8, the Payment Processing process component 148 includes the Payment Advice business object 814. The Payment Advice business object 814 represents an announcement of a payment transaction by a business partner to the company, specifying payment reasons. A Payment Advice Notification message 806 is received from the Payment Processing at Business Partner process component 166 by a Create Payment Advice operation 810. The operation 810 is included in an Incoming Payment Advicing In interface 808. The Payment Processing process component 148 receives information from a Processing At Tenant In Web Services Reliable Messaging (WSRM) communication channel template 826. The Incoming Payment Advicing In interface 808 receives information from the Payment Processing at Business Partner process component 166 using the Processing At Tenant In Web Services Reliable Messaging (WSRM) communication channel template 826. The communication channel template 826 can define protocols and parameters used for communication with an external party.

The Create Payment Advice operation 810 invokes a Notify of Payment from Payment Order to Business Partner inbound process agent 812. The agent 812 updates the Payment Advice business object 814 with information about payments in transfer. The Payment Processing at Business Partner process component 166 sends information to the Payment Processing process component 148 using a Processing At Business Partner Out XI communication channel template 824. The communication channel template 824 can define protocols and parameters used for communication with an external party. While XI represents Exchange Infrastructure, any similar or suitable third-party or proprietary toll may be used to perform the functions provided by or describe in relation to XI.

Interactions between Process Components "Service Order Processing" and "Customer Invoice Processing"

Figure 9:
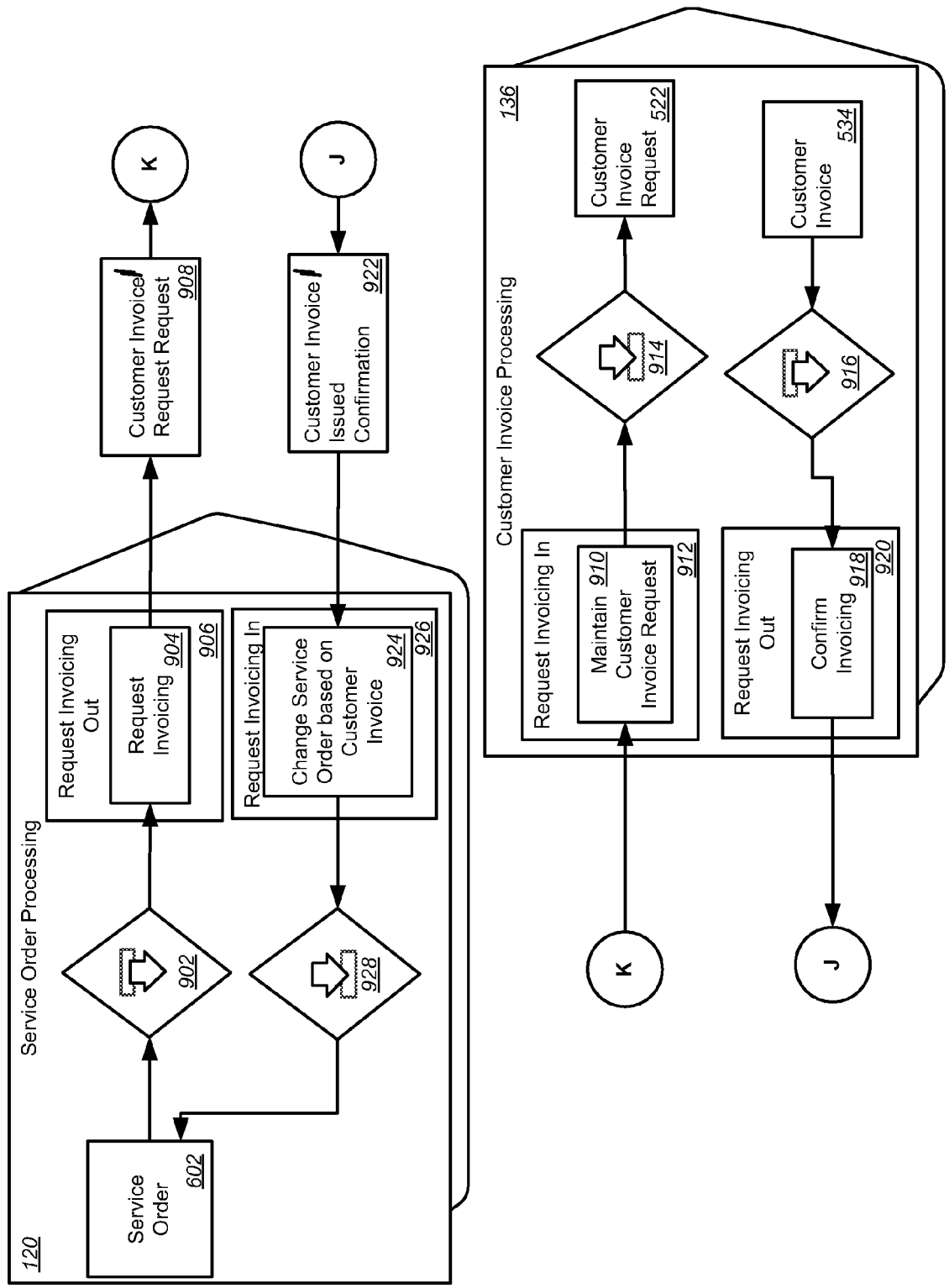
FIG. 9 is a block diagram showing interactions between the Service Order Processing process component and the Customer Invoice Processing process component.

FIG. 9 is a block diagram showing interactions between the Service Order Processing process component 120 and the Customer Invoice Processing process component 136 in the architectural design of FIGS. 1A and 1B. The interaction starts with a request for the creation, update or cancellation of invoices from the Customer Invoice Processing process component 136. The Customer Invoice Processing process component 136 confirms the performed action to the requester.

As shown in FIG. 9, the Service Order Processing process component 120 includes the Service Order business object 602. The Service Order business object 602 represents an agreement between a service provider and a customer about the execution of services at a specific time and for a specific price. In addition, the service order contains planning for personnel, spare parts, and other expenses that are used for providing the services. The Service Order Processing process component 120 can request a creation, update, or cancellation of one or more invoices from the Customer Invoice Processing process component 136. The Customer Invoice Processing process component 136 can confirm an execution of the requested action to the Service Order business object 602.

The Service Order business object 602 uses a Request Invoicing from Service Order to Customer Invoice Processing outbound process agent 902 to invoke a Request Invoicing operation 904. The operation 904 is included in a Request Invoicing Out interface 906. The Request Invoicing operation 904 requests invoicing of a service order. The Request Invoicing operation 904 can generate a Customer Invoice Request Request message 908 and send the message to the Customer Invoice Processing process component 136.

The Customer Invoice Processing process component 136 receives the message 908 from the Service Order Processing process component 120. The message 908 can be handled by a Maintain Customer Invoice Request operation 910. The operation 910 is included in a Request Invoicing In interface 912. The Maintain Customer Invoice Request operation 910 creates, updates, deletes, or cancels a customer invoice request. The operation 910 uses a Maintain Customer Invoice Request inbound process agent 914 to update the Customer Invoice Request business object 522. The Customer Invoice Request business object 522 represents a request to create one or several customer invoices, or to take account of the data for the underlying business document when creating a customer invoice.

The Customer Invoice Processing process component 136 can update the Customer Invoice business object 534. The Customer Invoice business object 534 represents a binding statement of amounts receivable resulting from deliveries to a customer, services performed for a customer, adjustments to these receivables, or credit memos to the customer. The Customer Invoice business object 534 can use a Confirm Customer Invoice to Service Order Processing out bound process agent 916 to invoke a Confirm Invoicing operation 918. The Confirm Invoicing operation 918 confirms that customer invoicing has taken place. The operation 918 is included in a Request Invoicing Out interface 920. The operation 918 generates a Customer Invoice Issued Confirmation message 922.

The message 922 is received in the Service Order Processing process component 120 where it is handled by a Change Service Order based on Customer Invoice operation 924. The operation 924 is included in a Request Invoicing In interface 926. The Service Order based on Customer Invoice operation 924 updates changes in the service order with data from the customer invoice. The operation 924 uses a Change Service Order based on Customer Invoice inbound process agent 928 to update the Service Order business object 602.

Interactions between Process Components "Inventory Processing" and "Accounting"

Figure 10:
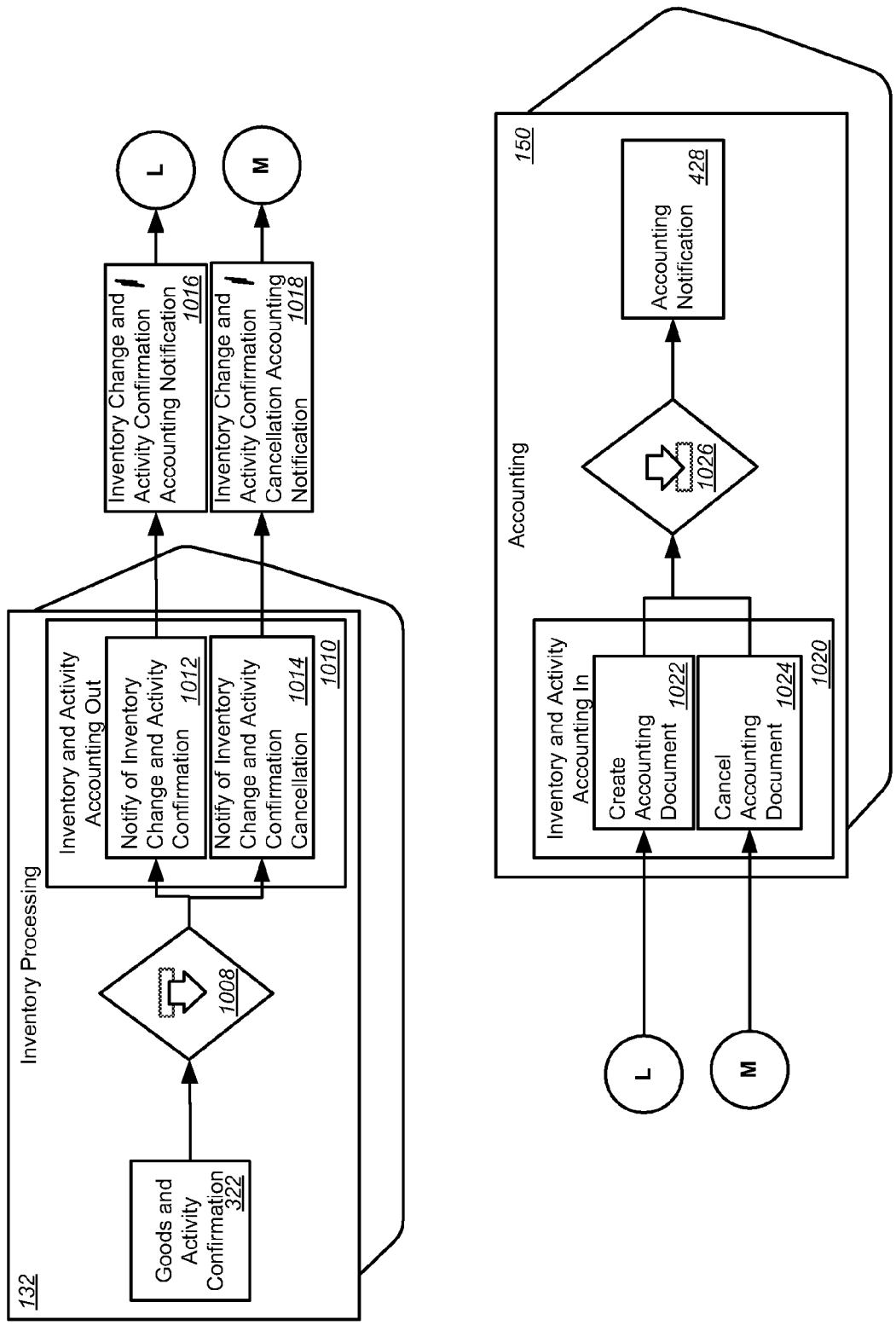
FIG. 10 is a block diagram showing interactions between the Inventory Processing process component and the Accounting process component.

FIG. 10 is a block diagram showing interactions between the Inventory Processing process component 132 and the Accounting process component 150 in the architectural design of FIGS. 1A and 1B. The interaction starts when a goods and activity confirmation is created or cancelled. The Inventory Processing process component 132 requests the creation or cancellation of accounting documents from the Accounting process component 150.

As shown in FIG. 10, the Inventory Processing process component 132 includes a Goods and Activity Confirmation business object 322. The Goods and Activity Confirmation business object 322 represents a record of confirmed inventory changes that occurred at a specific time.

The Goods and Activity Confirmation business object 322 uses a Notify of Inventory Change from Goods and Activity Confirmation to Accounting outbound process agent 1008 to invoke the Notify of Inventory Change and Activity Confirmation operation 1012 or the Notify of Inventory Change and Activity Confirmation Cancellation operation 1014. The operations 1012 and 1014 are included in the Inventory and Activity Accounting Out interface 1010. If the Notify of Inventory Change and Activity Confirmation operation 1012 is invoked, the operation 1012 generates the Inventory Change and Activity Confirmation Accounting Notification message 1016. If the Notify of Inventory Change and Activity Confirmation Cancellation operation 1014 is invoked, the operation 1014 generates the Inventory Change and Activity Confirmation Cancellation Accounting Notification message 1018.

The Create Accounting Document operation 1022 receives the Inventory Change and Activity Confirmation Accounting Notification message 1016. The Cancel Accounting Document operation 1024 receives the Inventory Change and Activity Confirmation Cancellation Accounting Notification message 1018. The operations 1022 and 1024 are included in the Inventory and Activity Accounting In interface 1020. The operations 1022 and 1024 use the Maintain Accounting Document based on Inventory and Activity inbound process agent 1026 to update the Accounting Notification business object 428. The Accounting Notification business object 428 represents a notification sent to Financial Accounting by an operational component regarding a business transaction. The Accounting Notification business object 428 can represent this operational business transaction in a standardized form for all business transaction documents and can contain the data needed to valuate the business transaction.

Interactions between Process Components "Payment Processing" and "Payment Order Processing at House Bank"

Figure 11:
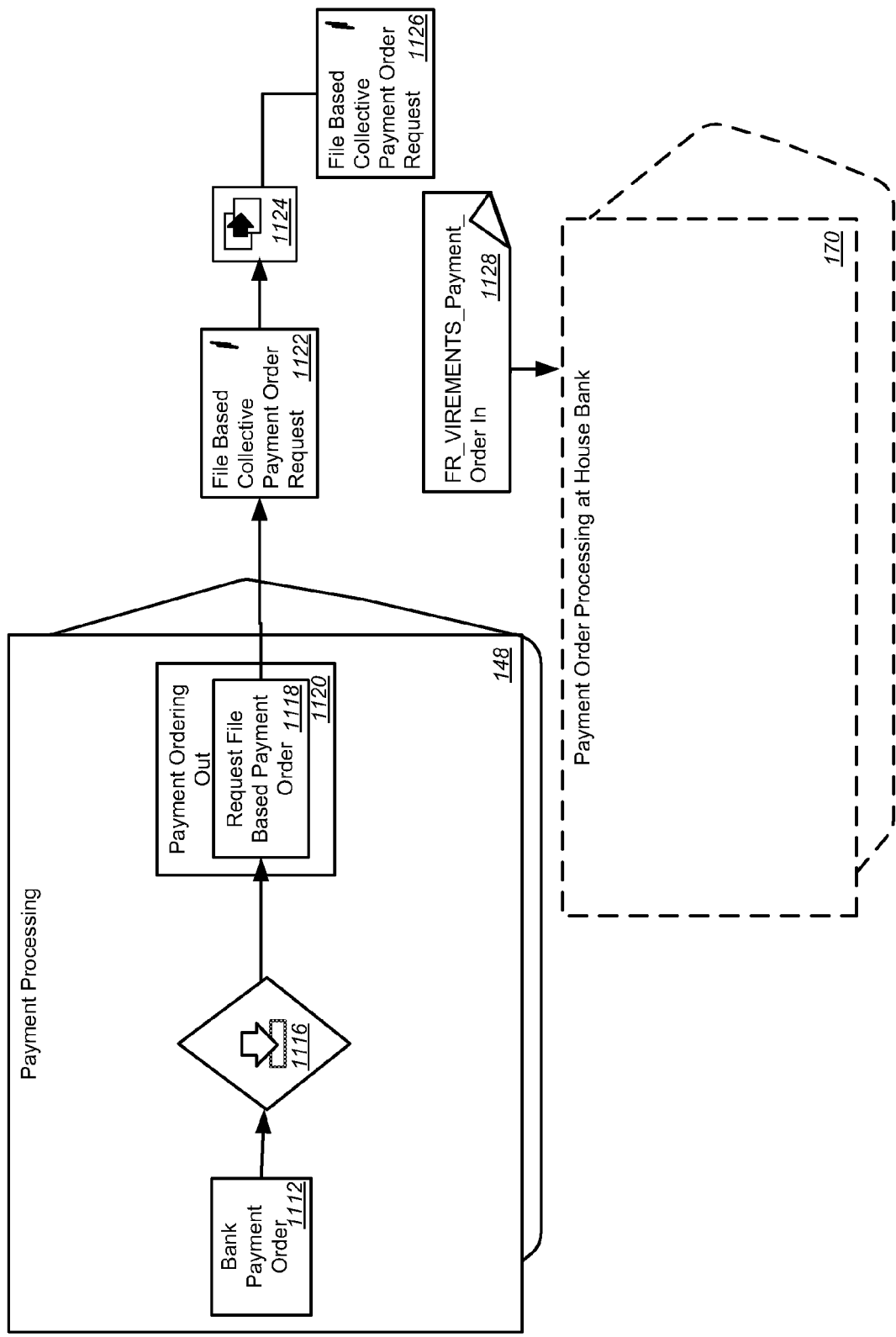
FIG. 11 is a block diagram showing interactions between the Payment Processing process component and a Payment Order Processing at House Bank process component.

FIG. 11 is a block diagram showing interactions between the Payment Processing process component 148 and the Payment Order Processing at House Bank process component 170 in the architectural design of FIGS. 1A and 1B.

The Payment Processing process component 148 includes a Bank Payment Order business object 1112 which is an order sent to a house bank to make a transfer or direct debit from a specified house bank account in order to complete an internal payment order.

An update to the Bank Payment Order business object 1112 triggers a Request File Based Payment Order from Bank Payment to House Bank outbound process agent 1116 to create a file based bank payment order to House Bank. The outbound process agent 1116 invoke a Request File Based Payment Order operation 1118. The operation 1118 is included in a Payment Ordering Out interface 1120. The Request File based Payment Order operation 1118 sends a File Based Collective Payment Order Request message 1122 to the Payment Order Processing at House Bank process component 170. The Request File based Payment Order operation 1118 generates a File based Collective Payment Order Request message 1122. The File based Collective Payment Order Request message 1122 uses a Mapping Entity 1124 to transform the file-based message type to a Collective Payment Order Request message 1126 that can be received by the Payment Order Processing at House Bank process component 170. The Payment Order Processing at House Bank process component 170 receives information from the Payment Processing process component 148 using a Payment Order Processing at House Bank communication channel template 1128. The communication channel template 1128 can define protocols and parameters used for communication with an external party.

Interactions between Process Components "Service Confirmation Processing" and "Accounting"

Figure 12:
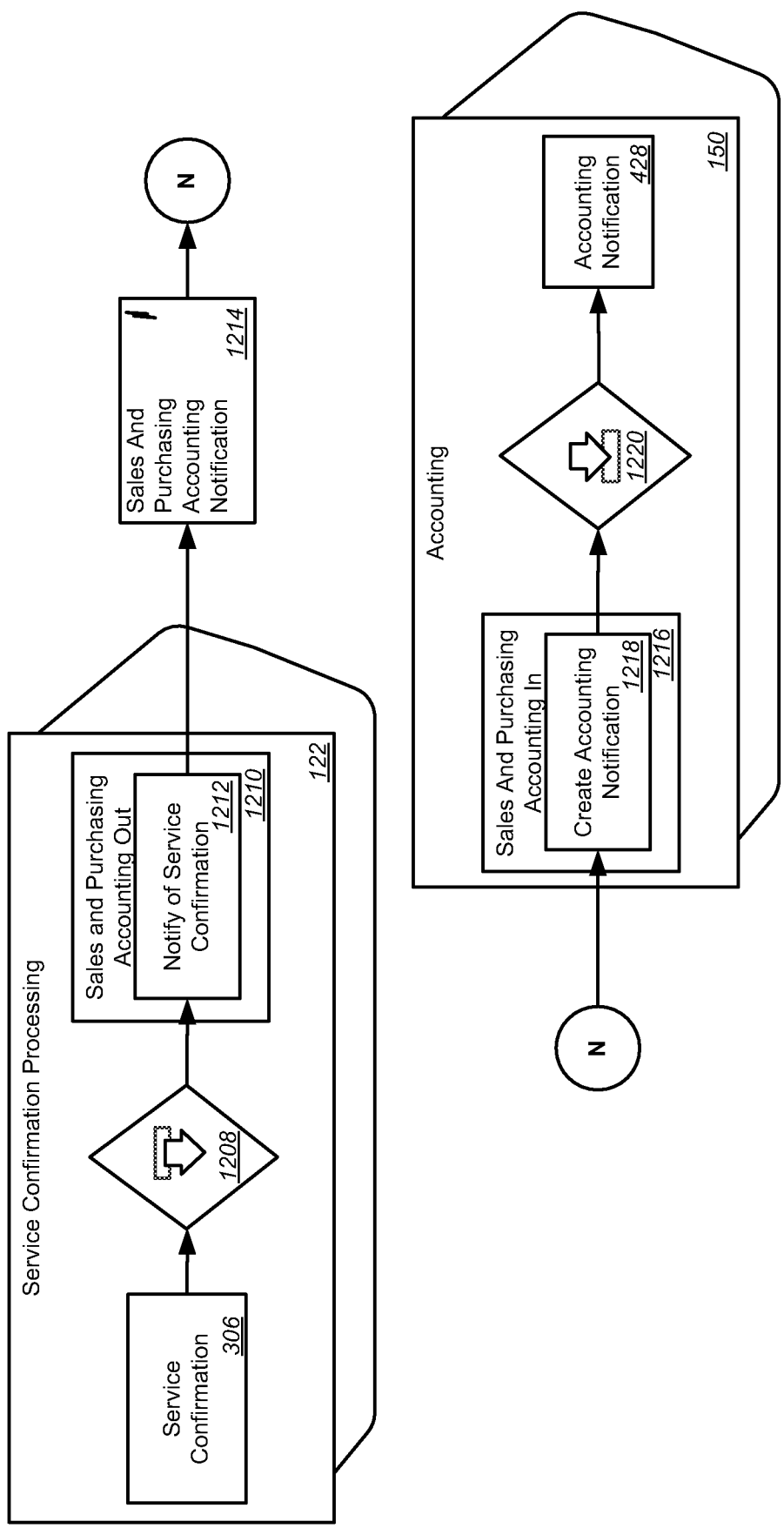
FIG. 12 is a block diagram showing interactions between the Service Confirmation Processing process component and the Accounting process component.

FIG. 12 is a block diagram showing interactions between the Service Confirmation Processing process component 122 and the Accounting process component 150 in the architectural design of FIGS. 1A and 1B.

As shown in FIG. 12, the Service Confirmation Processing process component 122 includes the Service Confirmation business object 306. The Service Confirmation business object 306 represents a record of services and spare parts that a service technician reports back after performing a service for a customer.

The Service Confirmation business object 306 uses a Notify of Service Confirmation to Accounting outbound process agent 1208 to invoke a Notify of Service Confirmation operation 1212. The operation 1212 notifies Accounting process component 150 about a creation, change, or deletion of a service confirmation. The Notify of Service Confirmation operation 1212 is included in a Sales and Purchasing Accounting Out interface 1210. The operation 1212 generates and sends a Sales and Purchasing Accounting Notification message 1214 to the Accounting process component 150.

A Create Accounting Notification operation 1218 handles the message 1214. The operation 1218 receives order accounting notifications from various process components. The notification is to inform accounting about a creation, change or deletion of any kind of order business objects. The operation 1218 is included in a Sales and Purchasing Accounting In interface 1216. The operation 1218 can use a Maintain Subledger Account based on Sales and Purchasing inbound process agent 1220 to update the Accounting Notification business object 428.

Interactions between Process Components "Inventory Processing" and "Supply and Demand Matching"

Figure 13:
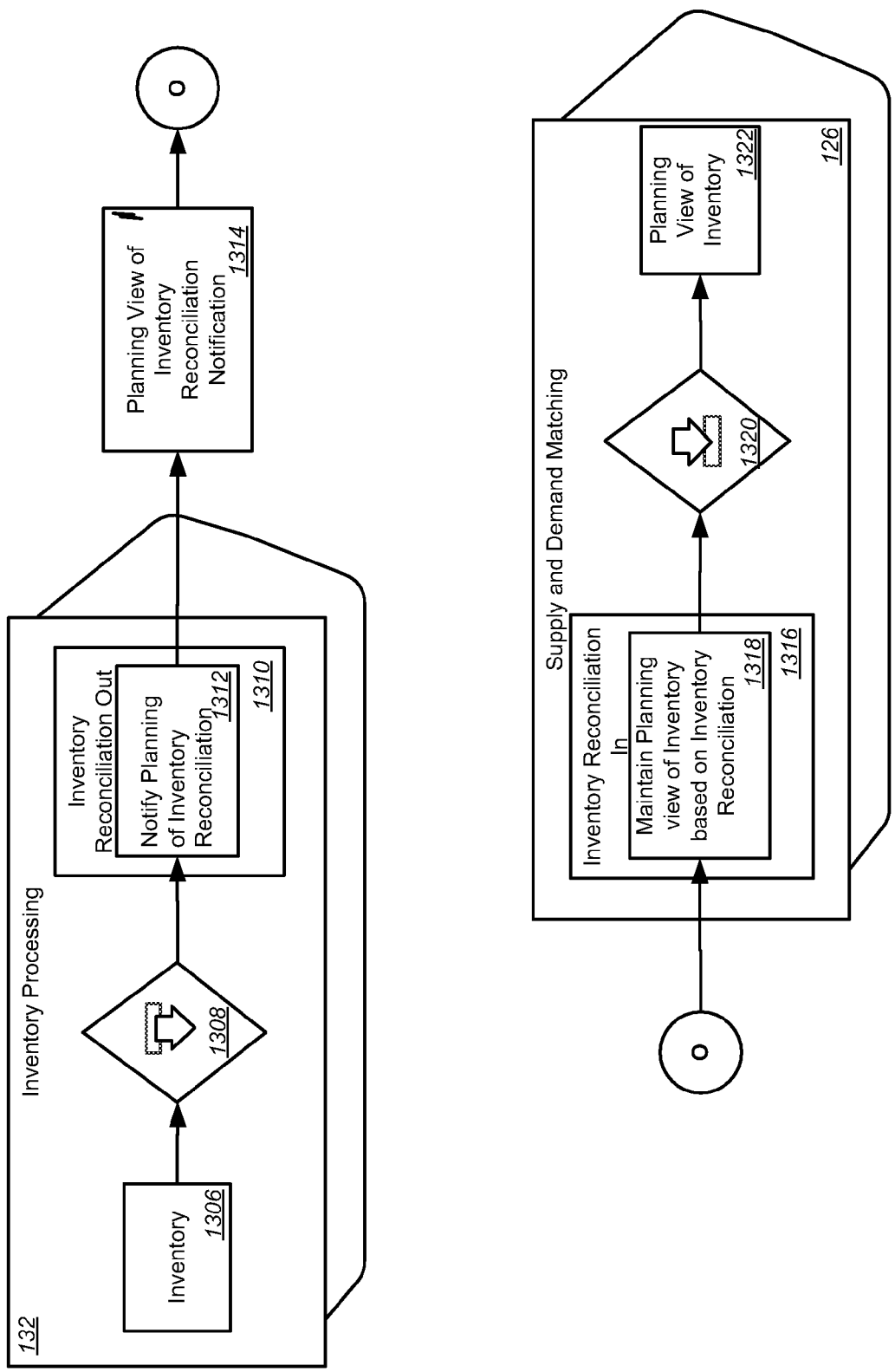
FIG. 13 is a block diagram showing interactions between the Inventory Processing process component and a Supply and Demand Matching process component.

FIG. 13 is a block diagram showing interactions between the Inventory Processing process component 132 and the Supply and Demand Matching process component 126 in the architectural design of FIGS. 1A and 1B.

The Inventory Processing process component 132 includes an Inventory business object 1306. The Inventory business object 1306 represents a quantity of all the materials in a location including the material reservations at this location. A request for an inventory reconciliation triggers a Notify of Inventory Reconciliation from Inventory to Supply and Demand Matching outbound process agent 1308. The Notify of Inventory Reconciliation from Inventory to Supply and Demand Matching outbound process agent 1308 invokes a Notify Planning of Inventory Reconciliation operation 1312. The operation 1312 is included in an Inventory Reconciliation Out interface 1310. The operation 1312 can send the inventory reconciliation to the Supply and Demand Planning process component 126. The operation sends a Planning View of Inventory Reconciliation Notification message 1314 to send the inventory reconciliation update.

The Supply and Demand Planning process component 126 includes an Inventory Reconciliation In interface 1316. The Inventory Reconciliation In interface 1316 includes a Maintain Planning View of Inventory based on Inventory Reconciliation operation 1318. The operation 1318 uses a Maintain Planning View of Inventory based on Inventory Reconciliation inbound process agent 1320 to update the Planning View of Inventory business object 1322.

Interactions between Process Components "Customer Invoice Processing" and "Accounting"

Figure 14:
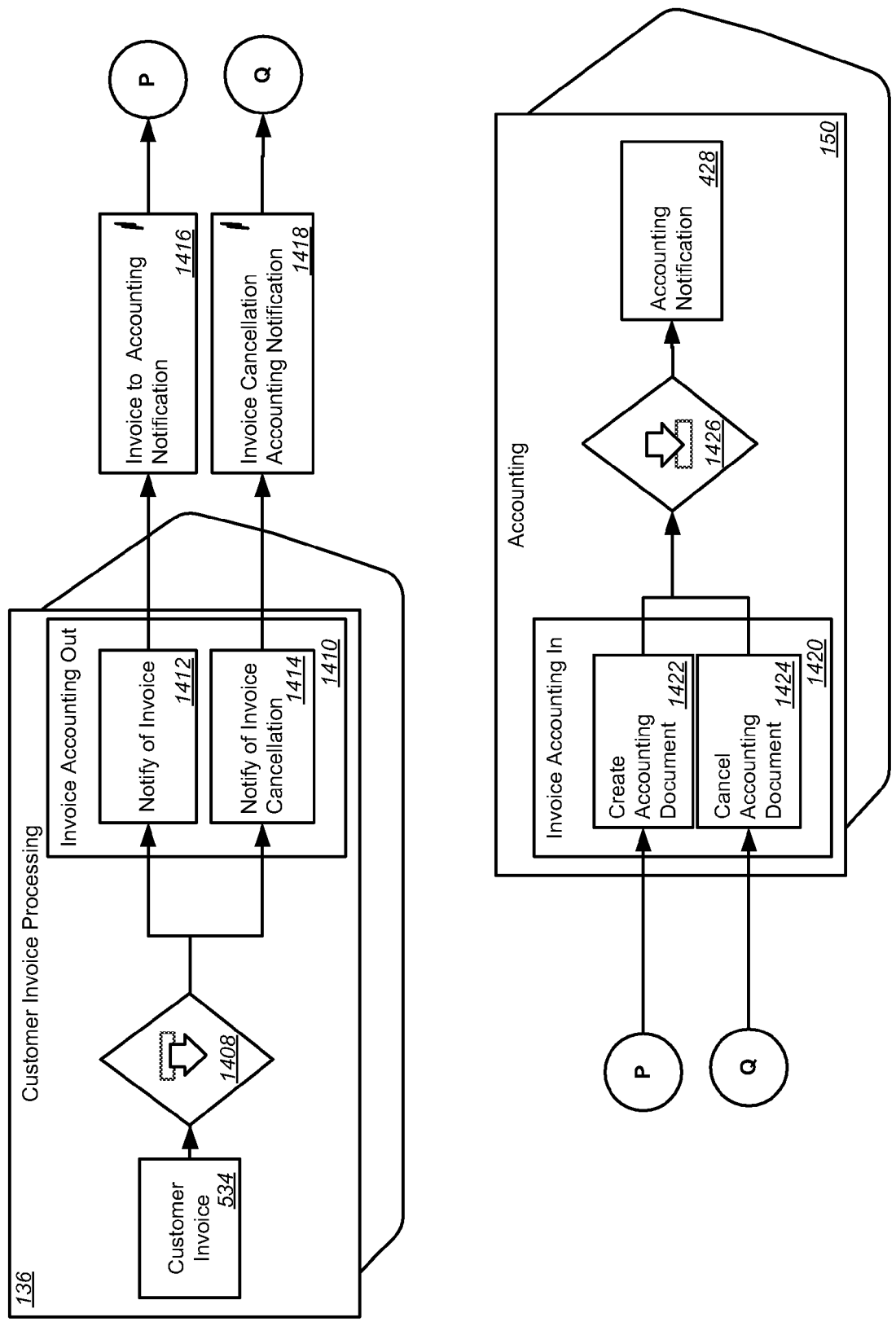
FIG. 14 is a block diagram showing interactions between the Customer Invoice Processing process component and the Accounting process component.

FIG. 14 is a block diagram showing interactions between the Customer Invoice Processing process component 136 and the Accounting process component 150 in the architectural design of FIGS. 1A and 1B.

The Customer Invoice Processing process component 136 can request a creation or cancellation of accounting documents from the Accounting process component 150 based on a creation or cancellation of a customer invoice.

The Customer Invoice Processing process component 136 includes the Customer Invoice business object 534. The Customer Invoice business object 534 uses a Notify of Customer Invoice to Accounting outbound process agent 1408 to transfer a created or cancelled invoice to the Accounting process component 150. If the Customer Invoice business object 534 is created, then the Notify of Customer Invoice to Accounting outbound process agent 1408 invokes the Notify of Invoice operation 1412 and an Invoice to Accounting Notification message 1416 is sent to the Accounting process component 150.

If the Customer Invoice business object 534 is cancelled, then the Notify of Customer Invoice to Accounting outbound process agent 1408 invokes the Notify of Invoice Cancellation operation 1414 and an Invoice cancellation Accounting Notification message 1418 is sent to the Accounting process component 150.

The message 1416 is handled in a Create Accounting Document operation 1422. The operation 1422 creates an accounting document for a customer invoice or supplier invoice. The accounting document records payables, receivables, expenses and revenues for the invoice in financial accounting. The message 1418 is handled in a Cancel Accounting Document operation 1424. The operation 1424 receives invoice accounting cancellation requests from the Customer Invoice Processing process component 136. The operations 1422, 1424 are included in an Invoice Accounting In interface 1420.

The Create Accounting Document operation 1422 and the Cancel Accounting Document operation 1424 can use a Maintain Accounting Document based on Invoice inbound process agent 1426 to update the Accounting Notification business object 428.

Interactions between Process Components "Service Order Processing" and "Accounting"

Figure 15:
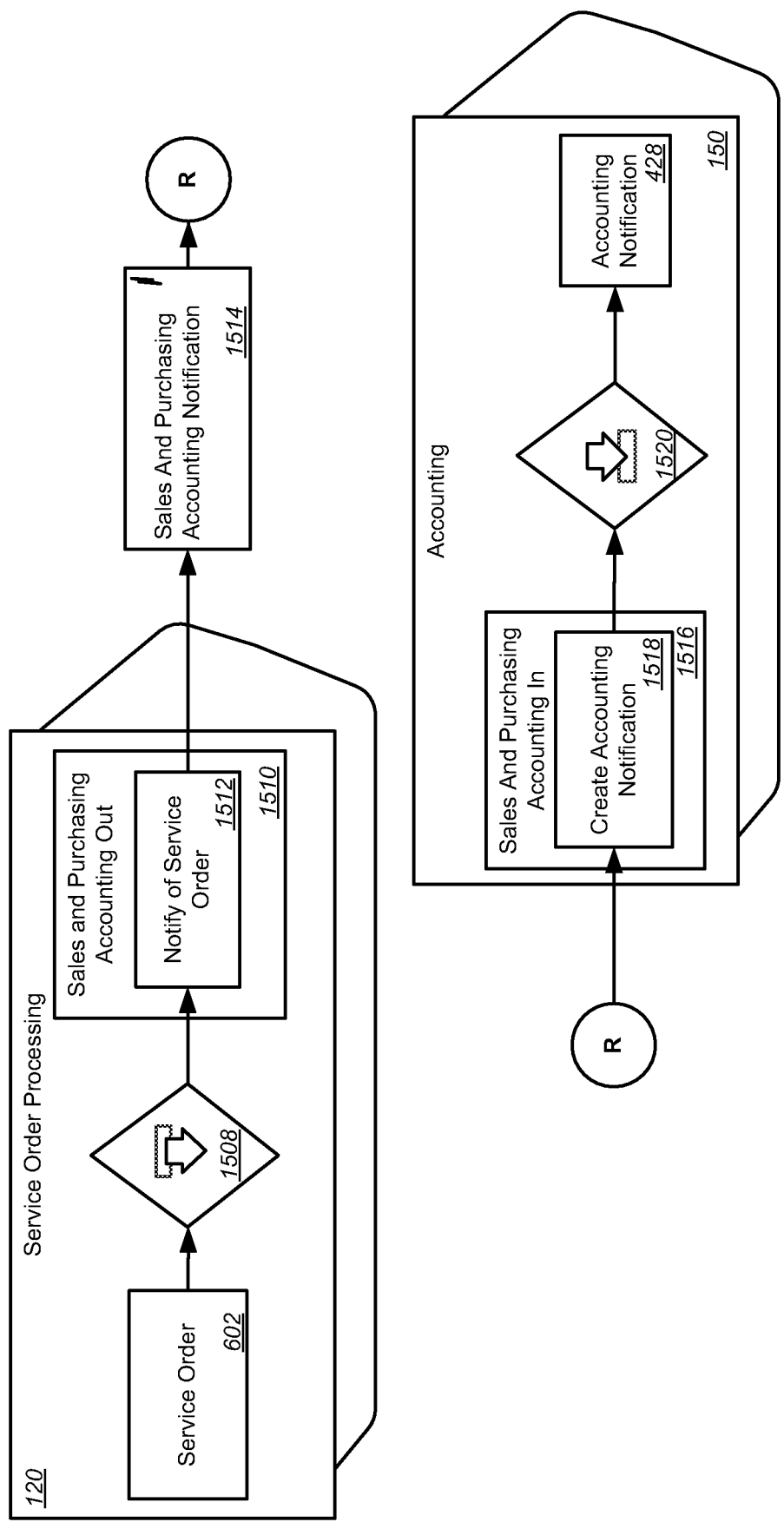
FIG. 15 is a block diagram showing interactions between the Service Order Processing process component and the Accounting process component.

FIG. 15 is a block diagram showing interactions between the Service Order Processing process component 120 and the Accounting process component 150 in the architectural design of FIGS. 1A and 1B.

As shown in FIG. 15, the Service Order Processing process component 120 includes the Service Order business object 602. The Service Order business object 602 uses a Notify of Service Order to Accounting outbound process agent 1508 to invoke a Notify of Service Order operation 1512. The operation 1512 notifies the Accounting process component 150 about a creation, change, or deletion of a service order. The Notify of Service Order operation 1512 is included in a Sales and Purchasing Accounting Out interface 1510. The operation 1512 generates and sends a Sales And Purchasing Accounting Notification message 1514 to the Accounting process component 150.

The message 1514 is handled by a Create Accounting Notification operation 1518. The operation 1518 is included in a Sales and Purchasing Accounting In interface 1516. The operation 1518 uses a Maintain Subledger Account based on Sales and Purchasing inbound process agent 1520 to update the Accounting Notification business object 428.

Interactions between Process Components "Service Request Processing at Requester" and "Service Request Processing"

Figure 16:
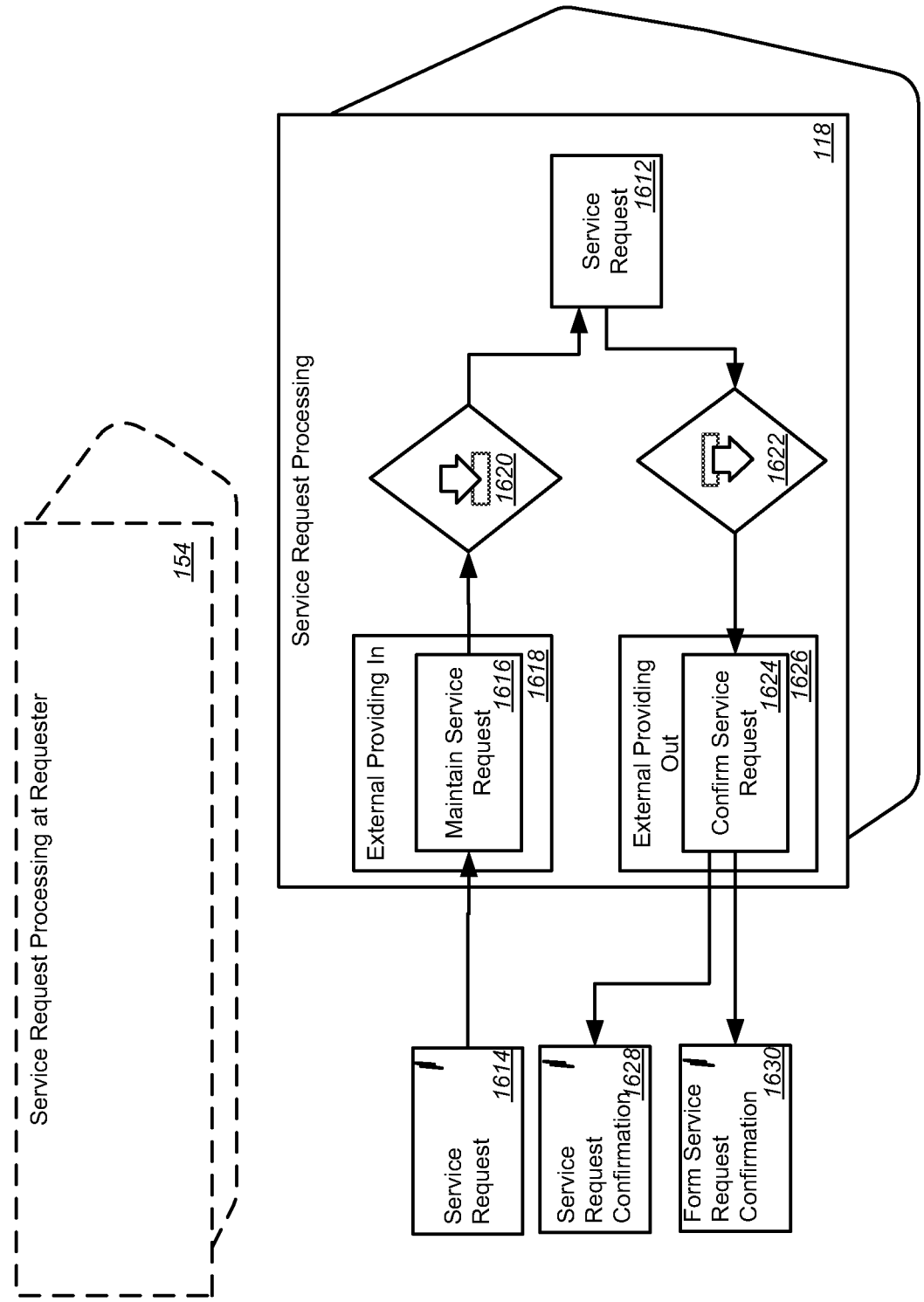
FIG. 16 is a block diagram showing interactions between the Service Request Processing process component and a Service Request Processing at Requester process component.

FIG. 16 is a block diagram showing interactions between the Service Request Processing at Requester process component 154 and the Service Request Processing process component 118 in the architectural design of FIGS. 1A and 1B.

A creation or update of a service request is triggered from a requester from an external process (e.g., a service requester). For example, the service request is maintained according to the data replicated from the external request. Some confirmations of the information exchange as well as updates on processing progress are provided back to the requester.

As shown in FIG. 16, the Service Request Processing process component 118 includes a Service Request business object 1612. The Service Request business object 1612 represents a request from a customer to a service provider to solve an issue that the customer has with regard to a product. In addition to the description and the categorization of the issue, the Service Request contains the documentation and the results of the resolution, as well as the expenses incurred. A Service Request message 1614 invokes a Maintain Service Request operation 1616. The Maintain Service Request operation 1616 is included in an External Providing In interface 1618. The operation 1616 uses a Maintain Service Request inbound process agent 1620 to update the Service Request business object 1612. The Service Request business object 1612 uses a Confirm Service Request from Service Request Processing to Requester outbound process agent 1622 to invoke a Confirm Service Request operation 1624. The Confirm Service Request operation 1624 sends a Service Request Confirmation message 1628 or a Form Service Request Confirmation message 1630 to notify a requestor of the receipt of the service request.

Interactions between Process Components "Due Item Processing" and "Payment Processing"

Figure 17A:
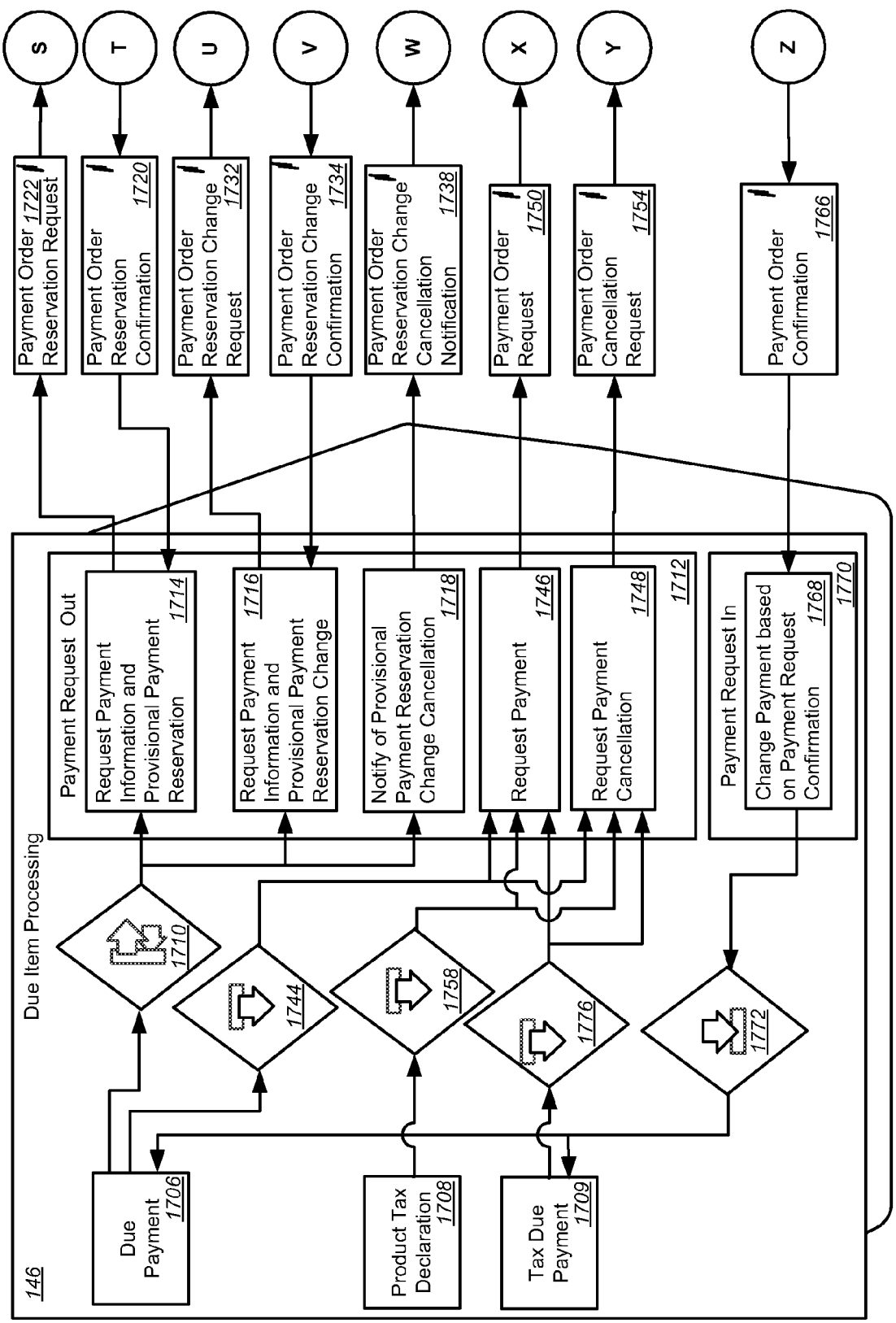
FIGS. 17A and 17B are block diagrams collectively showing interactions between a Due Item Processing process component and the Payment Processing process component.
Figure 17B:
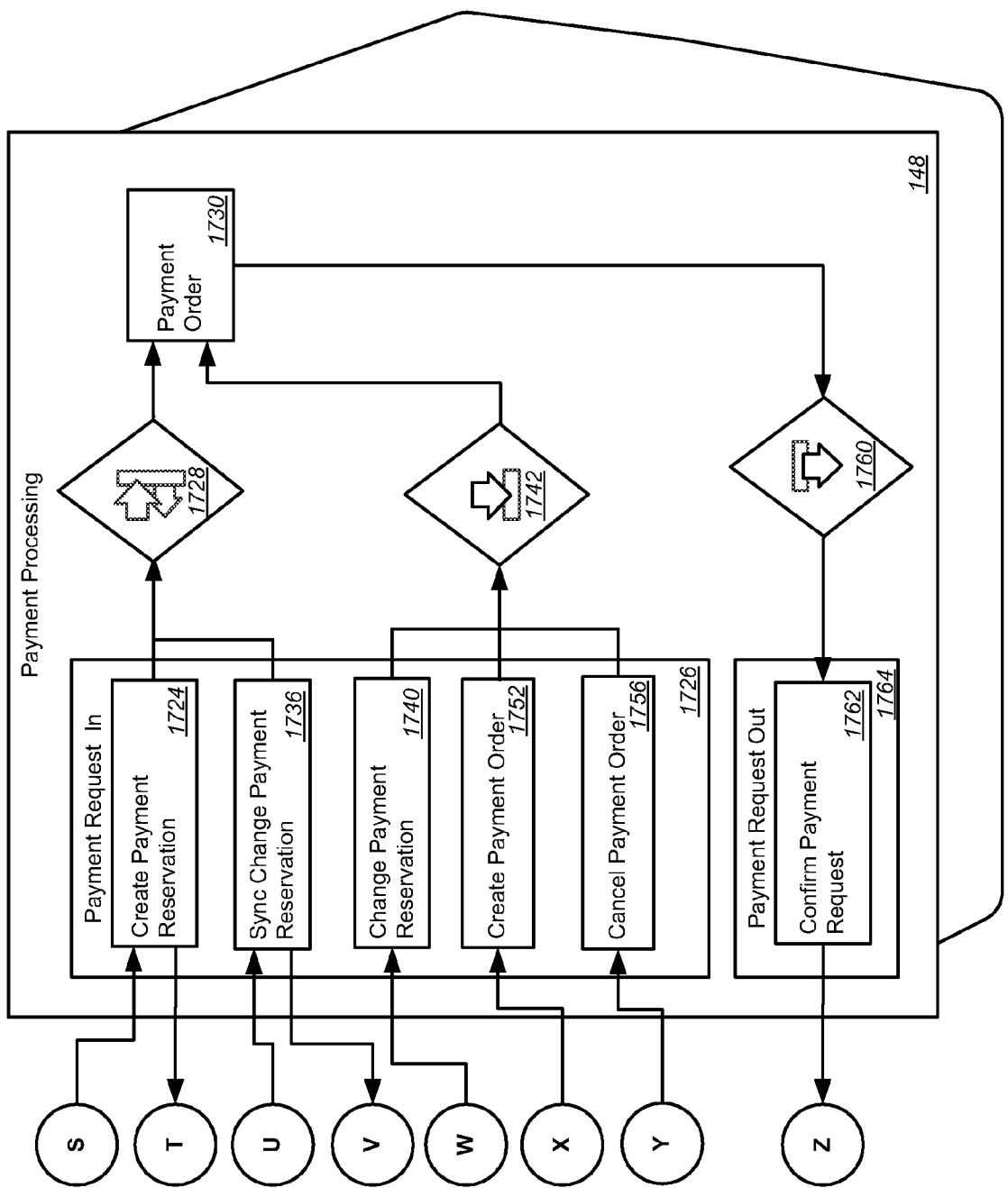

FIGS. 17A and 17B are block diagrams collectively showing interactions between the Due Item Processing process component 146 and the Payment Processing process component 148 in the architectural design of FIGS. 1A and 1B. The interaction may begin when a payment for trade or tax receivables or payables is initiated or cancelled. The interaction allows the Due Item Processing process component 146 to request a reservation or change a previously made reservation of cash from the Payment Processing process component 148 within the creation process. The Payment Processing process component 148 confirms the creation or the change of a reservation immediately.

As shown in FIG. 17A, the Due Item Processing process component 146 includes a Due Payment business object 1706, a Product Tax Declaration business object 1708, and a Tax Due Payment business object 1709. The Due Payment business object 1706 represents a payment request or payment confirmation with regard to trade receivables and payables. The Product Tax Declaration business object 1708 represents a declaration of the product tax payables and receivables of a company to the responsible tax authority according to the tax declaration arrangement, and country-specific rules and regulations that trigger the payment to the tax authority. The Tax Due Payment business object 1709 represents a payment request or payment confirmation with regard to tax payables and receivables.

The Due Payment business object 1706 uses a Synchronous Request Payment Reservation from Due Payment to Payment Processing outbound process agent 1710 to invoke one or more operations including a Request Payment Information and Provisional Payment Reservation operation 1714, a Request Payment Information and Provisional Payment Reservation Change operation 1716, and a Notify of Provisional Payment Reservation Change Cancellation operation 1718. The operations 1714, 1716, and 1718 are included in a Payment Request Out interface 1712. The Request Payment Information and Provisional Payment Reservation operation 1714 can request payment information with a provisional reservation of money in payment processing. The Request Payment Information and Provisional Payment Reservation Change operation 1716 can request payment information with a change of provisional reservation of money in payment processing. The Notify of Provisional Payment Reservation Cancellation operation 1718 can register a change of a provisional payment to the last transactional or saved state.

If the Request Payment Information and Provisional Payment Reservation operation 1714 is invoked, the operation 1714 generates a Payment Order Reservation Request message 1722. If the Request Payment Information and Provisional Payment Reservation Change operation 1716 is invoked, the operation 1716 generates a Payment Order Reservation Change Request message 1732. If the Notify of Provisional Payment Reservation Change Cancellation operation 1718 is invoked, the operation 1718 generates a Payment Order Reservation Change Cancellation Notification message 1738.

The Due Payment business object 1706 also uses a Request Payment from Due Payment to Payment Processing outbound process agent 1744 to invoke a Request Payment operation 1746 or a Request Payment Cancellation operation 1748. The operations 1744 and 1746 are included in the Payment Request Out interface 1712. The Request Payment operation 1746 sends a request for payment to the Payment Processing process component 148. This confirms a previously made provisional payment. The Request Payment Cancellation operation 1748 cancels at least one provisional, requested, or ordered payment. If the Request Payment operation 1746 is invoked, a Payment Order Request message 1750 is generated. If the Request Payment Cancellation operation 1748 is invoked, the operation 1748 generates a Payment Order Cancellation Request message 1754.

The Product Tax Declaration business object 1708 uses a Request Payment from Product Tax Declaration to Payment Processing outbound process agent 1758 to invoke the Request Payment operation 1746 or the Request Payment Cancellation operation 1748. If the Request Payment operation 1746 is invoked, a Payment Order Request message 1750 is generated. If the Request Payment Cancellation operation 1748 is invoked, the operation 1748 generates a Payment Order Cancellation Request message 1754.

The Tax Due Payment business object 1709 uses a Request Payment from Tax Due Payment to Payment Processing outbound process agent 1776 to invoke the Request Payment operation 1746 or the Request Payment Cancellation operation 1748. If the Request Payment operation 1746 is invoked, a Payment Order Request message 1750 is generated. If the Request Payment Cancellation operation 1748 is invoked, the operation 1748 generates a Payment Order Cancellation Request message 1754.

As shown in FIG. 17B, a Create Payment Reservation operation 1724 receives the Payment Order Reservation Request message 1722. The operation 1724 uses a synchronous Request Payment Reservation from Due Payment to Payment Processing inbound process agent 1728 to create, change, or cancel a payment order for a reservation request. The synchronous inbound process agent 1728 updates the Payment Order business object 1730. The Payment Order business object 1730 represents an order within a company to make a payment to a business partner at a specified time. A payment order can be a collective order that includes several individual orders.

A synchronous Change Payment Reservation operation 1736 receives a Payment Order Reservation Change Request message 1732. The operation 1736 uses the synchronous Request Payment Reservation from Due Payment to Payment Processing inbound process agent 1728 to update the Payment Order business object 1730.

A Change Payment Reservation operation 1740 receives the Payment Order Reservation Change Cancellation Notification message 1738. A Create Payment Order operation 1752 receives the Payment Order Request message 1750. A Cancel Payment Order operation 1756 receives the Payment Order Cancellation Request message 1754. The operations 1740, 1752, and 1756 use a Maintain Payment Order inbound process agent 1742 to update the Payment Order business object 1730. The Cancel Payment Order operation 1756 cancels a previously sent payment request by reference. The Create Payment Order operation 1752 cancels a request for payment. The operations 1724, 1736, 1740, 1752, and 1756 are included in a Payment Request In interface 1726.

The Payment Order business object 1730 uses a Confirm Payment Request from Payment Order to Due Item Processing outbound process agent 1760 to invoke a Confirm Payment Request operation 1762. The operation 1762 confirms a processing status of a payment to a sender. The operation 1762 is included in a Payment Request Out interface 1764. The Confirm Payment Request operation 1762 generates a Payment Order Confirmation message 1766.

As shown in FIG. 17A, the Payment Order Confirmation message 1766 is received in a Change Payment based on Payment Request Confirmation operation 1768. The operation 1768 confirms the execution of a payment request or a payment request cancellation. The operation 1768 is included in a Payment Request In interface 1770. The Change Payment based on Payment Request Confirmation operation 1768 uses a Change Payment based on Payment Request Confirmation inbound process agent 1772 to update the Due Payment business object 1706 or the Tax Due Payment business object 1706.

The Create Payment Reservation 1724 operation (shown in FIG. 17B) sends a Payment Order Reservation Confirmation message 1720 to the Due Item Processing process component 146 (shown in FIG. 17A). The message 1720 is a confirmation response received in the Request Payment Information and Provisional Payment Reservation operation 1714.

The Synchronous Change Payment Reservation operation 1736 (shown in FIG. 17B) sends a Payment Order Reservation Change Confirmation message 1734 to the Due Item Processing process component 146 (shown in FIG. 17A). The message 1734 is a confirmation response received in the Request Payment Information and Provisional Payment Reservation Change operation 1716.

Interactions between Process Components "Payment Processing" and "Payment Processing at Business Partner"

Figure 18:
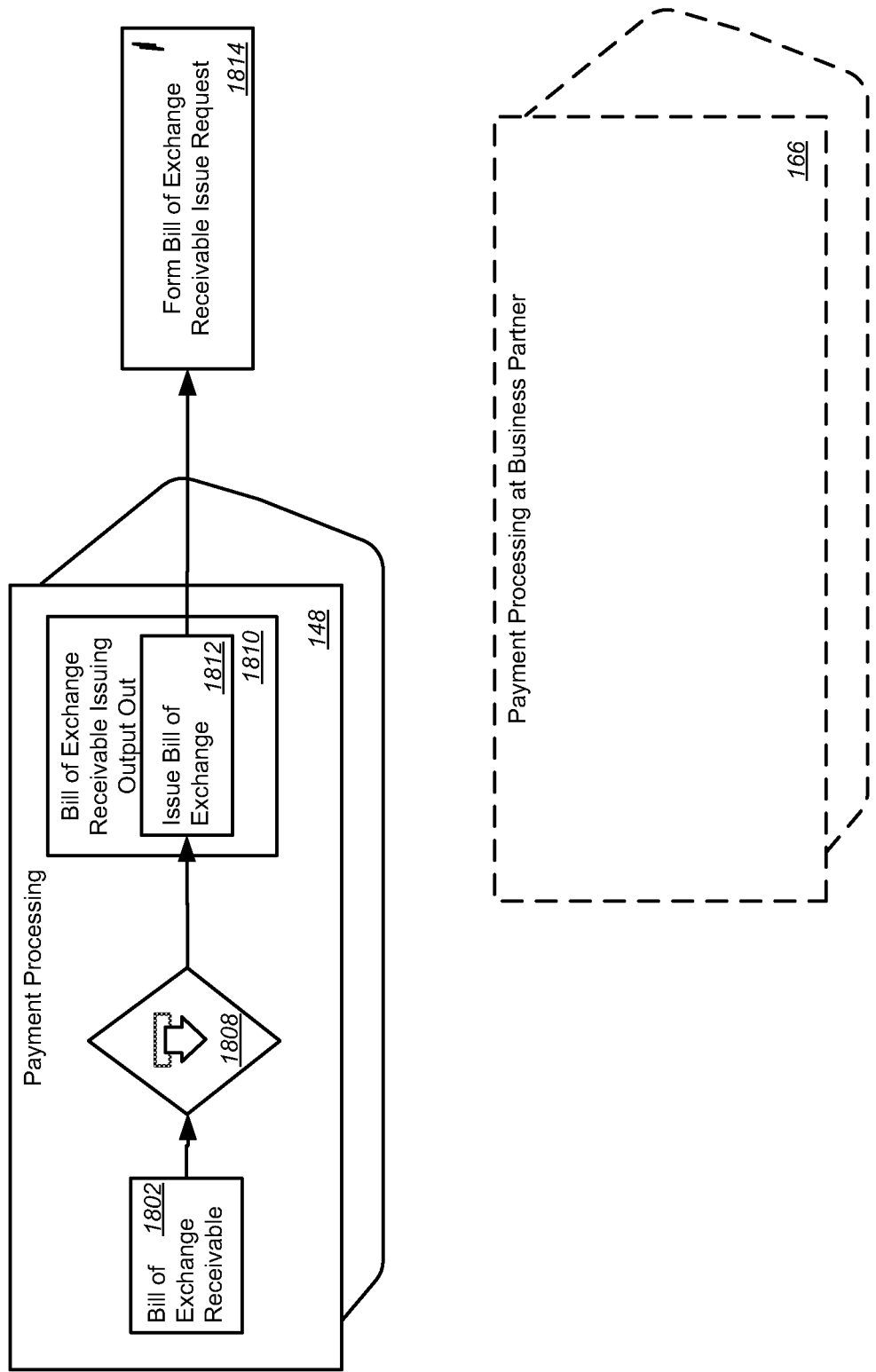
FIG. 18 is a block diagram showing additional interactions between the Payment Processing process component and the Payment Processing at Business Partner process component.

FIG. 18 is a block diagram showing interactions between the Payment Processing process component 148 and the Payment Processing at a Business Partner process component 166 in the architectural design of FIGS. 1A and 1B.

As shown in FIG. 18, the Payment Processing process component 148 includes a Bill of Exchange Receivable business object 1802. The Bill of Exchange Receivable business object 1802 uses a Notify of Payment from Bill of Exchange Receivable to Payment Processing at a Business Partner outbound process agent 1808 to invoke an Issue Bill of Exchange operation 1812. The operation 1812 is included in a Bill of Exchange Receivable Issuing Output Out interface 1810. The operation 1812 generates and sends a Form Bill of Exchange Receivable Issue Request message 1814 to the Payment Processing at Business Partner process component 166.

Interactions between Process Components "Service Order Processing" and "Financial Accounting Master Data Management"

Figure 19:
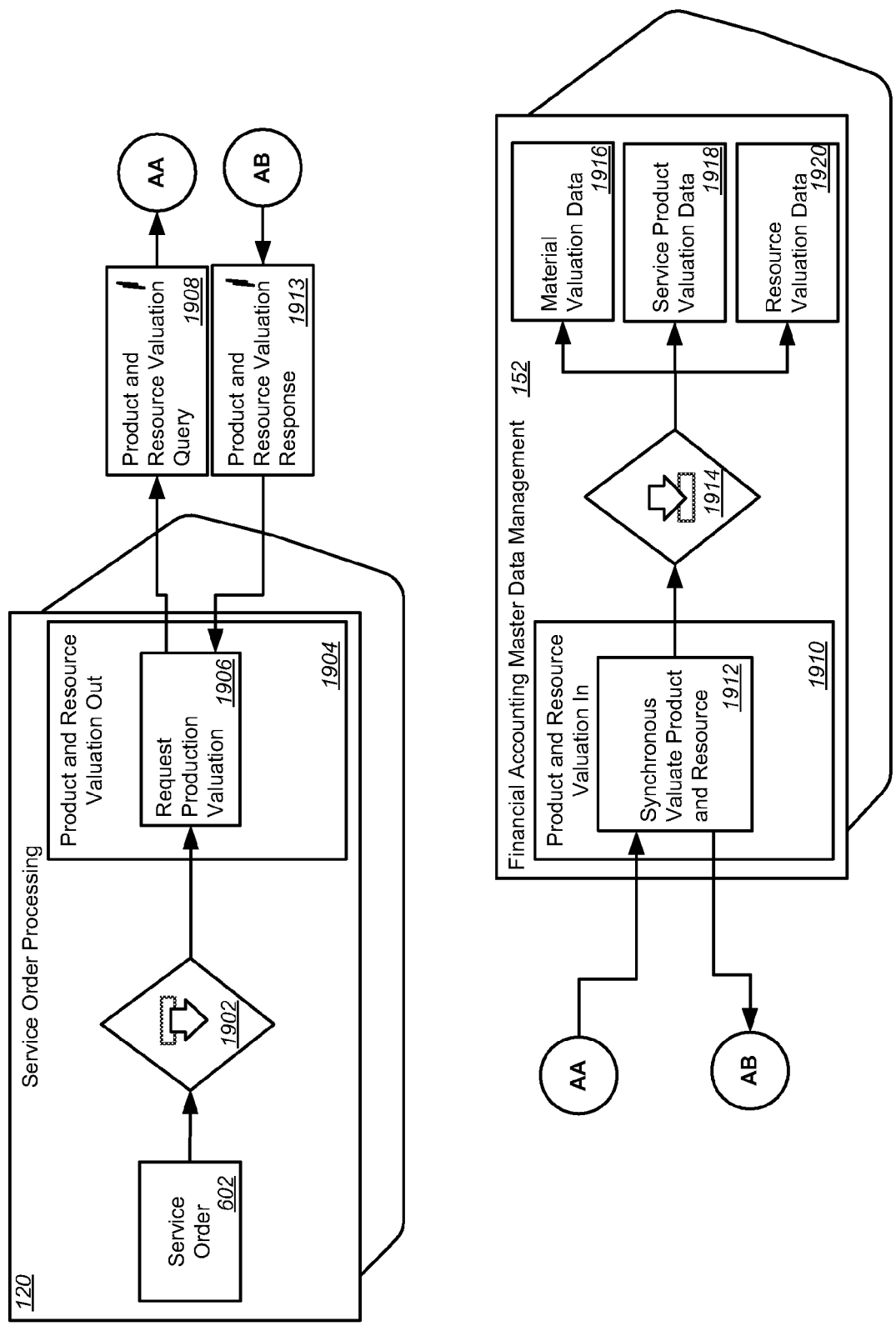
FIG. 19 is a block diagram showing interactions between the Service Order Processing process component and a Financial Accounting Master Data Management process component.

FIG. 19 is a block diagram showing interactions between the Service Order Processing process component 120 and the Financial Accounting Master Data Management process component 152 in the architectural design of FIGS. 1A and 1B.

As shown in FIG. 19, the Service Order Processing process component 120 includes the Service Order business object 602. The Service Order business object 602 uses a Synchronous Request Product Valuation from Service Order to Financial Accounting Master Data outbound process agent 1902 to invoke a Request Product Valuation operation 1906. The operation 1906 is included in a Product and Resource Valuation Out interface 1904. The Request Product Valuation operation 1906 can request valuation by generating and sending a Product Resource Valuation Query message 1908 to the Financial Accounting Master Data Management process component 152.

The Financial Accounting Master Data Management process component 152 receives the message where it is handled in a Synchronous Valuate Product and Resource operation 1912. The Synchronous Valuate Product and Resource operation 1912 synchronously accesses price information of products and resources. The operation 1912 is included in a Product and Resource Valuation In interface 1910. Upon receiving the Product and Resource Valuation Query message 1908, the operation 1912 can generate and send a Product and Response Valuation Response message 1913 back to the Service Order Processing process component 120. The operation 1912 uses a Synchronous Valuate Product and Resource inbound process agent 1914 to update a Material Valuation Data business object 1916, a Service Product Valuation Data business object 1918, and a Resource Valuation Data business object 1920.

The Material Valuation Data business object 1916 is an object containing attributes and internal prices for the valuation of business transactions related to a material or a material group, for material inventory valuation and for cost estimation. The Service Product Valuation Data business object 1918 is an object containing attributes and internal prices for the valuation of business transactions related to a service product or a service product group and for cost estimation. The Resource Valuation Data business object 1920 is an object containing attributes and internal cost rates for the valuation of business transactions related to a resource and for cost estimation.

Interactions between Process Components "Payment Processing" and "Due Item Processing"

Figure 20:
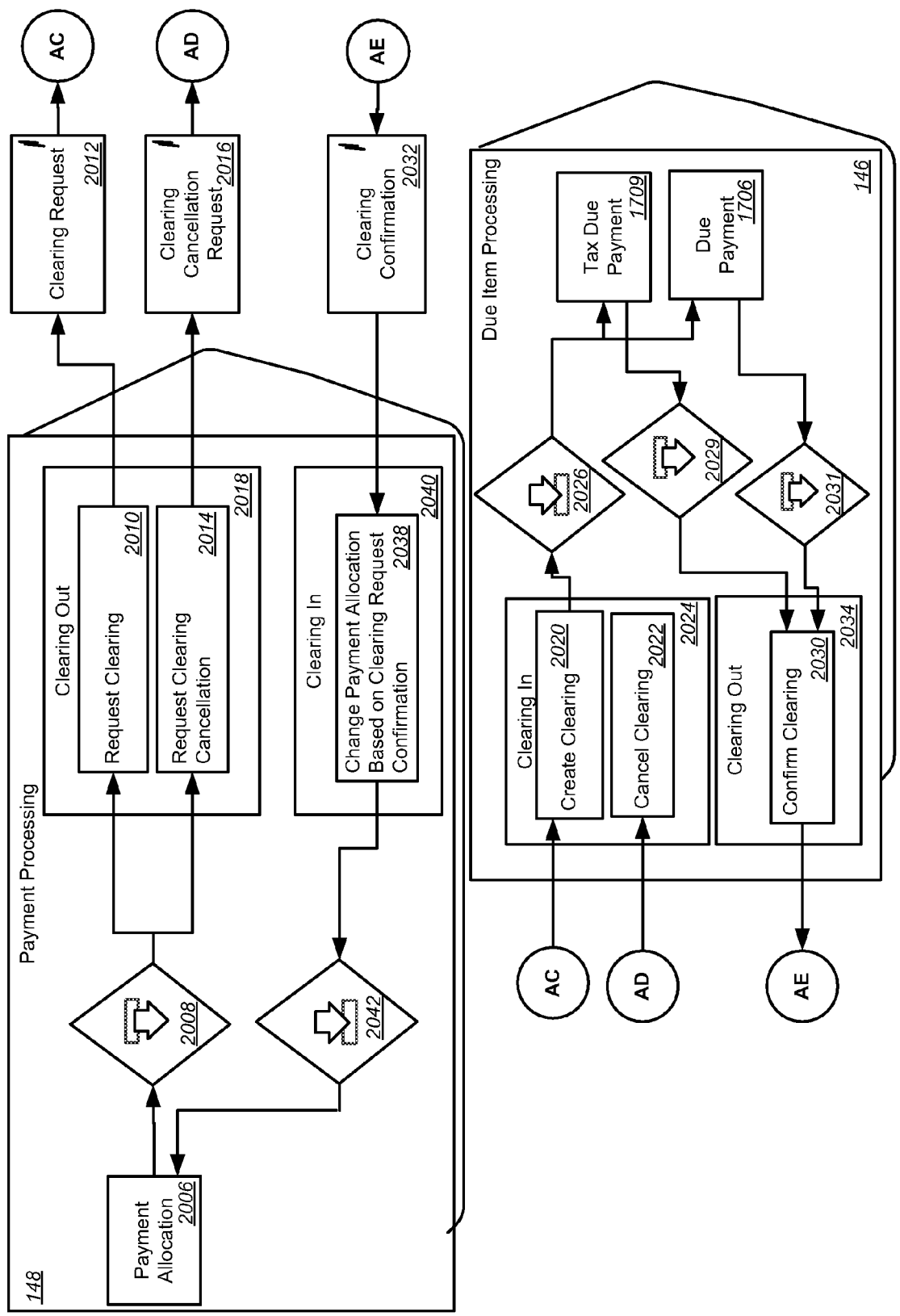
FIG. 20 is a block diagram showing interactions between the Payment Processing process component and the Due Item Processing process component.

FIG. 20 is a block diagram showing interactions between the Payment Processing process component 148 and the Due Item Processing process component 146 in the architectural design of FIGS. 1A and 1B.

The Payment Processing process component 148 includes a Payment Allocation business object 2006. The Payment Allocation business object 2006 represents an assignment of a payment item to the payment reasons from which the payment item originated. In the Payment Processing process component 148, a Request Clearing Maintenance from Payment Allocation to Due Item Processing outbound process agent 2008 uses a Request Clearing operation 2010 to send a Clearing Request message 2012 to request the clearing of payments within the Due Item Processing process component 148. Alternatively, the outbound process agent 2008 may invoke a Request Clearing Cancellation operation 2014 to cancel a payment clearing using a Clearing Cancellation Request message 2016. Both operations 2010, 2014 are included in a Clearing Out interface 2018 in the Payment Processing process component 148.

The messages 2012, 2016 are received in the Due Item Processing process component 146 and handled in a Create Clearing operation 2020 and a Cancel Clearing operation 2022, respectively. The Create Clearing operation 2020 and the Cancel Clearing operation 2022 are included in a Clearing In interface 2024. Upon creating or canceling clearing, a Maintain Clearing inbound process agent 2026 may update the Tax Due Payment business object 1709 or the Due Payment business object 1706, or both.

A Confirm Clearing from Tax Due Payment to Payment Processing outbound process agent 2029 may invoke a Confirm Clearing operation 2030 that sends a Clearing Confirmation message 2032 to the Payment Processing process component 148 for a clearing request. A Confirm Clearing from Due Payment to Payment Processing outbound process agent 2031 may also invoke the Confirm Clearing operation 2030. The operation 2030 is included in a Clearing Out interface 2034. The message 2032 is received by a Change Payment Allocation Based on Clearing Request Confirmation operation 2038 that confirms the execution or rejection of a sent Clearing Request. The operation 2038 is included in a Clearing In interface 2040. A Change Payment Allocation Based on Clearing Request Confirmation inbound process agent 2042 can update the Payment Allocation business object 2006.

Interactions between Process Components "Customer Invoice Processing" and "Supplier Invoice Processing at Customer"

Figure 21:
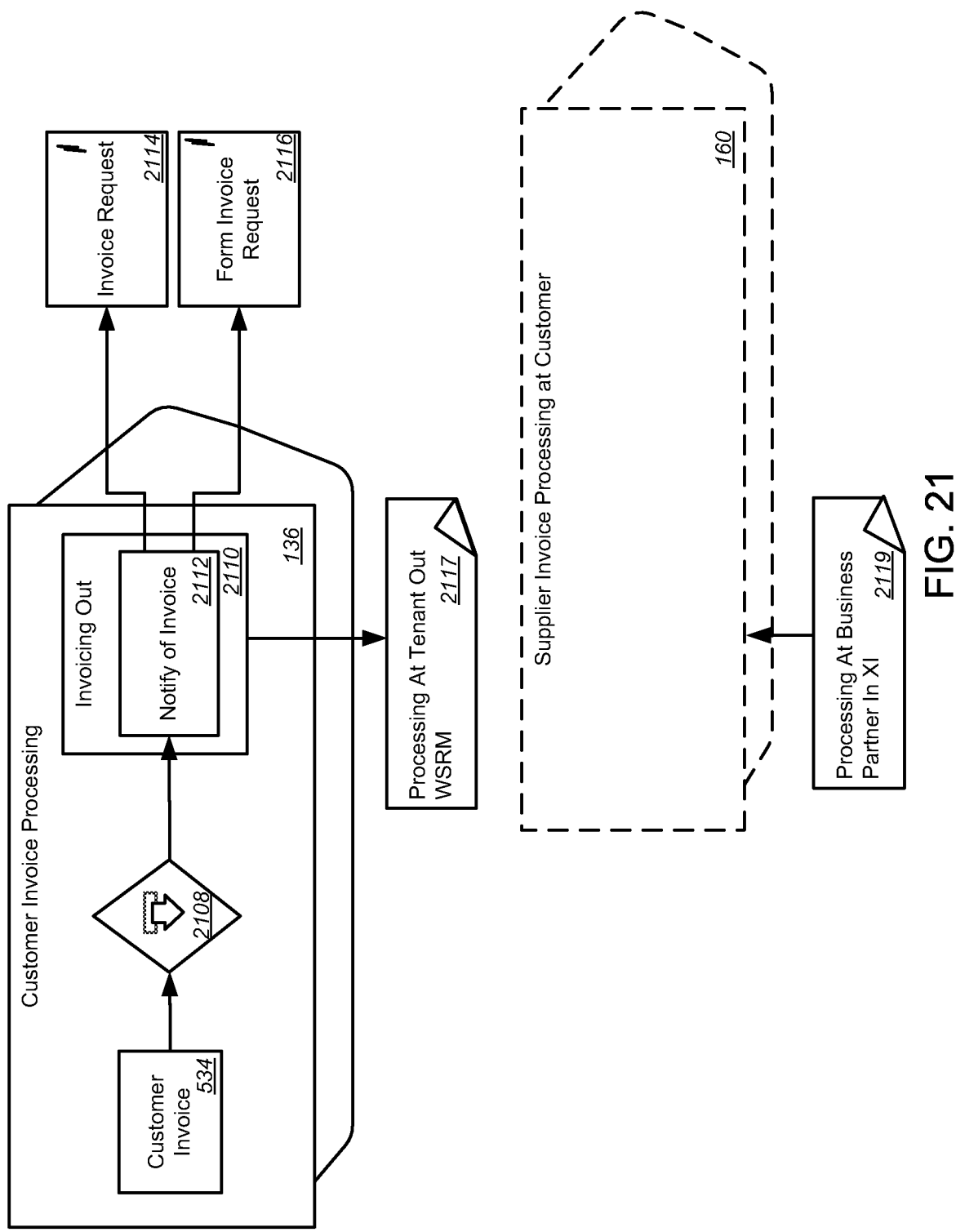
FIG. 21 is a block diagram showing interactions between the Customer Invoice Processing process component and a Supplier Invoice Processing at Customer process component.

FIG. 21 is a block diagram showing interactions between the Customer Invoice Processing process component 136 and the Supplier Invoice Processing at Customer process component 160 in the architectural design of FIGS. 1A and 1B.

The Customer Invoice Processing process component 136 includes the Customer Invoice business object 534. The Customer Invoice Processing process component 136 can inform the Supplier Invoice Processing at Customer process component 160 about a creation or cancellation of the Customer Invoice business object 534. The Supplier Invoice Processing at Customer process component 160 receives information from the Customer Invoice Processing process component 136 using a Processing At Business Partner In XI communication channel template 2119. The communication channel template 2119 can define protocols and parameters used for communication with an external party.

The Customer Invoice Processing process component 136 also includes a Notify Customer of Customer Invoice inbound process agent 2108, and a Notify of Invoice operation 2112 in an Invoicing Out interface 2110. The Customer Invoice business object 534 initiates the Notify of Invoice operation 2112 to fill billing document with data for customer usage. Upon completion of the operation 2112, the Notify of Customer Invoice operation 2112 generates and sends an Invoice Request message 2114 or a Form Invoice Request message 2116. The Customer Invoice Processing process component 136 sends information to the Supplier Invoice Processing at Customer process component 160 using a Processing At Tenant Out Web Services Reliable Messaging (WSRM) communication channel template 2117. The Invoicing Out interface 2110 sends information to the Supplier Invoice Processing at Customer process component 160 using the Processing At Tenant Out Web Services Reliable Messaging (WSRM) communication channel template 2117. The communication channel template 2117 can define protocols and parameters used for communication with an external party.

Interactions between Process Components "Bank Statement Creation at Bank" and "Payment Processing"

Figure 22:
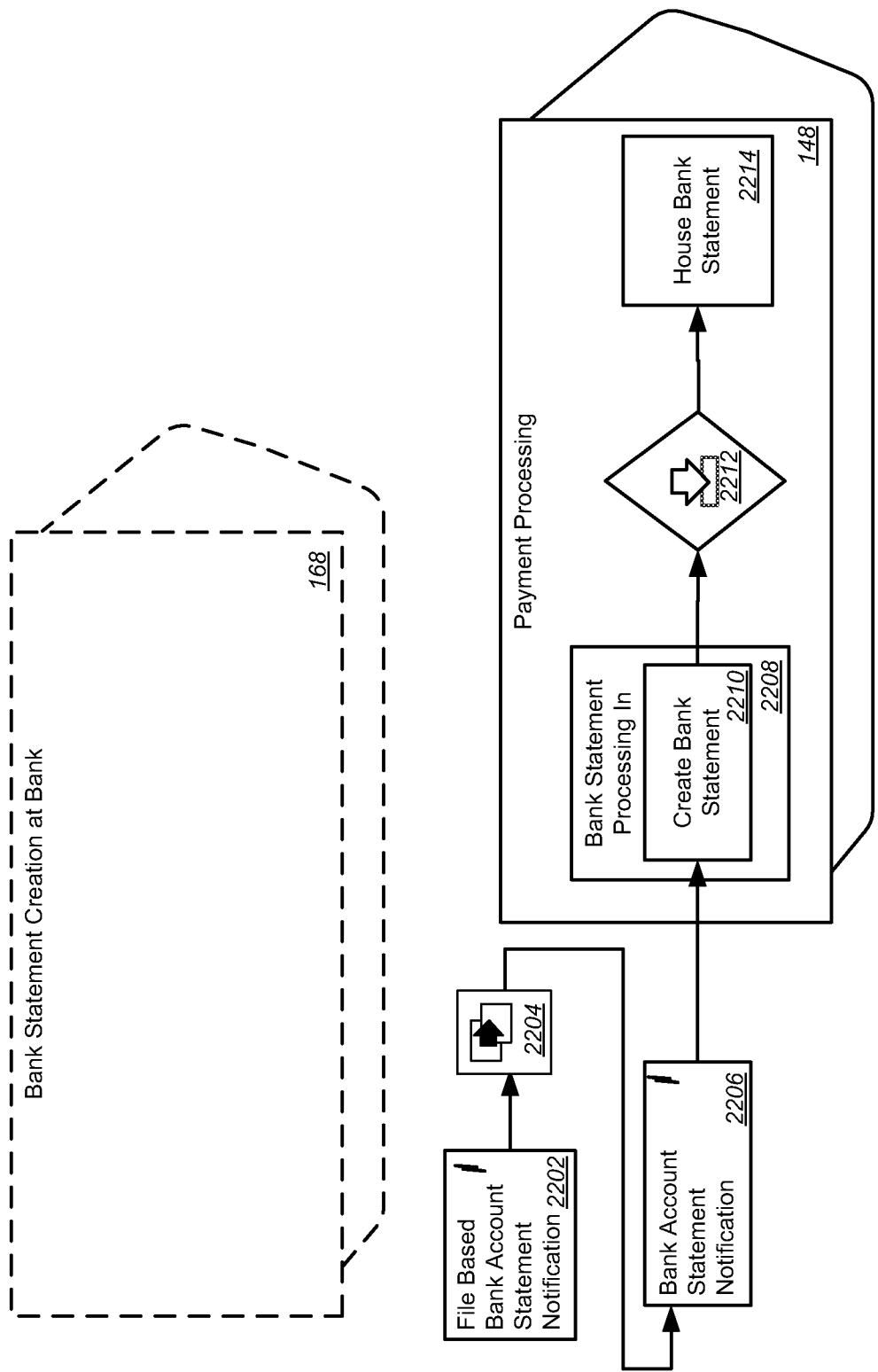
FIG. 22 is a block diagram showing interactions between a Bank Statement Creation at Bank process component and the Payment Processing process component.

FIG. 22 is a block diagram showing interactions between the Bank Statement Creation at Bank process component 168 and the Payment Processing process component 148 in the architectural design of FIGS. 1A and 1B.

As shown in FIG. 22, a bank statement is created at a bank and a File based Bank Statement Notification message 2202 is created. The File based Bank Statement Notification message 2202 uses a Mapping Entity 2204 to transform the file-based message type to a Bank Statement Notification message 2206 that can be received by the Payment Processing process component 148. The Bank Statement Notification message 2206 is received in the Payment Processing process component 148. The Payment Processing process component 148 includes a Bank Statement Processing In interface 2208. The interface 2208 includes a Create Bank Statement operation 2210 for creating a bank statement in the Payment Processing process component 148. A Maintain Bank Statement inbound process agent 2212 updates a House Bank Statement business object 2217 with a new or modified bank statement. For example, the bank statement can be a statement for a house bank account where modifications are made when bills are paid. The House Bank Statement business object 2217 is a legally binding notification from the house bank about the revenues (items) within a specific time period at a house bank account with a defined starting and closing balance.

Interactions between Process Components "Customer Invoice Processing" and "Due Item Processing"

Figure 23:
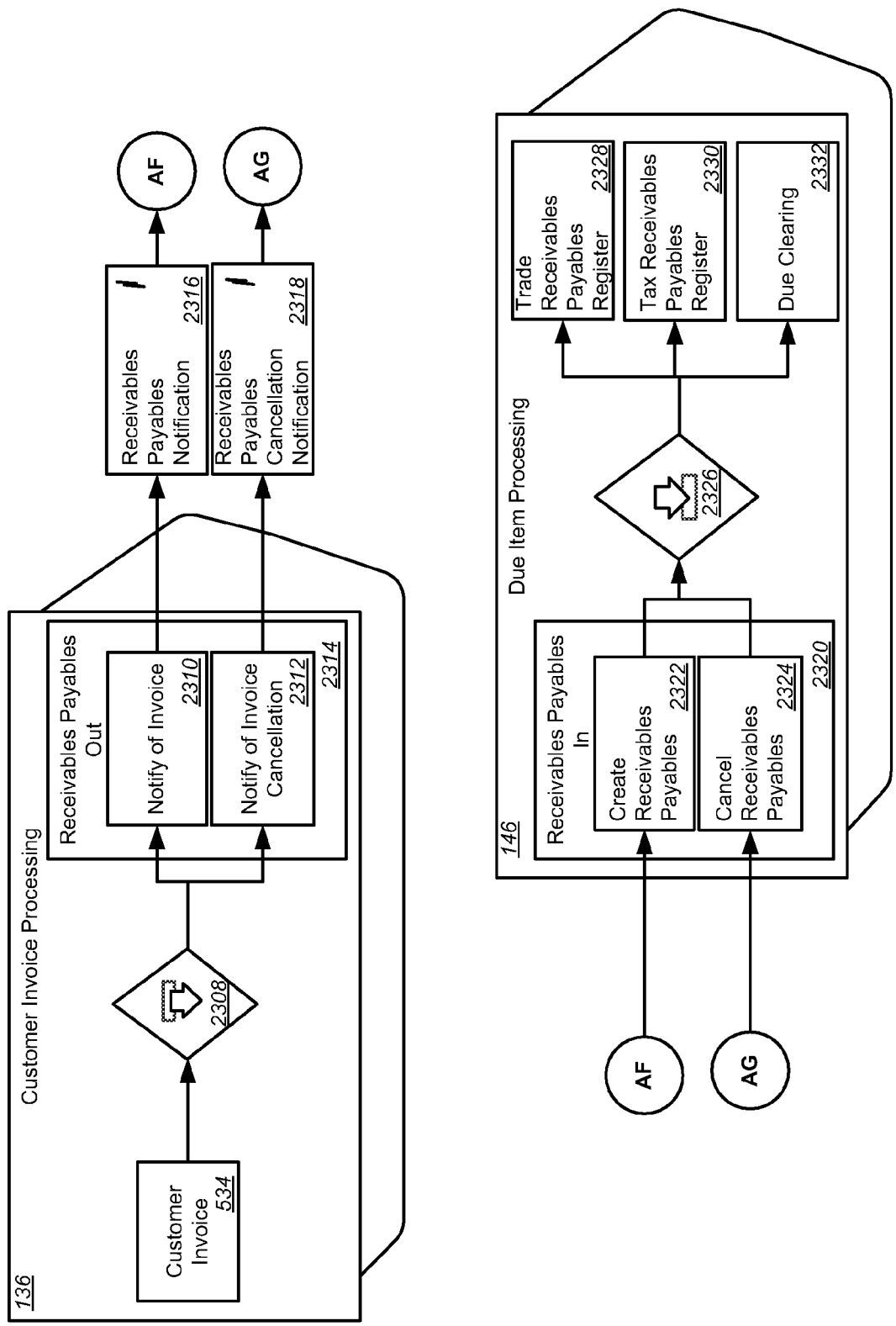
FIG. 23 is a block diagram showing interactions between the Customer Invoice Processing process component and the Due Item Processing process component.

FIG. 23 is a block diagram showing interactions between the Customer Invoice Processing process component 136 and the Due Item Processing process component 146 in the architectural design of FIGS. 1A and 1B.

The Customer Invoice Processing process component 136 includes the Customer Invoice business object 534. A Notify of Customer Invoice to Due Item Processing outbound process agent 2308 invokes a Notify of Invoice operation 2310 to inform the Due Item Processing process component 146 about a customer invoice in order to derive payment due data. Alternatively, a Notify Invoice Cancellation operation 2312 may be invoked to cancel the previously sent notification for receivables or payables due. Both operations 2310, 2312 are included in a Receivables Payables Out interface 2314. If the Notify of Invoice operation 2310 is invoked, then a Receivables Payables Notification message 2316 is sent to the Due Item Processing process component 146. If the Request Invoice Cancellation operation 2312 is invoked, then the Receivables/Payables Cancellation Notification message 2318 is sent to the Due Item Processing process component 146.

If the notification message 2316 is received, then a Create Receivables Payables operation 2322 is performed to create a trade and/or tax receivable or payable. If the cancellation message 2318 is received, then a Cancel Receivables Payables operation 2324 is performed to cancel a trade and/or tax receivable or payable. The Create Receivables Payables operation 2322 and the Cancel Receivables Payables operation 2324 are included in a Receivables Payables In interface 2320. Cancellations and updates may be sent by a Maintain Trade and Tax Receivables Payables inbound process agent 2326 to one or more of three business objects: a Trade Receivables Payables Register business object 2328, a Tax Receivables Payables Register business object 2330, and a Due Clearing business object 2332. The Trade Receivables Payables Register business object 2328 is a register for all trade receivables and payables from goods and services of a company from or to its business partners. The Tax Receivables Payables Register business object 2330 is a register of tax receivables and payables of a company that are due for delivered goods and rendered services between buyers and sellers, consumption of goods, the transfer of goods, and/or withheld from payments to sellers. The Due Clearing business object 2332 is group of receivables and payables for clearing.

Interactions between Process Components "Logistics Execution Control" and "Outbound Delivery Processing"

Figure 24:
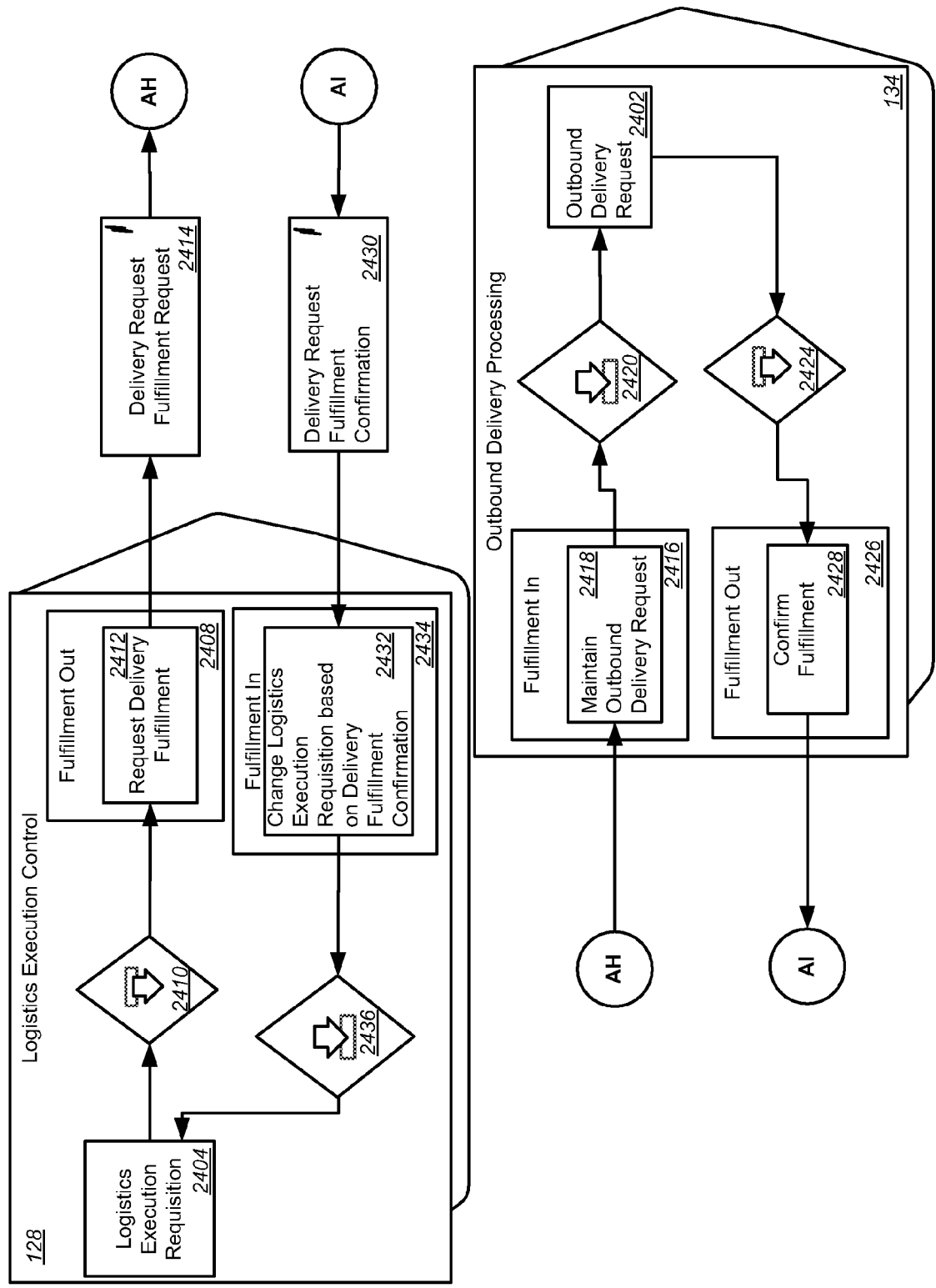
FIG. 24 is a block diagram showing interactions between the Logistics Execution Control process component and an Outbound Delivery Processing process component.

FIG. 24 is a block diagram showing interactions between the Logistics Execution Control process component 128 and the Outbound Delivery Processing process component 134 in the architectural design of FIGS. 1A and 1B.

The Logistics Execution Control process component 128 includes the Logistics Execution Requisition business object 2404. The Logistics Execution Requisition 2404 represents a requisition to Logistics to control, trigger and monitor the execution of a logistic process on a macro logistics level to fulfill an order. The Outbound Delivery Processing process component 134 includes an Outbound Delivery Request business object 2402. The Outbound Delivery Request business object 2402 is a request to a vendor to compose goods for shipping. Upon a release of the Logistics Execution Requisition business object 2404, the Logistics Execution Control process component 128 can request a creation or update of the Outbound Delivery Request business object 2402. The Outbound Delivery Processing process component 134 can confirm a delivery fulfillment to the Logistics Execution Control process component 128.

A Request Fulfillment from Logistics Execution Requisition to Outbound Delivery Processing outbound process agent 2410 invokes a Request Delivery Fulfillment operation 2412. The operation 2412 is included in a Fulfillment Out interface 2408. The operation 2412 can send a Delivery Request Fulfillment Request message 2414 in order to update the Outbound Delivery Request business object 2402.

The Delivery Fulfillment Request message 2414 is received by the Outbound Delivery Processing process component 134. The Outbound Delivery Processing process component 134 includes a Maintain Outbound Delivery Request operation 2418 that receives delivery fulfillment requests from the Logistics Execution Control process component 128. The operation 2418 is included in a Fulfillment In interface 2416. The operation 128 sends the requests into an Outbound Delivery Request business object 2402 using a Maintain Outbound Delivery Request inbound process agent 2420.

Upon receipt of the inbound delivery request, a Confirm Fulfillment of Outbound Delivery Request to Logistics Execution Control outbound delivery agent 2424 invokes a Confirm Fulfillment operation 2428. The operation 2428 is included in a Fulfillment Out interface 2426. The Confirm Fulfillment operation 2428 sends confirmation data to the Logistics Execution Control process component 128 using a Delivery Request Fulfillment Confirmation message 2430. The Logistics Execution Control process component 128 includes a Change Logistics Execution Requisition based on the Delivery Fulfillment Confirmation operation 2432, included in a Fulfillment In interface 2434, to receive the Delivery Request Fulfillment Confirmation message 2430. Using the received confirmation data, the operation 2432 may then send updates or changes by way of a Change Logistics Execution Requisition based on Delivery Fulfillment Confirmation inbound process agent 2436 into the Logistics Execution Requisition business object 2404.

Interactions between Process Components "Payment Processing" and "Accounting"

Figure 25:
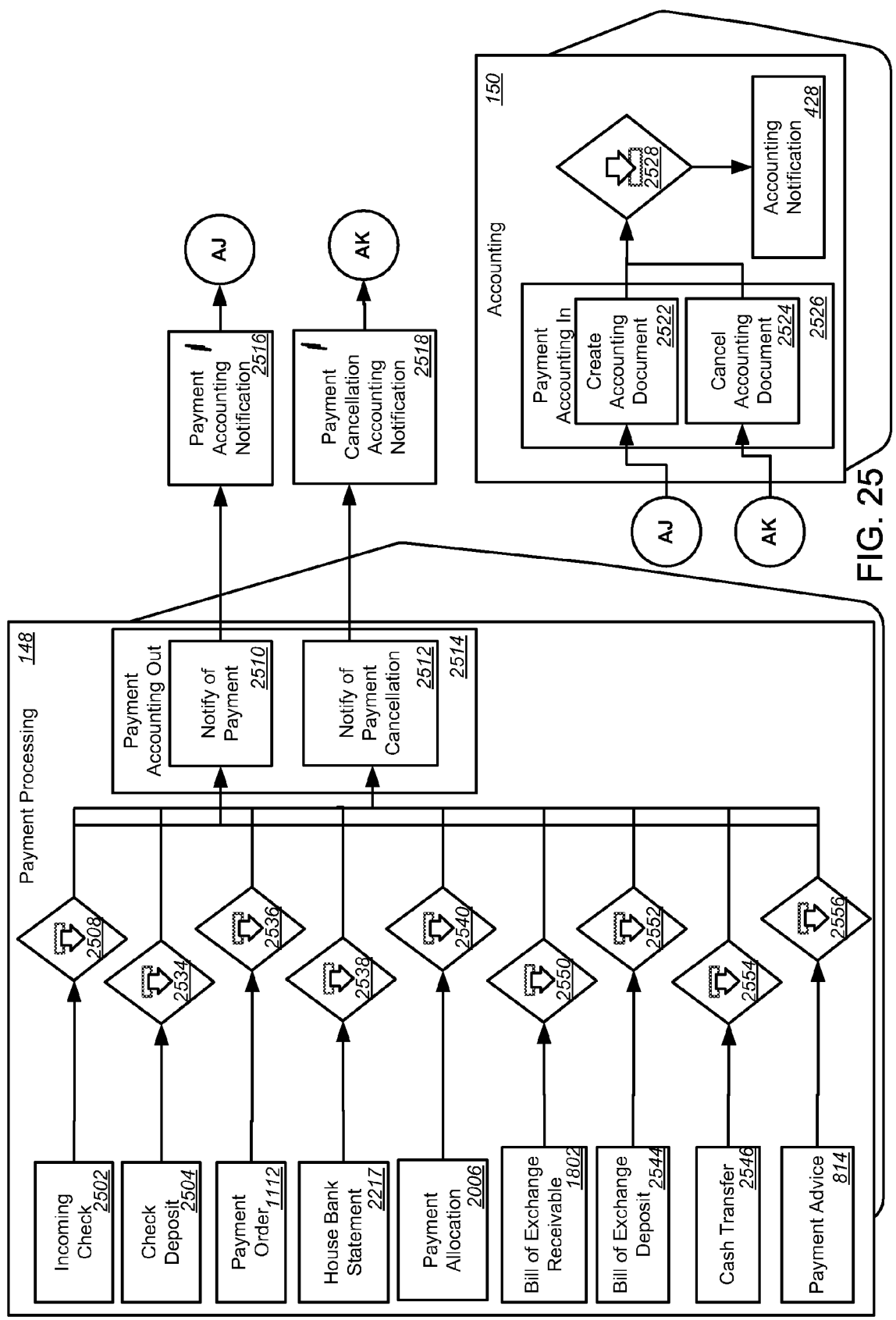
FIG. 25 is a block diagram showing interactions between the Payment Processing process component and the Accounting process component.

FIG. 25 is a block diagram showing interactions between the Payment Processing process component 148 and the Accounting process component 150 in the architectural design of FIGS. 1A and 1B.

The interaction starts when a payment is ordered, received, allocated or cancelled. The Payment Processing process component 148 processes and manages payments received, as well as the associated communication with financial institutions such as banks. In addition, the Payment Processing process component provides input for liquidity management.

As shown in FIG. 25, the Payment Processing process component 148 includes an Incoming Check business object 2502, a Check Deposit business object 2504, the Payment Order business object 1112, a House Bank Statement business object 2217, the Payment Allocation business object 2006, a Bill of Exchange Receivable business object 1802, a Bill of Exchange Deposit business object 2544, a Cash Transfer business object 2546, and a Payment Advice business object 814. The Incoming Check business object 2502 represents a check issued by a business partner payable to the company. The Check Deposit business object 2504 represents a deposit of checks at a house bank for credit to a house bank account. The Payment Order business object 1112 represents an order within a company to make a payment to a business partner at a specified time. A payment order can be a collective order that contains several individual orders. The House Bank Statement business object 2217 represents a legally binding notification from the house bank about the revenues within a specific time period at a house bank account with a defined starting and closing balance. The Payment Allocation business object 2006 represents an assignment of a payment item to the payment reasons from which the payment item originated. The Bill of Exchange Receivable business object 1802 represents a bill of exchange issued either by the company or by a business partner for the benefit of the company. The Bill of Exchange Deposit business object 2544 represents a deposit of bills of exchange receivable at a house bank for credit to a house bank account. The Cash Transfer business object 2546 represents a company-internal money transfer that includes: payments from one house bank account to another (house bank account transfer), payments from one cash storage to another (cash transfer), payments from a cash storage to a house bank account (cash deposit), and/or payments from a house bank account to a cash storage (cash withdrawal). The Payment Advice business object 814 represents an announcement of a payment transaction by a business partner to the company, specifying payment reasons.

The Incoming Check business object 2502 uses a Notify of Payment from Incoming Check to Accounting outbound process agent 2508 to invoke a Notify of Payment operation 2510 or a Notify of Payment Cancellation operation 2512. The operations 2510 and 2512 are included in a Payment Accounting Out interface 2514.

The Check Deposit business object 2504 uses a Notify of Payment from Check Deposit to Accounting outbound process agent 2534 to invoke the Notify of Payment operation 2510 or the Notify of Payment Cancellation operation 2512.

The Payment Order business object 1112 uses a Notify of Payment from Payment Order to Accounting outbound process agent 2536 to invoke the Notify of Payment operation 2510 or the Notify of Payment Cancellation operation 2512.

The House Bank Statement business object 2217 uses a Notify of Payment from Bank Statement to Accounting outbound process agent 2538 to invoke the Notify of Payment operation 2510 or the Notify of Payment Cancellation operation 2512.

The Payment Allocation business object 2006 uses a Notify of Payment from Payment Allocation to Accounting outbound process agent 2540 to invoke the Notify of Payment operation 2510 or the Notify of Payment Cancellation operation 2512.

The Bill of Exchange Receivable business object 1802 uses a Notify of Payment from Bill of Exchange Receivable to Accounting outbound process agent 2550 to invoke the Notify of Payment operation 2510 or the Notify of Payment Cancellation operation 2512.

The Bill of Exchange Deposit business object 2544 uses a Notify of Payment from Bill of Exchange Deposit to Accounting outbound process agent 2552 to invoke the Notify of Payment operation 2510 or the Notify of Payment Cancellation operation 2512.

The Cash Transfer business object 2546 uses a Notify of Payment Cash Transfer to Accounting outbound process agent 2554 to invoke the Notify of Payment operation 2510 or the Notify of Payment Cancellation operation 2512.

The Payment Advice business object 814 uses a Notify of Payment from Payment Advice to Accounting outbound process agent 2556 to invoke the Notify of Payment operation 2510 or the Notify of Payment Cancellation operation 2512.

If the Notify of Payment operation 2510 is invoked, the operation 2510 generates a Payment Accounting Notification message 2516. If the Notify of Payment Cancellation operation 2512 is invoked, the operation 2512 generates a Payment Cancellation Accounting Notification message 2518.

A Create Accounting Document operation 2522 receives the Payment Accounting Notification message 2516. A Cancel Accounting Document operation 2524 receives the Payment Cancellation Accounting Notification message 2518. The operations 2522 and 2524 are included in a Payment Accounting Out interface 2526. The operations 2522 and 2524 use a Maintain Accounting Document based on Payment inbound process agent 2528 to update the Accounting Notification business object 428. The Accounting Notification business object 428 represents a notification sent to the Accounting process component 150 by an operational component regarding a business transaction. For example, the Accounting Notification business object 428 represents the operational business transaction in a standardized form for all business transaction documents, and can include the data needed to valuate the business transaction.

If the Notify of Payment operation 2510 is invoked, then the Payment Accounting Notification message 2516 is sent to the Accounting process component 150 to update the Accounting Notification business object 428. If the Notify of Payment Cancellation operation 2512 is invoked, then the Payment Cancellation Accounting Notification message 2518 is sent to the Accounting process component 150 to update the Accounting Notification business object 428.

Interactions between Process Components "Due Item Processing" and "Accounting"

Figure 26:
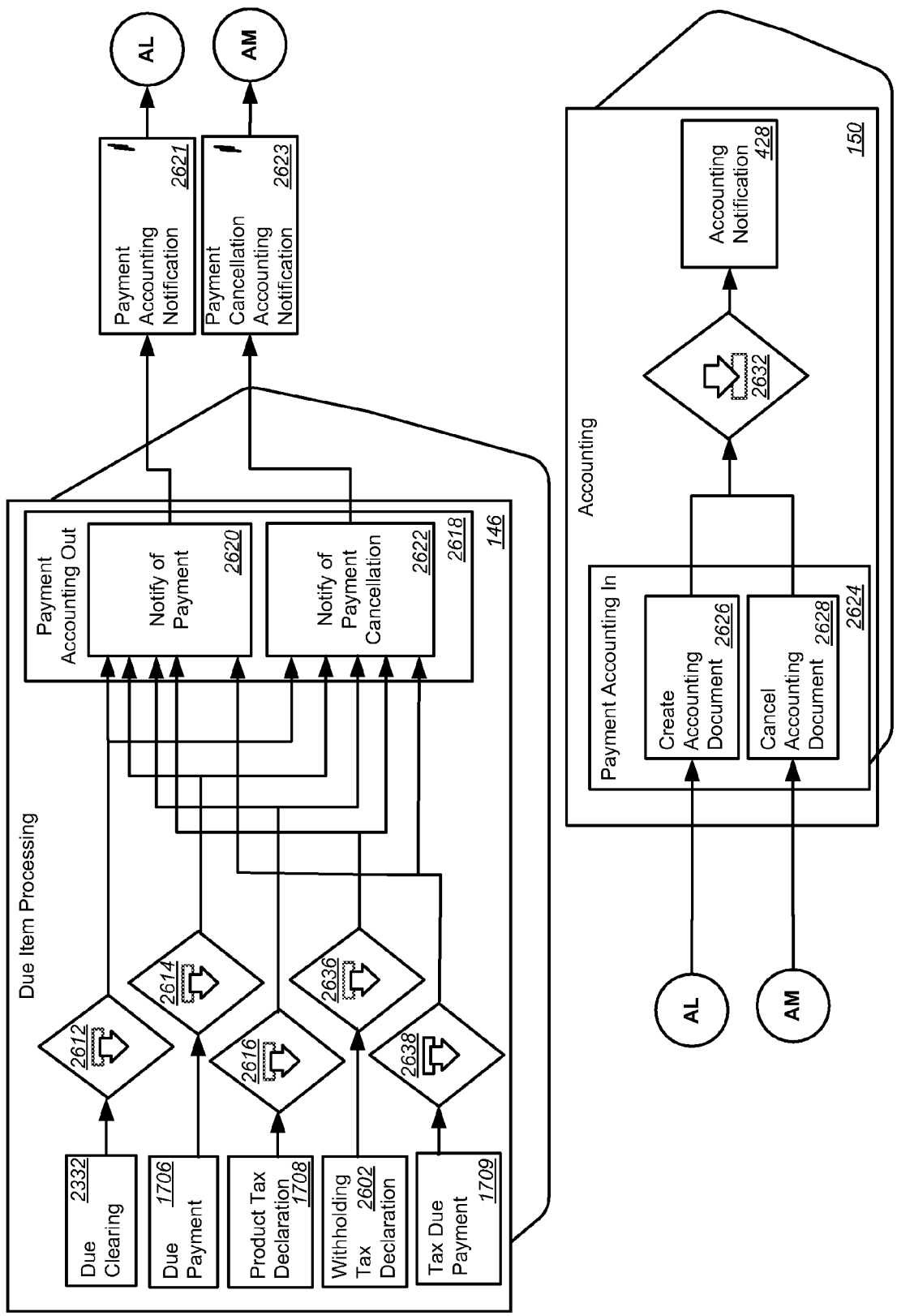
FIG. 26 is a block diagram showing interactions between the Due Item Processing process component and the Accounting process component.

FIG. 26 is a block diagram showing interactions between the Due Item Processing process component 146 and the Accounting process component 150 in the architectural design of FIGS. 1A and 1B.

The interaction starts when a payment or clearing for trade or tax receivables or payables is created or cancelled. The Due Item Processing process component 146 notifies the Accounting process component 150 about the creation or cancellation of the payment or clearing.

As shown in FIG. 26, the Due Item Processing process component 146 includes a Due Clearing business object 2332, the Due Payment business object 1706, the Product Tax Declaration business object 1708, a Withholding Tax Declaration business object 2602, and the Tax Due Payment business object 1709. The Due Clearing business object 2332 represents a group of receivables and payables for clearing. The Due Payment business object 1706 represents a payment request or payment confirmation with regard to trade receivables and payables. The Product Tax Declaration business object 1708 represents a declaration of the product tax payables or receivables of a company to the responsible tax authority according to the tax declaration arrangement and country specific legal requirements, that triggers the payment to the tax authority if required. The Withholding Tax Declaration business object 2602 represents a declaration of withholding tax payables of a company to a tax authority according to the tax declaration arrangement and country specific legal requirements. The Tax Due Payment business object 1709 represents a payment request or payment confirmation with regard to tax payables and receivables.

The Due Clearing business object 2332 uses a Notify of Payment from Due Clearing to Accounting outbound process agent 2612 to invoke a Notify of Payment operation 2620 or a Notify of Payment Cancellation operation 2622. The operations 2620 and 2622 are included in a Payment Accounting Out interface 2618.

The Due Payment business object 1706 uses a Notify of Payment from Due Payment to Accounting outbound process agent 2614 to invoke the Notify of Payment operation 2620 or the Notify of Payment Cancellation operation 2622.

The Product Tax Declaration business object 1708 uses a Notify of Payment from Product Tax Declaration to Accounting outbound process agent 2616 to invoke the Notify of Payment operation 2620 or the Notify of Payment Cancellation operation 2622.

The Withholding Tax Declaration business object 2602 uses a Notify of Payment from to Withholding Tax Declaration to Accounting outbound process agent 2636 to invoke the Notify of Payment operation 2620 or the Notify of Payment Cancellation operation 2622.

The Tax Due Payment business object 1709 uses a Notify of Payment from Tax Due Payment to Accounting outbound process agent 2638 to invoke the Notify of Payment operation 2620 or the Notify of Payment Cancellation operation 2622.

The Notify of Payment operation 2620 is invoked if a VAT (value added tax) declaration is released. The Notify of Payment Cancellation operation 2622 is invoked if the VAT declaration is cancelled.

If the Notify of Payment operation 2620 is invoked, the operation 2620 generates a Payment Accounting Notification message 2621. If the Notify of Payment Cancellation operation 2623 is invoked, the operation 2623 generates a Payment Cancellation Accounting Notification message 2623.

The Payment Accounting Notification message 2621 is received in a Create Accounting Document operation 2626. The Create Accounting Document operation 2626 handles the Payment Accounting Notification message 2621. The Create Accounting Document operation 2626 is included in a Payment Accounting In interface 2624.

The Payment Cancellation Accounting Notification message 2623 is received in a Cancel Accounting Document operation 2628. The Cancel Accounting Document operation 2628 handles the Payment Cancellation Accounting Notification message 2623. The Cancel Accounting Document operation 2628 is included in a Payment Accounting In interface 2624.

The Create Accounting Document operation 2626 and the Cancel Accounting Document operation 2628 both use a Maintain Accounting Document based on Payment inbound process agent 2632 to update the Accounting Notification business object 428. The Accounting Notification business object 428 represents a notification sent to the Accounting process component 150 by an operational component regarding a business transaction. For example, the Accounting Notification business object 428 represents this operational business transaction in a standardized form for all business transaction documents, and can include the data needed to valuate the business transaction.

Interactions between Process Components "Service Order Processing" and "Customer Requirement Processing"

Figure 27A:
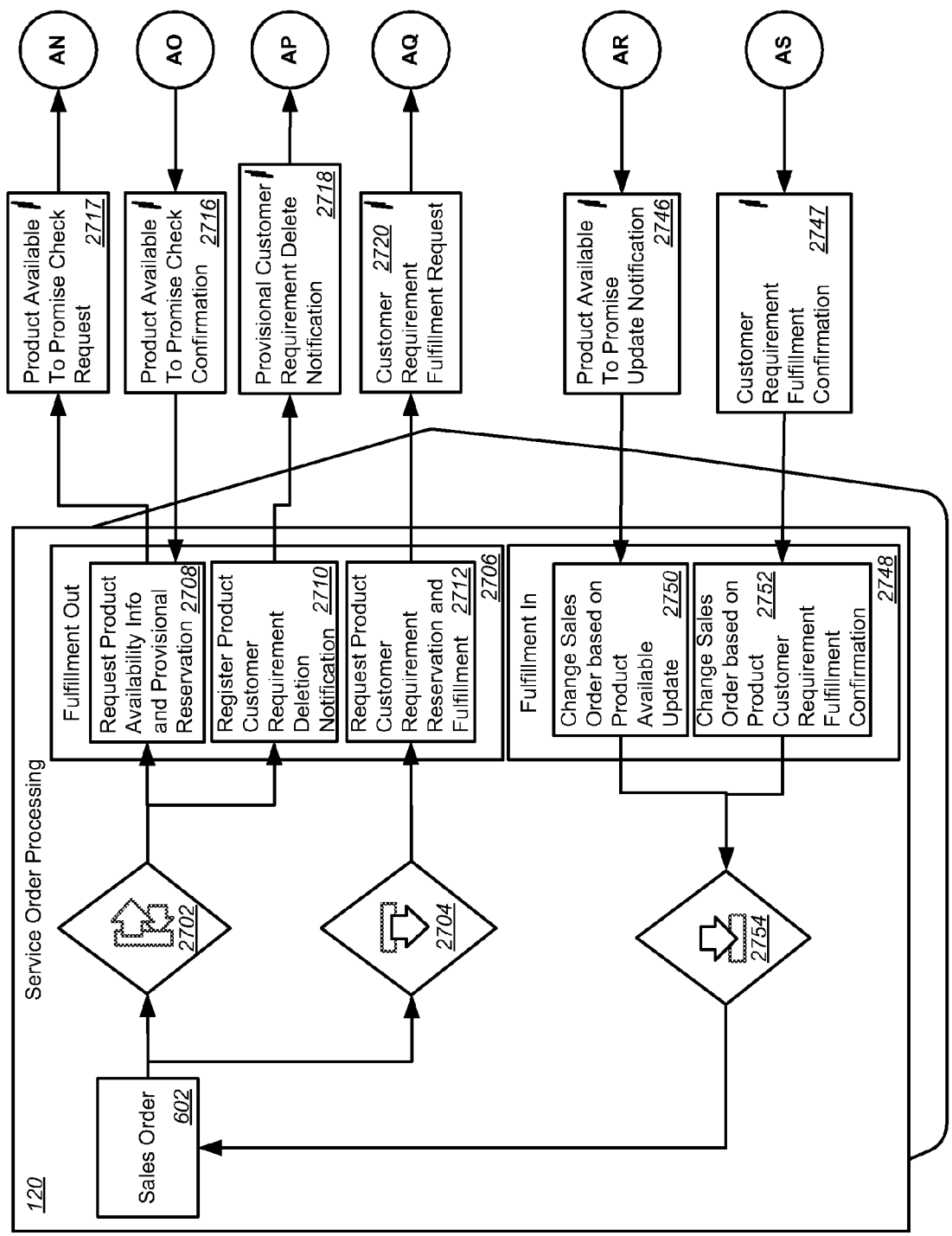
FIGS. 27A and 27B are block diagrams collectively showing the interactions between the Service Order Processing process component and a Customer Requirement Processing process component.
Figure 27B:
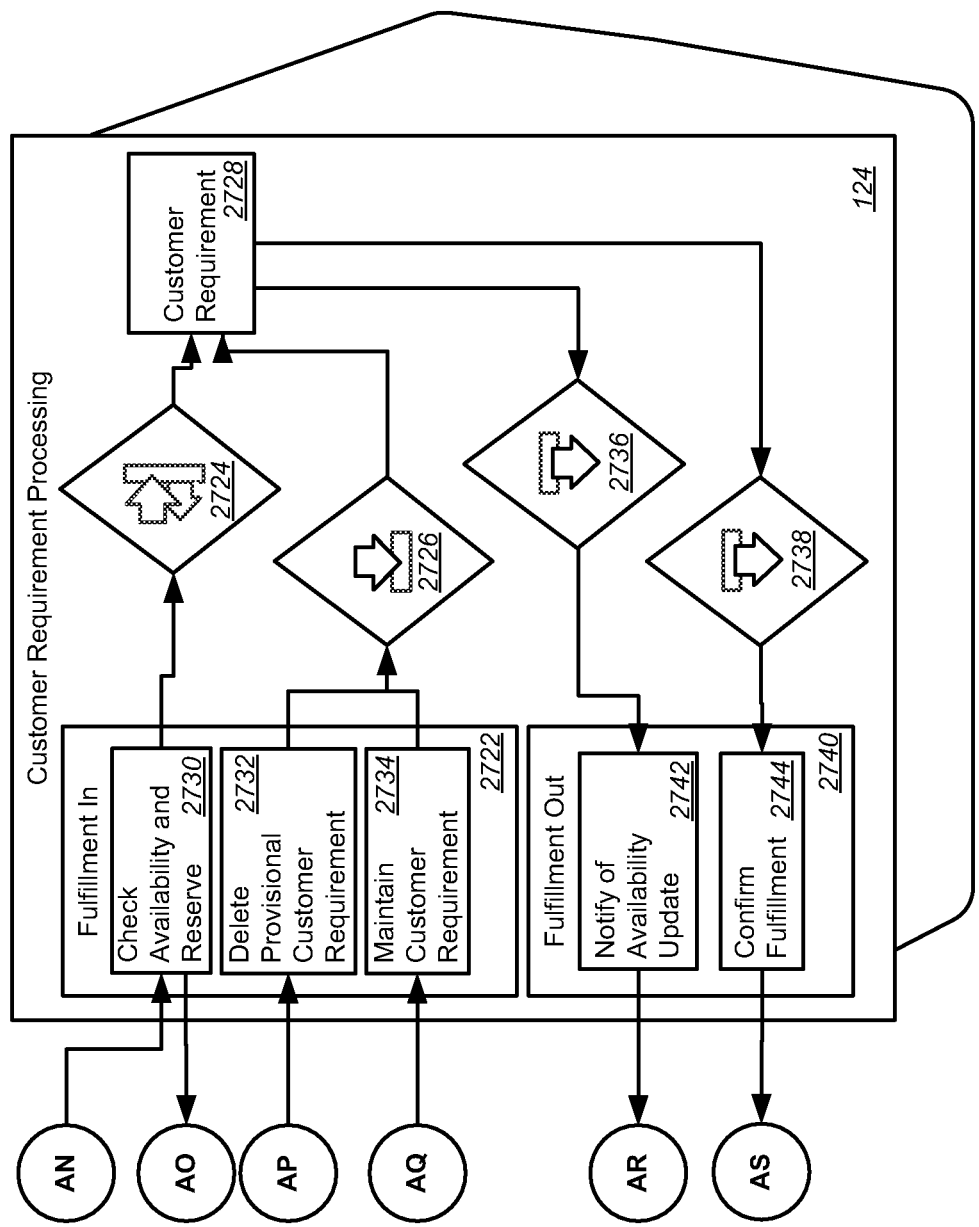

FIGS. 27A and 27B are block diagrams collectively showing the interactions between the Service Order Processing process component 120 and the Customer Requirement Processing process component 124 in the architectural design of FIGS. 1A and 1B.

As shown in FIG. 27A, the Service Order Processing process component 120 requests an availability check for spare parts from the Customer Requirement Processing process component 124 based on a creation or update to the Service Order business object 602. The Service Order Processing process component 120 can also request delivery or provision of the spare parts. Upon receiving the requests, the Customer Requirement Processing process component 124 notifies the Service Order Processing process component 120 about a present availability of the requested parts and confirms the delivery or provision of the spare parts.

The Service Order Processing process component 120 includes a Synchronous Request Product Availability from Service Order to Customer Requirement synchronous outbound process agent 2702, a Request Requirement Reservation and Fulfillment from Service Order to Customer Requirement outbound process agent 2704, and a Fulfillment Out interface 2706.

The Fulfillment Out interface 2706 includes a Request Product Availability Information and Provisional Reservation operation 2708, a Register Product Customer Requirement Deletion Notification operation 2710, and a Request Product Customer Requirement Reservation and Fulfillment operation 2712.

The Request Product Availability Information and Provisional Reservation operation 2708 requests product availability information including the creation of a provisional reservation for customer requirement (e.g., a sales order). The Register Product Customer Requirement Deletion Notification operation 2710 registers provisional requirement reservation for deletion and triggers deletion in case of failure or cancellation of transaction processing. The Request Product Customer Requirement Reservation and Fulfillment operation 2712 requests reservation and fulfillment for customer requirement.

The Synchronous Request Product Availability from Service Order to Customer Requirement synchronous outbound process agent 2702 invokes the Request Product Availability Information and Provisional Reservation operation 2708 to send a Product Available to Promise Check Request message 2717 to the Customer Requirement Processing process component 124. After transmitting the message 2717, the Request Product Availability Information and Provisional Reservation operation 2708 receives a Product Available to Promise Check Confirmation message 2716. Alternatively, the operation 2708 invokes a Register Product Customer Requirement Deletion Notification operation 2710 to send a Provisional Customer Requirement Delete Notification message 2718 to the Customer Requirement Processing process component 124.

The Request Requirement Reservation and Fulfillment from Service Order to Customer Requirement outbound process agent 2704 uses the Request Product Customer Requirement Reservation and Fulfillment operation 2712. The Request Product Customer Requirement Reservation and Fulfillment operation 2712 sends a Customer Requirement Fulfillment Request message 2720 to the Customer Requirement Processing process component 124.

The Customer Requirement Processing process component 124 includes a Fulfillment In interface 2722, a Check Availability and Reserve synchronous inbound process component 2724, a Maintain Customer Requirement inbound process component 2726, and a Customer Requirement business object 2728. The Check Availability and Reserve synchronous inbound process component 2724 receives a request for a reserving ATP (available-to-promise) check and triggers the corresponding customer requirement services. The Maintain Customer Requirement inbound process component 2726 receives a customer requirement fulfillment request and updates the corresponding customer requirement instance. The Customer Requirement business object 2728 is a requirement that is derived from a sales order, quotation, or service order and to which details on the anticipated availability date of materials required to fulfill the requirement may be added. The business object 2728 can include quantities of materials required at specific dates as well as information about which materials will be available or delivered in which quantities at which dates.

As shown in FIG. 27B, the Fulfillment In interface 2722 includes a Check Availability and Reserve operation 2730, a Delete Provisional Customer Requirement operation 2732, and a Maintain Customer Requirement operation 2734 to create or update the Customer Requirement business object 2728.

The Check Availability and Reserve operation 2730 checks the availability of certain amounts of certain materials and confirms this availability to the caller. Upon receiving the Product Available to Promise Check Request message 2714, the Check Availability and Reserve operation 2730 can confirm the reception of the message 2714 by sending the Product Available to Promise Check Confirmation message 2716 to the Service Order Processing process component 120. The operation 2730 also uses the Check Availability and Reserve synchronous inbound process agent 2724 to create or update the Customer Requirement business object 2728.

The Delete Provisional Customer Requirement operation 2732 receives the Provisional Customer Requirement Deletion Notification message 2718. After receiving the message 2718, the operation 2732 uses the Maintain Customer Requirement inbound process agent 2726 to delete provisional customer requirements created by the Check Availability and Reserve operation 2730.

The Maintain Customer Requirement operation 2734 receives the Customer Requirement Fulfillment Request message 2720. The operation 2734 uses the Maintain Customer Requirement inbound process agent 2726 to create or change the Customer Requirement business object 2728.

The Customer Requirement Processing process component 124 also includes a Notify of Availability Update from Customer Requirement outbound process agent 2736, a Confirm Fulfillment of Customer Requirement outbound process agent 2738, and a Fulfillment Out interface 2740. The Fulfillment Out interface 2740 includes a Notify of Availability Update operation 2742 and a Confirm Fulfillment operation 2744.

The Notify of Availability Update operation 2742 notifies a creator of a customer requirement about an updated availability situation for the products requested within the customer requirement. The Confirm Fulfillment operation 2744 confirms partial or complete fulfillment of a customer requirement to a creator of the requirement. For example, a fulfillment may be a fulfillment of some or all aspects of an order that can be achieved by logistics processes. It does not comprise other aspects, e.g. financials.

The Notify of Availability Update from Customer Requirement outbound process agent 2736 uses the Notify of Availability Update operation 2742 to send the availability update notification to the Service Order Processing process component 120. The Notify of Availability Update operation 2742 transmits a Product Available to Promise Update Notification message 2746 to the Service Order Processing process component 120. The Confirm Fulfillment of Customer Requirement outbound process agent 2738 uses the Confirm Fulfillment operation 2744 to send the fulfillment confirmation to the Service Order Processing process component 120. The Confirm Fulfillment operation 2744 transmits a Customer Requirement Fulfillment Confirmation message 2747 to the Service Order Processing process component 120.

The Service Order Processing process component 120 includes a Fulfillment In interface 2748. The Fulfillment In interface 2748 includes a Change Service Order based on Product Availability Update operation 2750 and a Change Service Order based on Product Customer Requirement Fulfillment Confirmation operation 2752. The Change Service Order based on Product Availability Update operation 2750 receives the Product Available to Promise Update Notification message 2746. Using a Change Service Order based on Customer Requirement inbound process agent 2754, the Change Service Order based on Product Availability Update operation 2750 updates the Service Order business object 602 with spare part availability and reservation information based on customer requirement fulfillment planning data.

The Change Service Order based on Product Customer Requirement Fulfillment Confirmation operation 2752 receives the Customer Requirement Fulfillment Confirmation message 2747. The Change Service Order based on Product Customer Requirement Fulfillment Confirmation operation 2752 uses the Change Service Order based on Customer Requirement inbound process agent 2754 to update the Service Order business object 602 with spare part quantity delivered to customer or picked up by service technician.

Interactions between Process Components "Customer Quote Processing" and "Financial Accounting Master Data Management"

Figure 28:
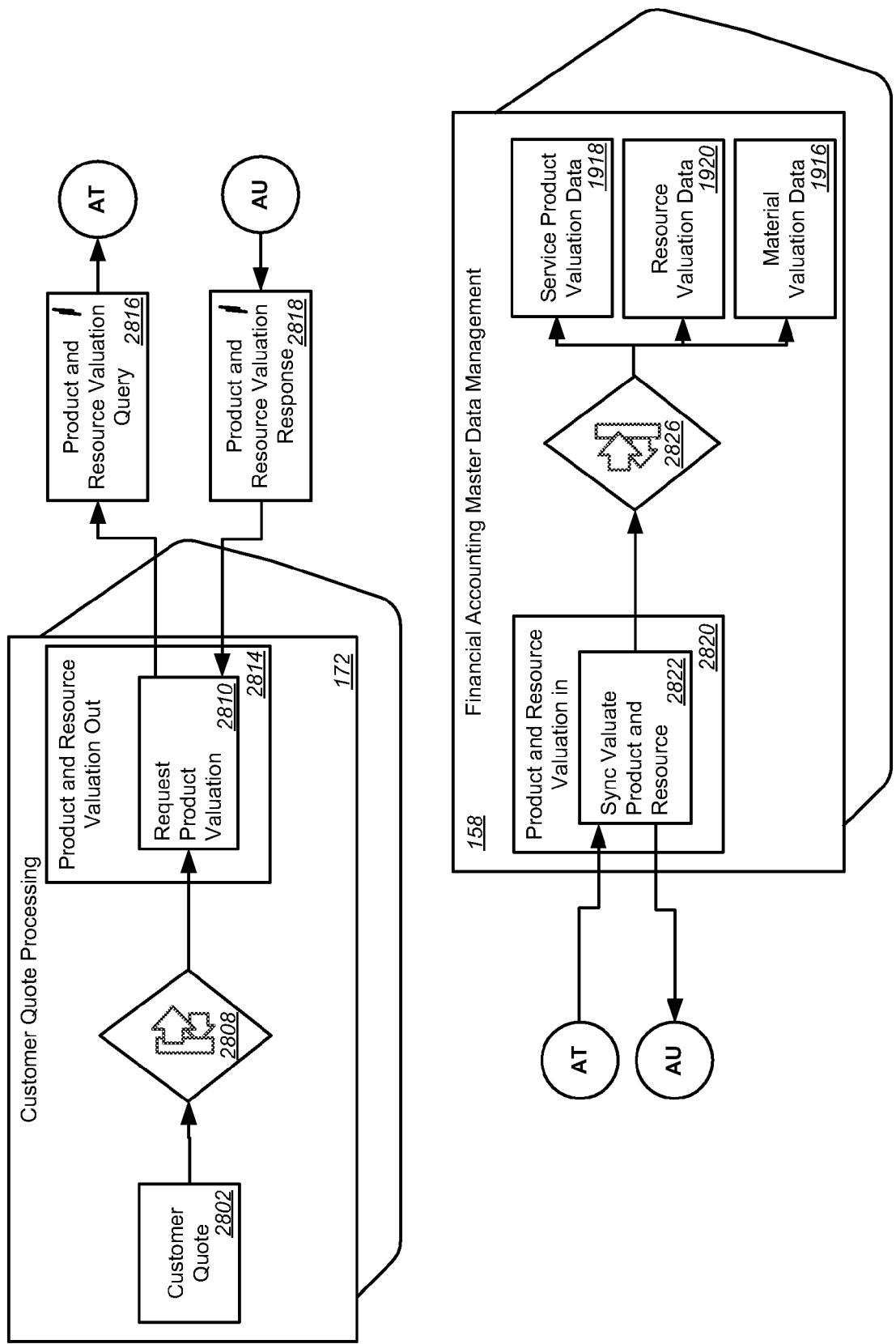
FIG. 28 is a block diagram showing the interactions between a Customer Quote Processing process component and the Financial Accounting Master Data Management process component.

FIG. 28 is a block diagram showing the interactions between the Customer Quote Processing process component 172 and the Financial Accounting Master Data Management process component 152 in the architectural design of FIGS. 1A and 1B. An interaction starts when a customer quote is created or changed. The Customer Quote Processing process component 172 requests the product valuation price from the Financial Accounting Master Data Management process component 152. The Financial Accounting Master Data Management process component 152 provides the requested information to the requester.

As shown in FIG. 28, the Customer Quote Processing process component 172 includes a Customer quote business object 2802. The Customer quote business object 2802 represents an offer by a seller to a customer for the delivery of goods or services according to fixed terms. The offer can be legally binding for the seller for a specific period of time. The Customer quote business object 2802 uses a Synchronous Request Product Valuation from Customer Quote to Financial Accounting Master Data outbound process agent 2808 to invoke a Request Product Valuation operation 2810. The operation 2810 is included in a Product and Resource Valuation Out interface 2814. The operation 2810 requests a product valuation.

The Request Product Valuation operation 2810 generates a Product and Resource Valuation Query message 2816. The message 2816 is sent to the Financial Accounting Master Data Management process component 152. The message 2816 is received by a Synchronous Valuate Product and Resource operation 2822. The operation 2822 is included in a Product and Resource Valuation In interface 2820. The operation 2822 is a synchronous access to price information for products.

The Synchronous Valuate Product and Resource operation 2822 uses a Synchronous Valuate and Product Resource inbound process agent 2826 to update one of a possible three business objects in the Financial Accounting Master Data Management process component 152: a Material Valuation Data business object 1916, a Service Product Valuation Data business object 1918, and a Resource Valuation Data business object 1920. The Material Valuation Data business object 1916 represents an object that includes attributes and internal prices for the valuation of business transactions related to a material or a material group, for material inventory valuation and for cost estimation. The Service Product Valuation Data business object 1918 represents an object that includes attributes and internal prices for the valuation of business transactions related to a service product or a service product group and for cost estimation. The Resource Valuation Data business object 1920 represents an object that includes attributes and internal cost rates for the valuation of business transactions related to a resource and for cost estimation.

The Synchronous Valuate Product and Resource operation 2822 can generate a Product and Resource Valuation Response message 2818. The message is sent to the Request Product Valuation operation 2810 in the Customer Quote Processing process component 172.

Interactions between Process Components "Customer Quote Processing" and "Customer Requirement Processing"

Figure 29:
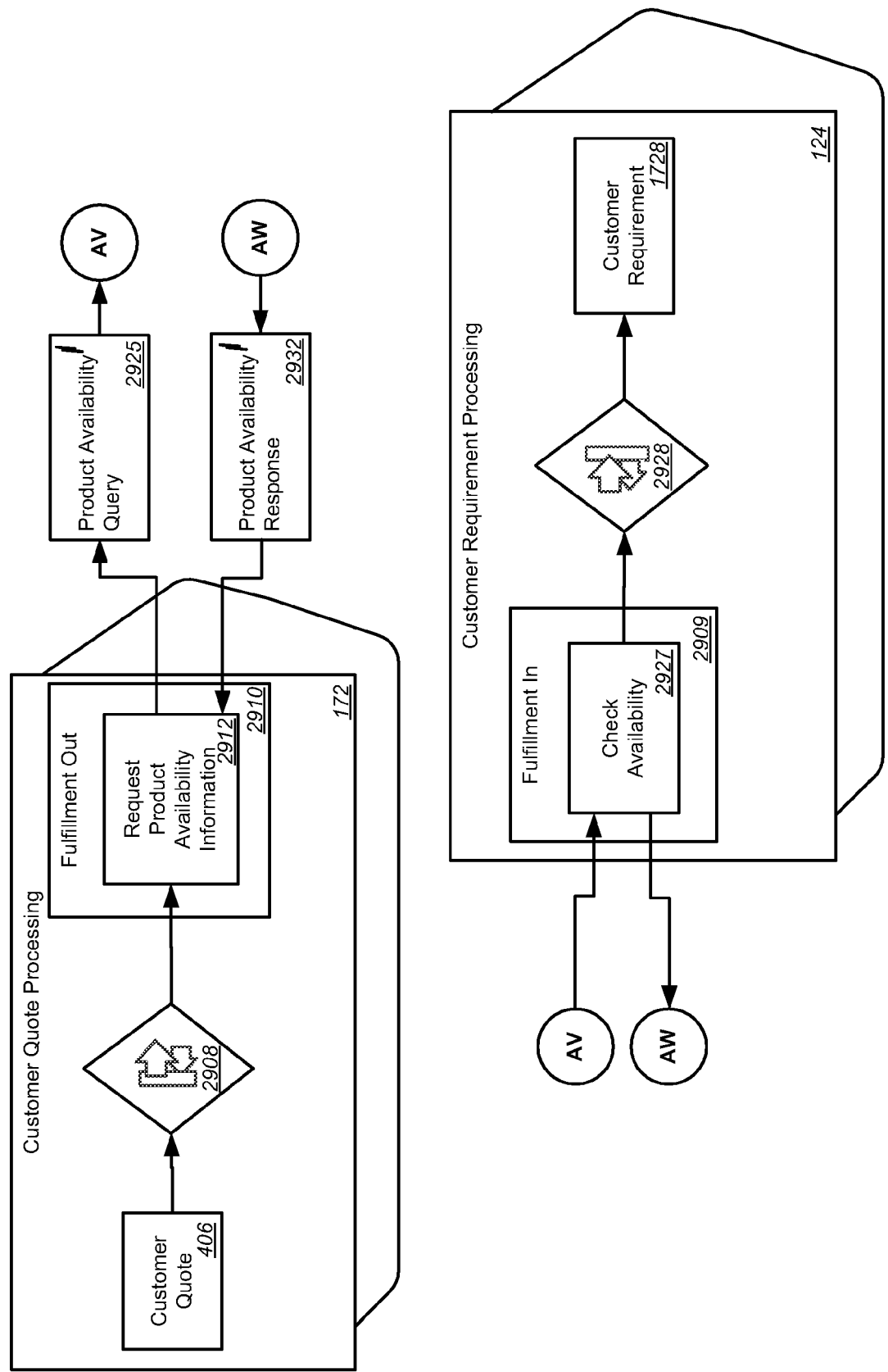
FIG. 29 is a block diagram showing the interactions between the Customer Quote Processing process component and the Customer Requirement Processing process component.

FIG. 29 is a block diagram showing the interactions between the Customer Quote Processing 172 process component and the Customer Requirement Processing process component 124 in the architectural design of FIGS. 1A and 1B. An interaction starts when the Customer Quote Processing process component 172 requests an availability check for the desired product from Customer Requirement Processing process component 124 when a customer quote is created or updated. The Customer Quote Processing process component 172 also requests preparation of the fulfillment when it is saved. The Customer Requirement Processing process component 124 then notifies Customer Quote Processing process component 172 when the availability situation changes.

As shown in FIG. 29, the Customer Quote Processing process component 172 includes a Customer quote business object 2802. The Customer quote business object 2802 represents an offer by a seller to a customer for the delivery of goods or services according to fixed terms. The offer is legally binding for the seller for a specific period of time. The Customer quote business object 2802 uses a Synchronous Request Product Availability from Customer Quote to Customer Requirements outbound process agent 2908 to invoke a Request Product Availability Information operation 2912. The operation 2912 is included in a Fulfillment Out interface 2910. The operation 2912 can request product availability information for customer quote items. The Request Product Availability Information operation 2912 generates a Product Availability Query message 2925. The message 2925 is sent to the Customer Requirement Processing process component 124.

A synchronous Check Availability operation 2927 receives the Product Availability Query message 2925. The operation 2927 is included in a Fulfillment In interface 2909. The operation 2927 uses a Check Availability inbound process agent 2928 to update the Customer Requirement business object 2728. The message 2925 is a non-binding query for the availability of specified amounts of specified products at specified dates. The operation 2927 checks the availability of certain amounts of materials at certain dates and sends this information back to the Customer Quote Processing process component 172. The Customer Requirement business object 2728 represents a requirement that is derived from a sales order, quotation, or service order and to which details on the anticipated availability date of materials required to fulfill the requirement may be added. It can include the quantities of materials required at specific dates as well as information about which materials will be available or delivered in which quantities at which dates.

The Check Availability operation 2927 may generate a Product Availability Response message 2932. The message 2932 is received by the Request Product Availability Information operation 2912 in the Customer Quote Processing process component 172. The message 2932 is a non-binding response about which amounts of products are available at which dates.

Interactions between Process Components "Site Logistics Processing" and "Accounting"

Figure 30:
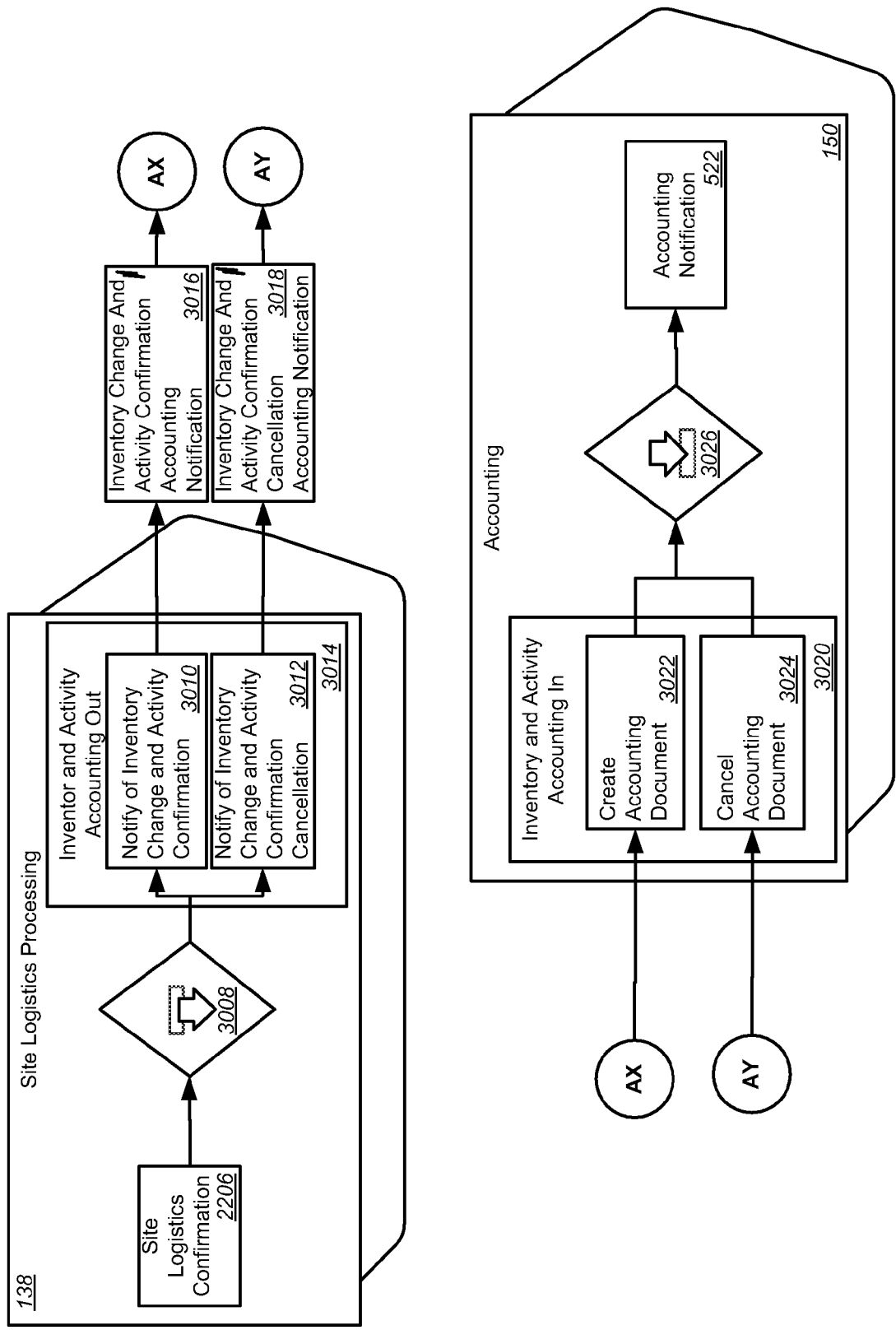
FIG. 30 is a block diagram showing the interactions between a Site Logistics Processing process component and the Accounting process component.

FIG. 30 is a block diagram showing the interactions between the Site Logistics Processing process component 130 and the Accounting process component 150 in the architectural design of FIGS. 1A and 1B. The interaction starts when a site logistics confirmation is created. The Site Logistics Processing process component 130 notifies the Accounting process component 150 of confirmed or cancelled inventory changes. The inventory changes are used to update the Accounting process component 150.

The Site Logistics Processing process component 130 includes a Site Logistics Confirmation business object 3006. The Site Logistics Confirmation business object 3006 represents a record of confirmed logistic process changes which result from the execution of a site logistics process at a specific time (e.g., inventory changes, plan adjustments, resource utilizations, or progress status changes).

The Site Logistics Confirmation business object 3006 uses a Notify of Inventory Change from Site Logistics Confirmation to Accounting outbound process agent 3008. The Accounting outbound process agent 3008 invokes a Notify of Inventory Change and Activity Confirmation operation 3010 to send an inventory change accounting notification to the Accounting process component 150. Alternatively, a Notify of Inventory Change and Activity Confirmation Cancellation operation 3012 can be invoked. The operation 3012 can request inventory change and activity provision cancellation. Both operations 3010, 3012 are included in an Inventory and Activity Accounting Out interface 3014.

If the Notify of Inventory Change and Activity Confirmation operation 3010 is invoked, then an Inventory Change and Activity Confirmation Accounting Notification message 3016 is sent to the Accounting process component 150. If the Notify of Inventory Change and Activity Confirmation Cancellation operation 3012 is invoked, then an Inventory Change and Activity Confirmation Accounting Cancellation Request message 3018 is sent to the Accounting process component 150.

If the notification message 3016 is received, then a Create Accounting Document operation 3022 is performed. The operation 3022 can receive and handle an inventory change accounting notification. If the cancellation message 3018 is received, then a Cancel Accounting Document operation 3024 is performed to cancel requests received. The operation 3024 can receive an inventory change accounting cancellation request. The operations 3022 and 3024 are included in an Inventory and Activity Accounting In interface 3020. Cancellations and updates can be sent by a Maintain Accounting Document based on Inventory and Activity inbound process agent 3026 to update the Accounting Notification business object 428. The Accounting Notification business object 428 represents a notification sent to Financial Accounting by an operational component regarding a business transaction.

Interactions between Process Components "Outbound Delivery Processing" and "Inbound Delivery Processing at Customer"

Figure 31:
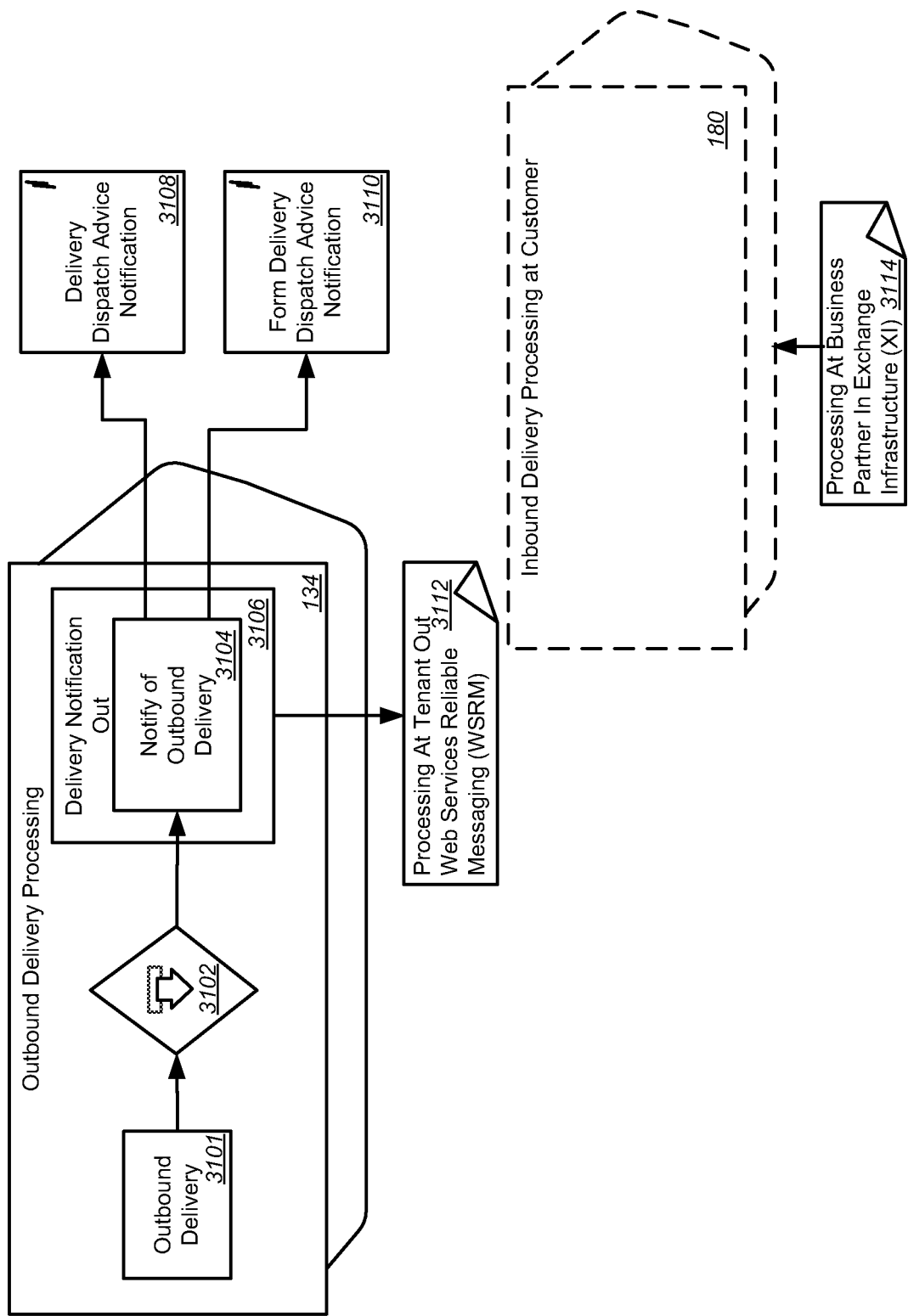
FIG. 31 is a block diagram showing the interactions between the Outbound Delivery Processing process component and an Inbound Delivery Processing at Customer process component.

FIG. 31 is a block diagram showing the interactions between the Outbound Delivery Processing process component 134 and the Inbound Delivery Processing at Customer process component 180 in the architectural design of FIGS. 1A and 1B. The interaction starts when an outbound delivery is completed or cancelled. The Outbound Delivery Processing process component 134 notifies the customer about the expected deliveries.

As shown in FIG. 31, the Outbound Delivery Processing process component 134 includes the Outbound Delivery business object 3101. The Outbound Delivery business object 3101 represents a composition of the goods that are provided for shipping by a vendor. The business object 906 uses a Notify of Outbound Delivery to Inbound Delivery Processing at Customer outbound process agent 3102 to invoke a Notify of Outbound Delivery operation 3104. The operation 3104 is included in a Delivery Notification Out interface 3106. The Outbound Delivery Processing process component 134 sends information using a Processing At Tenant Out Web Services Reliable Messaging (WSRM) communication channel template 3112. The Delivery Notification Out interface 3106 sends information to the Inbound Delivery Processing at Customer process component 180 using the Processing At Tenant Out Web Services Reliable Messaging (WSRM) communication channel template 3112. The communication channel template 3112 can define protocols and parameters used for communication with an external party.

The Notify of Outbound Delivery operation 3104 generates a Delivery Dispatch Advice Notification message 3108 and a Form Delivery Dispatch Advice Notification message 3110. The messages 3108, 3110 can be received by the Inbound Delivery Processing at Customer process component 180. The Inbound Delivery Processing at Customer process component 180 receives information from the Outbound Delivery Processing process component 134 using a Processing At Business Partner In XI communication channel template 3114. The Processing At Business Partner In Exchange Infrastructure (XI) communication channel template 3114 can define protocols and parameters used for communication with an external party.

Interactions between Process Components "Customer Invoice Processing" and "Balance of Foreign Payment Management"

Figure 32:
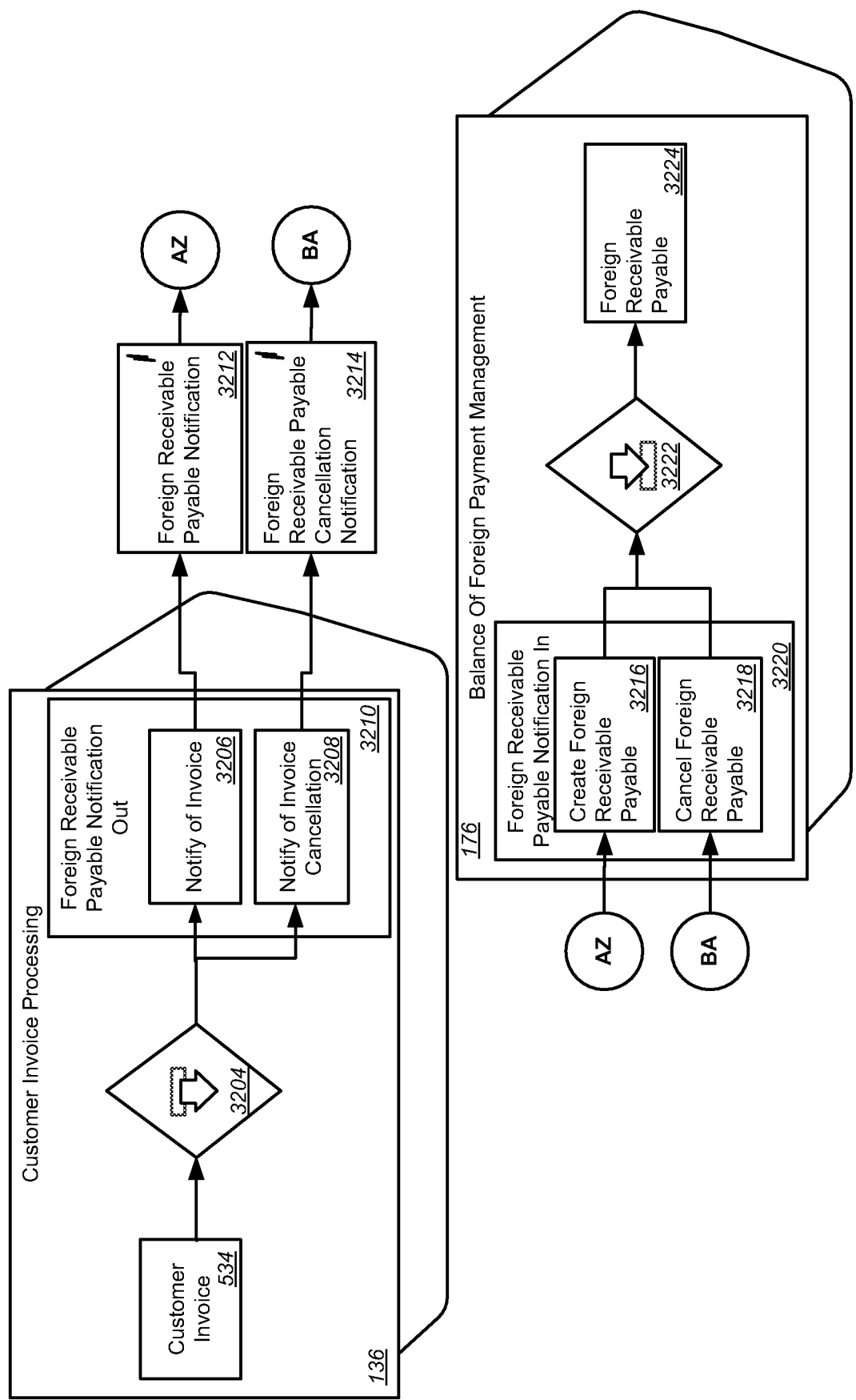
FIG. 32 is a block diagram showing the interactions between the Customer Invoice Processing process component and a Balance of Foreign Payment Management process component.

FIG. 32 is a block diagram showing the interactions between the Customer Invoice Processing process component 136 and the Balance of Foreign Payment Management process component 176 in the architectural design of FIGS. 1A and 1B. The interaction starts when a customer invoice is created or cancelled related to a non-resident customer. The Customer Invoice Processing process component 136 can notify the Balance of Foreign Payments Management process component 176 about the creation or cancellation of a payable related to a non-resident customer.

As shown in FIG. 32, the Customer Invoice Processing process component 136 includes a Customer Invoice business object 534 that represents a customer's obligation to pay a supplier for delivered goods and services. For example, if the customer returns goods or complains about services, the supplier can issue a credit memo for an amount equal to or lower than the original invoice, and can refund the money to the company. For example, for invoiced goods that require a duty, a customs duty invoice can be submitted by the customs authority, stating a company's obligation to pay tax on the import or export of goods. A Notify of Customer Invoice to Balance of Foreign Payments Management outbound process agent 3204 uses a Notify of Invoice operation 3206 to notify the Balance Of Foreign Payment Management process component 176 about the foreign receivables/payables of the customer invoice. Alternatively, a Notify of Invoice Cancellation operation 3208 can be used to notify the Balance of Foreign Payment Management process component 176 about the cancellation of a previously sent notification for foreign receivables/payables of the customer invoice. Both operations 3206 and 3208 are included in a Foreign Receivable Payable Notification Out interface 3210. The Notify of Invoice operation 3206 generates a Foreign Receivable Payable Notification message 3212 that can be sent to the Balance of Foreign Payment Management process component 176. The Notify of Invoice Cancellation operation 3208 generates a Foreign Receivable Payable Cancellation Notification message 3214 that can be sent to the Balance of Foreign Payment Management process component 176.

The messages 3212 and 3214 are received by a Create Foreign Receivable Payable operation 3216 and a Cancel Foreign Receivable Payable operation 3218, respectively, which are included in a Foreign Receivable Payable Notification In interface 3220. The Foreign Receivable Payable Notification message 3212 is received by the Create Foreign Receivable Payable operation 3216, which creates a foreign receivable or payable. The Foreign Receivable Payable Cancellation Notification message 3214 is received by the Cancel Foreign Receivable Payable operation 3218, which cancels a foreign receivable or payable. Operations 3216 and 3218 use a Maintain Foreign Receivable Payable inbound process agent 3222 to create, change, or cancel a foreign receivable or payable in a Foreign Receivable Payable business object 3224. The Foreign Receivable Payable business object 3224 represents a receivable from or payable to a non-resident business partner.

Interactions between Process Components "Pricing Engine" and "External Tax Calculation"

Figure 33:
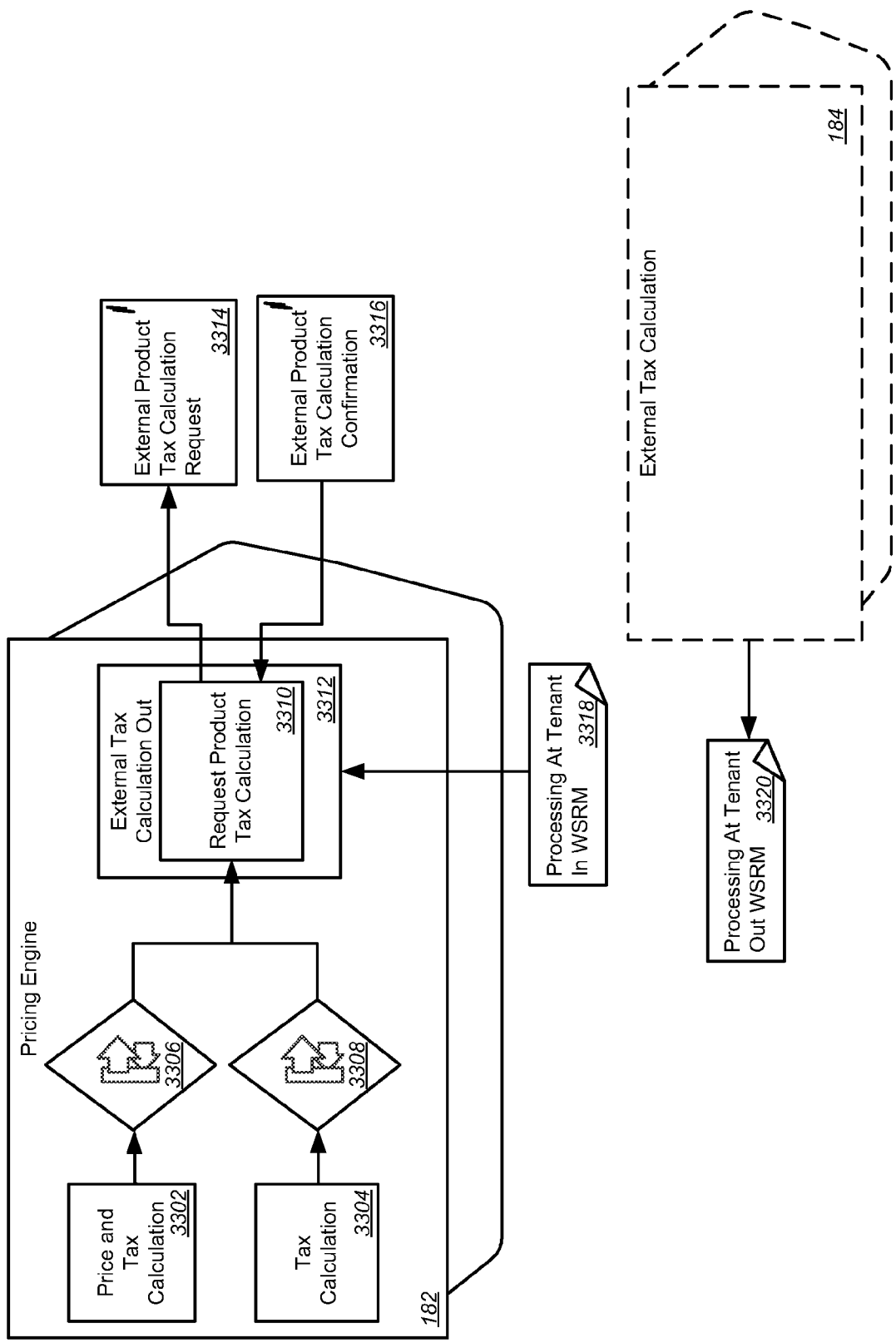
FIG. 33 is a block diagram showing the interactions between a Pricing Engine process component and an External Tax Calculation process component.

FIG. 33 is a block diagram showing the interactions between the Pricing Engine 182 process component and the External Tax Calculation 184 process component in the architectural design of FIGS. 1A and 1B. The interaction may begin with the Pricing Engine process component 182 requesting a tax calculation from the External Tax Calculation process component 184.

As shown in FIG. 33, the Pricing Engine process component 182 includes a Price and Tax Calculation business object 3302 and a Tax Calculation business object 3304. The Price and Tax Calculation business object 3302 represents a summary of the determined price and tax components for a business case. The Tax Calculation business object 3304 represents a summary of the determined and calculated tax elements of a business case.

The Price and Tax Calculation business object 3302 uses a Synchronous Request Product Tax Calculation from Price and Tax Calculation to External Tax Calculation outbound process agent 3306 to invoke a Request Product Tax Calculation operation 3310. The Tax Calculation business object 3304 uses a Synchronous Request Product Tax Calculation from Tax Calculation to External Tax Calculation outbound process agent 3308 to invoke the Request Product Tax Calculation operation 3310 to calculate the product tax for a current document. The operation 3310 requests a product tax calculation from the External Tax Calculation process component 184. The Request Product Tax Calculation operation 3310 is included in an External Tax Calculation Out interface 3312. The Pricing Engine process component 182 receives information from a Processing At Tenant In Web Services Reliable Messaging (WSRM) communication channel template 3318. The External Tax Calculation Out interface 3312 receives information to the External Tax Calculation process component 184 using the Processing At Tenant In Web Services Reliable Messaging (WSRM) communication channel template 3318. The communication channel template 3318 can define protocols and parameters used for communication with an external party. The Request Product Tax Calculation operation 3310 generates an External Product Tax Calculation Request message 3314 or an External Product Tax Calculation Confirmation message 3316. The messages 3314, 3316 can be received by the External Tax Calculation process component 184. The External Tax Calculation process component 184 sends information to the Inbound Delivery Processing at Customer process component 180 using a Processing At Tenant Out Web Services Reliable Messaging (WSRM) communication channel template 3112. The communication channel template 3112 can define protocols and parameters used for communication with an external party.

Interactions between Process Components "Payment Authorization" and "Settlement Processing at Clearing House"

Figure 34:
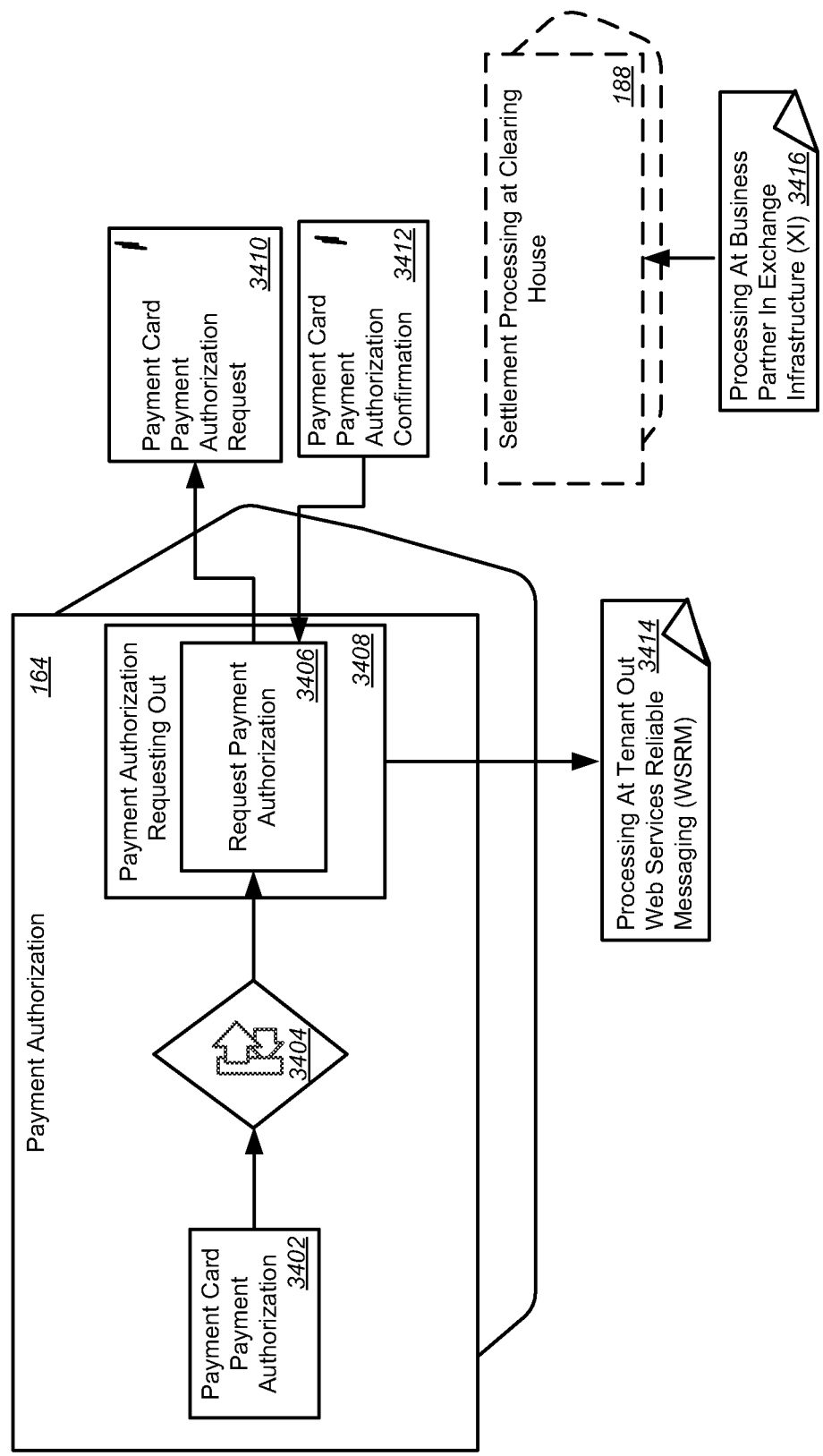
FIG. 34 is a block diagram showing the interactions between a Payment Authorization process component and a Settlement Processing at Clearing House process component.

FIG. 34 is a block diagram showing the interactions between the Payment Authorization process component 186 and the Settlement Processing at Clearing House process component 188 in the architectural design of FIGS. 1A and 1B.

As shown in FIG. 34, the Payment Authorization process component 186 includes a Payment Card Payment Authorization business object 3402. The Payment Card Payment Authorization business object 3402 represents an authorization for a payment made using a payment card. It includes payment information (e.g., a description of goods/services purchased, an authorization request, and the result of the authorization request based on a response from a clearing house).

The Payment Card Payment Authorization business object 3402 uses a Request Payment Card Payment Authorization outbound process agent 3404 to invoke a Request Payment Authorization operation 3406. The operation 3406 is included in a Payment Authorization Requesting Out interface 3408. The Payment Authorization process component 164 sends information to the Settlement Processing at Clearing House process component 188 using a Processing At Tenant Out Web Services Reliable Messaging (WSRM) communication channel template 3414. The Payment Authorization Requesting Out interface 3408 sends information to the Settlement Processing at Clearing House process component 188 using a the Processing At Tenant Out Web Services Reliable Messaging (WSRM) communication channel template 3414. The communication channel template 3414 can define protocols and parameters used for communication with an external party.

The Request Product Availability Information operation 3406 can request a clearing house for authorization of a payment made by a payment card. The Request Product Availability Information operation 3406 generates a Payment Card Payment Authorization Request message 3410. The message 3410 can be sent to the Settlement Processing at Clearing House process component 188. The Settlement Processing at Clearing House process component 188 can send a Payment Card Payment Authorization Confirmation message 3412 which is received by the Request Payment Authorization operation 3406. The Settlement Processing at Clearing House process component 188 receives information from the Payment Authorization process component 164 using a Processing At Business Partner In XI communication channel template 3416. The Processing At Business Partner In Exchange Infrastructure (XI) communication channel template 3416 can define protocols and parameters used for communication with an external party.

Interactions between Process Components "Due Item Processing" and "Due Item Processing at Business Partner"

Figure 35:
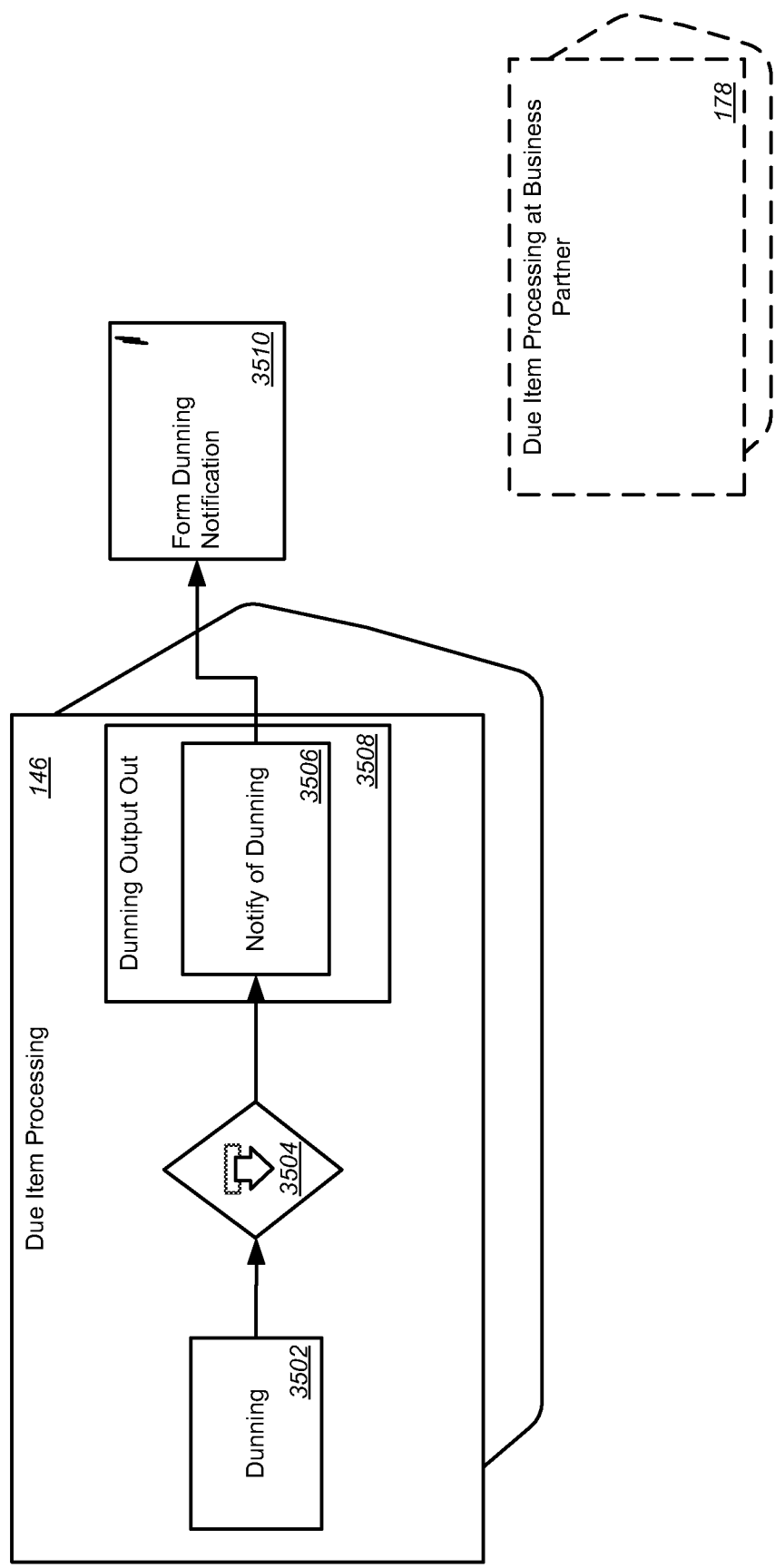
FIG. 35 is a block diagram showing the interactions between the Due Item Processing process component and a Due Item Processing at Business Partner process component.

FIG. 35 is a block diagram showing the interactions between the Due Item Processing process component 146 and the Due Item Processing at Business Partner process component 178 in the architectural design of FIGS. 1A and 1B. An interaction starts when a dunning is released. The Due Item Processing process component 146 notifies the business partner about outstanding receivables and expected payments.

As shown in FIG. 35, the Due Item Processing process component 146 includes a Dunning business object 3502. The Dunning business object 3502 represents a reminder or demand from a company (creditor) to a business partner (debtor) to make a payment by a certain point in time.

The Dunning business object 3502 uses a Notify of Dunning to Business Partner outbound process agent 3504 to invoke a Notify of Dunning operation 3506. The operation 3506 is included in a Dunning Output Out interface 3508. The operation 3506 can notify the business partner about outstanding payments. For example, notification can involve sending a dunning letter or a payment reminder to the business partner, changing the status of the dunning changes to "Released." The operation 3506 generates a Form Dunning Notification message 3510. The message 3510 can be sent to the Due Item Processing at Business Partner process component 178.

Interactions between Process Components "Service Request Processing" and "Service Request Processing at Provider"

Figure 36:
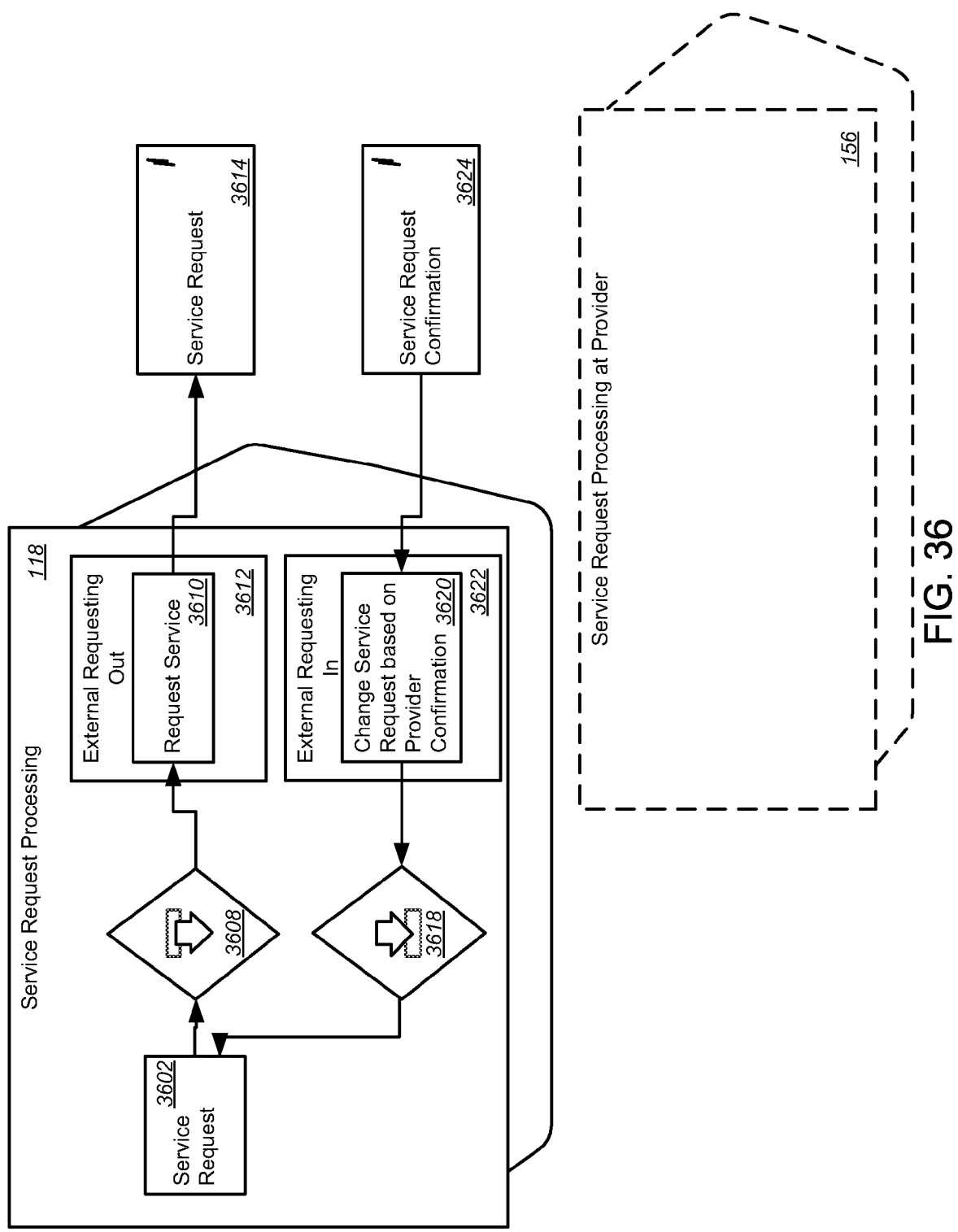
FIG. 36 is a block diagram showing the interactions between the Service Request Processing process component and a Service Request Processing at Provider process component.

FIG. 36 is a block diagram showing the interactions between the Service Request Processing process component 118 and the Service Request Processing at Provider process component 156 in the architectural design of FIGS. 1A and 1B.

As shown in FIG. 36, the Service Request Processing process component 118 includes a Service Request business object 3602. The Service Request business object 3602 uses a Request Service from Service Request to Provider outbound process agent 3608 to invoke a Request Service operation 1810. The operation 1810 is included in an External Requesting Out interface 1812. The operation 1810 generates and sends a Service Request message 1814 to the Service Request Processing at Provider process component 156.

A Service Request Confirmation message 1824 is received by a Change Service Request based on Provider Confirmation operation 1820. The operation 1820 in included in an External Requesting In interface 1822. The operation 1820 invokes a Change Service Request Based on Provider Confirmation inbound process agent 3618 to update the Service Request business object 3602.

Interactions between Process Components "Service Request Processing" and "Customer Invoice Processing"

Figure 37:
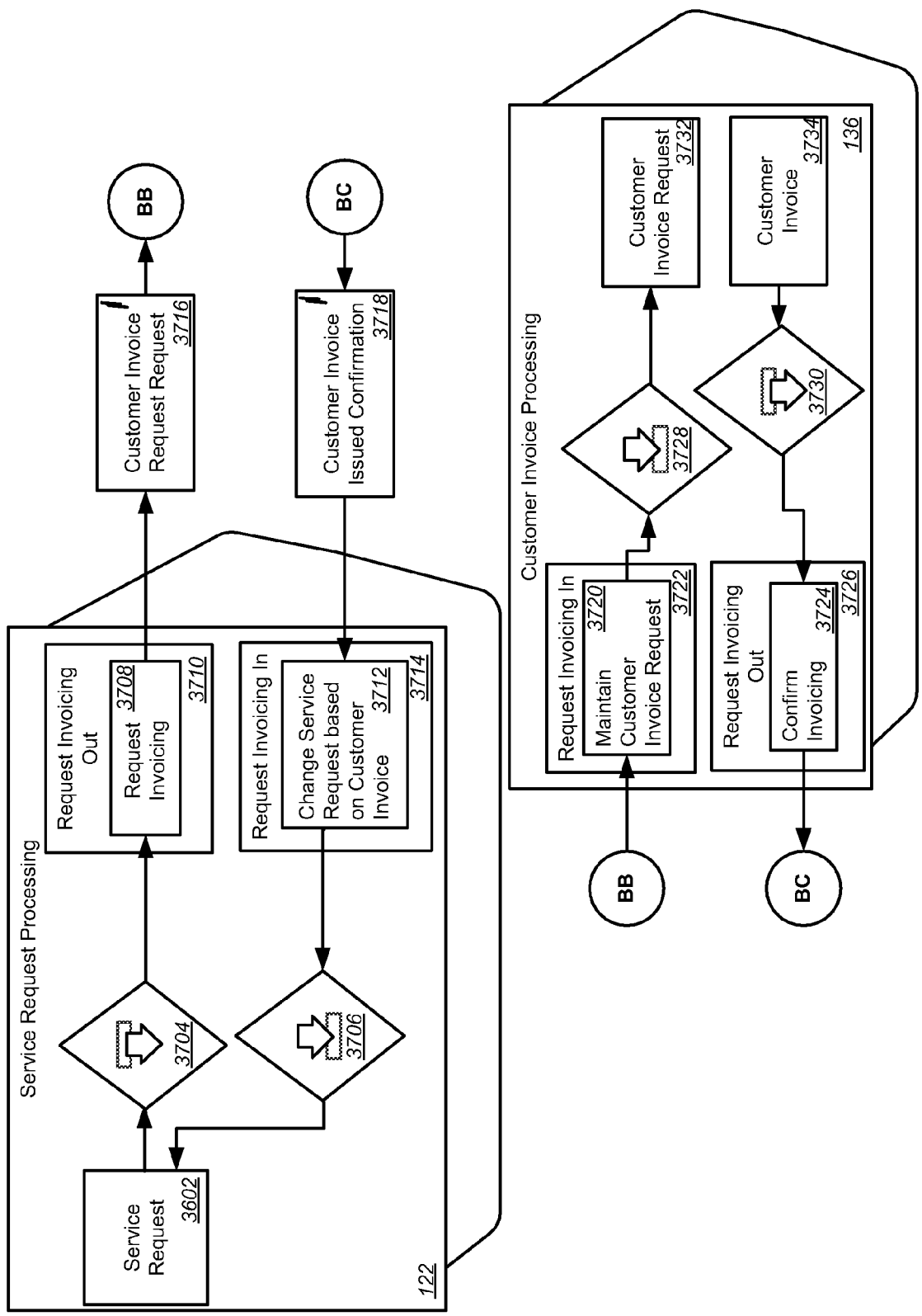
FIG. 37 is a block diagram showing the interactions between a Service Request Processing process component and the Customer Invoice Processing process component.

FIG. 37 is a block diagram showing the interactions between the Service Request Processing process component 118 and the Customer Invoice Processing process component 136 in the architectural design of FIGS. 1A and 1B. The Service Request Processing process component 118 requests the creation, update or cancellation of service requests from Customer Invoice Processing process component 136. The Customer Invoice Processing process component 136 confirms the performed action to the requestor.

As shown in FIG. 37, the Service Request Processing process component 118 includes the Service Request business object 3602. The Service Request business object 3602 represents a request from a customer to a service provider to solve an issue that the customer has with regard to a product. In addition to the description and the categorization of the issue, the Service Request business object 3602 contains the documentation and the results of the resolution, as well as the expenses incurred. The Service Request business object 3602 uses a Request Invoicing from Service Request to Customer Invoice Processing outbound process agent 3704 to invoke a Request Invoicing operation 3708. The operation 3708 requests invoicing of services provided and spare parts consumed based on information in the service request. The Request Invoicing operation 3708 is included in a Request Invoicing Out interface 3710. The Request Invoicing operation 3708 sends a Customer Invoice Request Request message 3716 to the Customer Invoice Processing process component 136.

A Maintain Customer Invoice Request operation 3720 receives the message 3716. The Maintain Customer Invoice Request operation 3720 creates, updates, or cancels a customer invoice request. The operation 3720 is included in a Request Invoicing In interface 3722. The Maintain Customer Invoice Request operation 3720 uses a Maintain Customer Invoice Request inbound process agent 3728 to update a Customer Invoice Request business object 3732. The Customer Invoice Request business object 3732 represents a request to create one or several customer invoices, or to take account of the data for the underlying business document when creating a customer invoice.

A Customer Invoice business object 3734 uses a Confirm Customer Invoice to Service Request Processing outbound process agent 3730 to invoke a Confirm Invoicing operation 3724. The Customer Invoice business object 3734 represents a binding statement of amounts receivable resulting, for example, from deliveries to a customer, services performed for a customer, adjustments to these receivables, or credit memos to a customer. The Confirm Invoicing operation 3724 confirms that invoicing has taken place. The Confirm Invoicing operation 3724 is included in a Request Invoicing Out interface 3726. The operation 3724 sends a Customer Invoice Issued Confirmation message 3718 to the Service Request Processing process component 133.

A Change Service Request based on Customer Invoice operation 3712 receives the Customer Invoice Issued Confirmation message 3718. The Change Service Request based on Customer Invoice operation 3712 is included in a Request Invoicing In interface 3714. The Change Service Request based on Customer Invoice operation 3712 updates a service request based on information from related customer invoices. The operation 3712 uses a Change Service Request based on Customer Invoice inbound process agent 3706 to update the Service Request business object 3602.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A computer program product comprising application software encoded on a tangible machine readable information carrier, the application software being structured as process components interacting with each other through service interfaces, the software comprising:

a plurality of process components, each of the process components being a package of software implementing a respective and distinct business process, the plurality of process components including:

a service request processing process component that logs and resolves service requests concerning issues that customers have with regard to products;

a service order processing process component that handles the creation, planning, and fulfillment of service orders, to be executed by a service engineer at customer site for an agreed price;

a service confirmation processing process component that reports back actual times and quantities for services provided, and spare parts consumed related to the execution of a service order;

a customer requirement processing process component that controls customer requirements in the supply chain, involving checking material availability, receiving, preparing, and passing customer requirements on to supply planning and logistics, and providing feedback on fulfillment;

an accounting process component that represents relevant business transactions for valuation and profitability analysis;

a supply and demand matching process component that manages all the tasks necessary to ensure that sufficient material receipt elements exist to cover material demand while taking available capacity into account; and a logistics execution control process component that handles the creation, controlling, and monitoring of the supply chain execution activities for the fulfillment of an order on a macro-logistics level, triggers site logistics activities and receives information about the supply chain execution progress; and a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message based pair wise interaction between the respective process components of the respective operations, the pair-wise interactions between pairs of the process components including interactions between:

the service request processing process component and the accounting process component;

the service request processing process component and a customer invoice processing process component;

the service order processing process component and the customer invoice processing process component;

the service order processing process component and the accounting process component;

the service order processing process component and a financial accounting master data management process component;

the service order processing process component and the customer requirement processing process component;

the service confirmation processing process component and an inventory processing process component;

the service confirmation processing process component and the customer invoice processing process component;

the service confirmation processing process component and the accounting process component;

the logistics execution control process component and a site logistics processing process component; and the logistics execution control process component and an outbound delivery processing process component.

2. The product of claim 1, wherein:
the plurality of process components further includes:

a site logistics processing process component that handles the preparation, physical execution, and confirmation of logistics processes within a site;

an inventory processing process component that manages inventory and recording of inventory changes, and provides services to maintain current stock, content and structure of logistic units and allocations;

an outbound delivery processing process component that manages and processes the outbound delivery requirements for shipping goods to a product recipient, and combines document-based tasks for the outbound delivery process;

a customer invoice processing process component that handles the invoicing of customers for the delivery of goods or the provision of services;

a financial accounting master data management process component that handles the management of financial accounting master data that is used both for accounting and costing purposes;

a balance of foreign payment management process component that handles the collection, processing, and reporting of receivables and payables according to foreign trade regulations;

a due item processing process component that handles the collection, management, and monitoring of trade receivables or payables and corresponding sales tax or withholding tax; and a payment processing process component that handles the processing and management of all payments, is responsible for the associated communication with financial institutions such as banks, and provides the primary input for liquidity management; and wherein the pair-wise interactions between pairs of the process components further include interactions between:

the site logistics processing process component and the accounting process component;

the inventory processing process component and the accounting process component;

the inventory processing process component and the supply and demand matching process component;

the customer invoice processing process component and the accounting process component;

the customer invoice processing process component and the due item processing process component;

the customer invoice processing process component and the balance of foreign payment management process component;

the due item processing process component and the payment processing process component;

the due item processing process component and the accounting process component;

the payment processing process component and the due item processing process component; and the payment processing process component and the accounting process component.

3. The product of claim 2, wherein:

each of the plurality of process components is assigned to exactly one deployment unit among multiple deployment units, and each deployment unit is deployable on a separate computer hardware platform independent of every other deployment unit; and all interaction between a process component in one deployment unit and any other process component in any other deployment unit takes place through the respective service interfaces of the two process components.

4. The product of claim 3, wherein the deployment units comprise:

a customer relationship management deployment unit that includes the service request processing process component, the service order processing process component, and the service confirmation processing process component;

a supply chain control deployment unit that includes the customer requirement processing process component, the supply and demand matching process component, and the logistics execution control process component;

a production and site logistics execution deployment unit that includes the site logistics processing process component, the inventory processing process component, and the outbound delivery processing process component;

a customer invoicing deployment unit that includes the customer invoice processing process component;

a due item management deployment unit that includes the balance of foreign payment management process component, and the due item processing process component;

a payment deployment unit that includes the payment processing process component; and a financial accounting deployment unit that includes the accounting process component and the financial accounting master data management process component.

5. The product of claim 1, wherein:

each of the process components includes one or more business objects; and none of the business objects of any one of the process components interacts directly with any of the business objects included in any of the other process components.

6. The product of claim 5, wherein the business objects comprise a business process object.

7. The product of claim 5, wherein:

none of the business objects included in any one of the process components is included in any of the other process components.

8. The product of claim 1, further comprising:

a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

9. The product of claim 8, wherein:

the inbound process agents comprise a first inbound process agent operable to start the execution of step requested in a first inbound message by creating or updating one or more business object instances.

10. The product of claim 8, wherein:

the outbound process agents comprise a first asynchronous outbound process agent that is called after a business object that is associated with the first outbound process agent changes.

11. The product of claim 1, wherein the operations comprise synchronous and asynchronous operations.

12. A system, comprising:

a computer system comprising one or more hardware platforms for executing a computer software application;

a plurality of process components, each of the process components being a package of software implementing a respective and distinct business process, the plurality of process components including:

a service request processing process component that logs and resolves service requests concerning issues that customers have with regard to products;

a service order processing process component that handles the creation, planning, and fulfillment of service orders, to be executed by a service engineer at customer site for an agreed price;

a service confirmation processing process component that reports back actual times and quantities for services provided, and spare parts consumed related to the execution of a service order;

a customer requirement processing process component that controls customer requirements in the supply chain, involving checking material availability, receiving, preparing, and passing customer requirements on to supply planning and logistics, and providing feedback on fulfillment;

an accounting process component that represents relevant business transactions for valuation and profitability analysis;

a supply and demand matching process component that manages all the tasks necessary to ensure that sufficient material receipt elements exist to cover material demand while taking available capacity into account; and a logistics execution control process component that handles the creation, controlling, and monitoring of the supply chain execution activities for the fulfillment of an order on a macro-logistics level, triggers site logistics activities and receives information about the supply chain execution progress; and a plurality of service operations, each service operation being implemented for a respective process component, the operations comprising inbound and outbound operations, the outbound operation for a first process component being operable to send a message to a second process component of the plurality of process components, the second process component having an inbound operation for receiving the message, the passing of messages between an inbound and an outbound operation defining a message-based pair-wise interaction between the respective process components of the respective operations, the pair-wise interactions between pairs of the process components including interactions between:

the service request processing process component and the accounting process component;

the service request processing process component and a customer invoice processing process component;

the service order processing process component and the customer invoice processing process component;

the service order processing process component and the accounting process component;

the service order processing process component and a financial accounting master data management process component;

the service order processing process component and the customer requirement processing process component;

the service confirmation processing process component and an inventory processing process component;

the service confirmation processing process component and the customer invoice processing process component;

the service confirmation processing process component and the accounting process component;

the logistics execution control process component and a site logistics processing process component; and the logistics execution control process component and an outbound delivery processing process component.

13. The system of claim 11, wherein:
the plurality of process components further comprises:
a site logistics processing process component that handles the preparation, physical execution, and confirmation of logistics processes within a site;

an inventory processing process component that manages inventory and recording of inventory changes, and provides services to maintain current stock, content and structure of logistic units and allocations;

an outbound delivery processing process component that manages and processes the outbound delivery requirements for shipping goods to a product recipient, and combines document-based tasks for the outbound delivery process;

a customer invoice processing process component that handles the invoicing of customers for the delivery of goods or the provision of services;

a financial accounting master data management process component that handles the management of financial accounting master data that is used both for accounting and costing purposes;

an accounting process component that represents relevant business transactions for valuation and profitability analysis;

a balance of foreign payment management process component that handles the collection, processing, and reporting of receivables and payables according to foreign trade regulations;

a due item processing process component that handles the collection, management, and monitoring of trade receivables or payables and corresponding sales tax or withholding tax; and a payment processing process component that handles the processing and management of all payments, is responsible for the associated communication with financial institutions such as banks, and provides the primary input for liquidity management; and the pair-wise interactions between pairs of the process components further include interactions between:

the site logistics processing process component and the accounting process component;

the inventory processing process component and the accounting process component;

the inventory processing process component and the supply and demand matching process component;

the customer invoice processing process component and the accounting process component;

the customer invoice processing process component and the due item processing process component;

the customer invoice processing process component and the balance of foreign payment management process component;

the due item processing process component and the payment processing process component;

the due item processing process component and the accounting process component;

the payment processing process component and the due item processing process component; and the payment processing process component and the accounting process component.

14. The system of claim 11, wherein:
each of the process components includes one or more business objects; and
none of the business objects of any one of the process components interacts directly with any of the business objects included in any of the other process components.

15. The system of claim 11, wherein:
none of the business objects included in any one of the process components is included in any of the other process components.

16. The system of claim 11, wherein:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component.

17. The system of claim 11, the system comprising multiple hardware platforms, wherein:
the outbound delivery process component, the service request processing process component, the service order processing process component, and the service confirmation processing process component are deployed on a first hardware platform;
the customer requirement processing process component, the supply and demand matching process component, and the logistics execution control process component are deployed on a second hardware platform; and
the customer invoice processing process component, is deployed on a third hardware platform;

the site logistics processing process component, the outbound delivery processing process component, and the inventory processing process component are deployed on a fourth hardware platform;

the accounting process component is deployed on a fifth hardware platform;

the balance of foreign payment management process component and the due item processing process component are deployed on a sixth hardware platform; and the payment processing process component is deployed on a seventh hardware platform.

18. The system of claim 17, wherein each of the first through the seventh hardware platforms are distinct and separate from each other.

19. A method for developing a computer software application, comprising:

obtaining in a computer system digital data representing an architectural design for a set of processes implementing an end-to-end application process, the design specifying a process component for each process in the set of processes, the design specifying further specifying a set of process component interactions, wherein:

the specified process components include components including:

a service request processing process component that logs and resolves service requests concerning issues that customers have with regard to products;

a service order processing process component that handles the creation, planning, and fulfillment of service orders, to be executed by a service engineer at customer site for an agreed price;

a service confirmation processing process component that reports back actual times and quantities for services provided, and spare parts consumed related to the execution of a service order;

a customer requirement processing process component that controls customer requirements in the supply chain, involving checking material availability, receiving, preparing, and passing customer requirements on to supply planning and logistics, and providing feedback on fulfillment;

an accounting process component that represents relevant business transactions for valuation and profitability analysis;

a supply and demand matching process component that manages all the tasks necessary to ensure that sufficient material receipt elements exist to cover material demand while taking available capacity into account; and a logistics execution control process component that handles the creation, controlling, and monitoring of the supply chain execution activities for the fulfillment of an order on a macro-logistics level, triggers site logistics activities and receives information about the supply chain execution progress; and wherein:

the process component interactions include interactions between the service request processing process component and the accounting process component;

the service request processing process component and a customer invoice processing process component;

the service order processing process component and the customer invoice processing process component;

the service order processing process component and the accounting process component;

the service order processing process component and a financial accounting master data management process component;

the service order processing process component and the customer requirement processing process component;

the service confirmation processing process component and an inventory processing process component;

the service confirmation processing process component and the customer invoice processing process component;

the service confirmation processing process component and the accounting process component;

the logistics execution control process component and a site logistics processing process component; and the logistics execution control process component and an outbound delivery processing process component.

20. The method of claim 19, wherein:

the specified process components further include:

a site logistics processing process component that handles the preparation, physical execution, and confirmation of logistics processes within a site;

an inventory processing process component that manages inventory and recording of inventory changes, and provides services to maintain current stock, content and structure of logistic units and allocations;

an outbound delivery processing process component that manages and processes the outbound delivery requirements for shipping goods to a product recipient, and combines document-based tasks for the outbound delivery process;

a customer invoice processing process component that handles the invoicing of customers for the delivery of goods or the provision of services;

a financial accounting master data management process component that handles the management of financial accounting master data that is used both for accounting and costing purposes;

a balance of foreign payment management process component that handles the collection, processing, and reporting of receivables and payables according to foreign trade regulations;

a due item processing process component that handles the collection, management, and monitoring of trade receivables or payables and corresponding sales tax or withholding tax; and a payment processing process component that handles the processing and management of all payments, is responsible for the associated communication with financial institutions such as banks, and provides the primary input for liquidity management; and the process component interactions further include interactions between:

the site logistics processing process component and the accounting process component;

the inventory processing process component and the accounting process component;

the inventory processing process component and the supply and demand matching process component;

the customer invoice processing process component and the accounting process component;

the customer invoice processing process component and the due item processing process component;

the customer invoice processing process component and the balance of foreign payment management process component;

the due item processing process component and the payment processing process component;

the due item processing process component and the accounting process component;

the payment processing process component and the due item processing process component; and the payment processing process component and the accounting process component.

21. The method of claim 19, wherein:

each process in the set of processes is a business process transforming a defined business input into a defined business outcome.

22. The method of claim 21, wherein:

obtaining digital data representing the architectural design further comprises editing the design before using the design.

* * * * *